United States Patent
Ono et al.

(10) Patent No.: US 7,702,573 B2
(45) Date of Patent: Apr. 20, 2010

(54) DEBT REDUCTION METHOD AND DEVICE THEREOF

(75) Inventors: Minoru Ono, Fukui (JP); Fumihiko Matsuda, Fukui (JP); Kenji Sumida, Tochigi (JP)

(73) Assignee: Washi Kosan Co., Ltd., Tokyo (JP)

( * ) Notice: Subject to any disclaimer, the term of this patent is extended or adjusted under 35 U.S.C. 154(b) by 613 days.

(21) Appl. No.: 10/568,901

(22) PCT Filed: Dec. 28, 2004

(86) PCT No.: PCT/JP2004/019651

§ 371 (c)(1),
(2), (4) Date: Feb. 17, 2006

(87) PCT Pub. No.: WO2005/083604

PCT Pub. Date: Sep. 9, 2005

(65) Prior Publication Data

US 2006/0229955 A1     Oct. 12, 2006

(30) Foreign Application Priority Data

| Feb. 26, 2004 | (JP) | ............................. 2004-052398 |
| Mar. 26, 2004 | (JP) | ............................. 2004-093358 |
| May 17, 2004 | (JP) | ............................. 2004-146502 |
| Jul. 29, 2004 | (JP) | ............................. 2004-222424 |
| Nov. 19, 2004 | (JP) | ............................. 2004-336683 |

(51) Int. Cl.
*G06Q 40/00* (2006.01)
(52) U.S. Cl. .......................................... 705/38; 705/35
(58) Field of Classification Search .................. 705/37, 705/35, 38
See application file for complete search history.

(56) References Cited

U.S. PATENT DOCUMENTS

| 2002/0002528 A1 | 1/2002 | Terada et al. |
| 2005/0144119 A1* | 6/2005 | Monsen et al. ................. 705/38 |

FOREIGN PATENT DOCUMENTS

JP     8-510579     11/1996

(Continued)

OTHER PUBLICATIONS

Bank Credit Quality in a Restructured Financial System The following is an address by David C. Cates, president of Cates Consulting Analysts Inc., New York, to the Bank and Financial Analysts Association's banking industry and bank stock symposium in New York on Mar. 31. American Banker (pre-1997 Fulltext). New York, N.Y.: Apr. 13, 1988. vol. 153.*

(Continued)

*Primary Examiner*—Lalita M Hamilton
(74) *Attorney, Agent, or Firm*—Jordan and Hamburg LLP

(57) ABSTRACT

In a method which is performed using a communication network and uses a derivative to reduce a money debt such as a housing loan debt, a loan debt, a nation/public/corporate bond debt, a lease debt, or a payment obligation including insurance benefits, a derivative corresponding to a period of the debt and a condition is set up by a bond, a stock, a currency, an exchange, an interest rate, a spot such as a commodity and/or an index, and a price singly or by combining them, and in case of necessity, the derivative is divided into small lots to conform to an amount of the debt and the condition, this is purchased by a debtor of the debt at a relatively small premium, and when the derivative produces a profit, this is sold to realize the profit, alternately, reference is made to a present value of the debt and when a profit is produced in the money debt, a swap is made to realize the profit, and the debt is reduced by the profit.

1 Claim, 31 Drawing Sheets

FOREIGN PATENT DOCUMENTS

| | | |
|---|---|---|
| JP | 2001-101311 | 4/2001 |
| JP | 3184876 | 5/2001 |
| JP | 2001-202473 | 7/2001 |
| JP | 2001-344314 | 12/2001 |
| JP | 2002-342579 | 11/2002 |
| JP | 2002-358428 | 12/2002 |
| JP | 2002-543481 | 12/2002 |
| JP | 2003-006432 | 1/2003 |

OTHER PUBLICATIONS

Both a borrower and a lender be Howard L Simons. Futures. Chicago: Nov. 2002. vol. 31, Iss. 14; p. 36, 4 pgs.*

Apr. 1, 2000 "Modeling of Financial Products: For Free Product Designs and Higher development Speed." Masahiko Haga, Kindai Sales Kabushiki Kaisha, p. 100.

Feb. 8, 2001 "Real Estate Financial Engineering Manual." Yuichiro Kawaguchi, Diamond, Inc., pp. 140-142.

* cited by examiner

Fig.1

PRINCIPAL AND INTEREST EQUAL REPAYMENT SPECIFICATION LIST

| BORROWED AMOUNT | REPAYMENT AMOUNT | BORROWING RATE | NUMBER OF SCHEDULED PAYMENTS |
|---|---|---|---|
| 40,000,000 | 189,685 | 3.00% | 300 |

| NUMBER OF | PRINCIPAL | AGREED INTEREST | REPAYMENT AMOUNT | BALANCE OF MONEY | NUMBER OF | PRINCIPAL | AGREED INTEREST | REPAYMENT AMOUNT | BALANCE OF MONEY |
|---|---|---|---|---|---|---|---|---|---|
| 1 | 89,685 | 100,000 | 189,685 | 39,910,315 | 67 | 105,752 | 83,933 | 189,685 | 33,467,445 |
| 2 | 89,909 | 99,776 | 189,685 | 39,820,407 | 68 | 106,016 | 83,669 | 189,685 | 33,361,429 |
| 3 | 90,134 | 99,551 | 189,685 | 39,730,273 | 69 | 106,281 | 83,404 | 189,685 | 33,255,148 |
| 4 | 90,359 | 99,326 | 189,685 | 39,639,914 | 70 | 106,547 | 83,138 | 189,685 | 33,148,601 |
| 5 | 90,585 | 99,100 | 189,685 | 39,549,330 | 71 | 106,813 | 82,872 | 189,685 | 33,041,788 |
| 6 | 90,811 | 98,873 | 189,685 | 39,458,518 | 72 | 107,080 | 82,604 | 189,685 | 32,934,708 |
| 7 | 91,038 | 98,646 | 189,685 | 39,367,480 | 73 | 107,348 | 82,337 | 189,685 | 32,827,360 |
| 8 | 91,266 | 98,419 | 189,685 | 39,276,214 | 74 | 107,616 | 82,068 | 189,685 | 32,719,744 |
| 9 | 91,494 | 98,191 | 189,685 | 39,184,720 | 75 | 107,885 | 81,799 | 189,685 | 32,611,859 |
| 10 | 91,723 | 97,962 | 189,685 | 39,092,998 | 76 | 108,155 | 81,530 | 189,685 | 32,503,704 |
| 11 | 91,952 | 97,732 | 189,685 | 39,001,046 | . | . | . | . | . |
| 12 | 92,182 | 97,503 | 189,685 | 38,908,864 | . | . | . | . | . |
| 13 | 92,412 | 97,272 | 189,685 | 38,816,451 | . | . | . | . | . |
| 14 | 92,643 | 97,041 | 189,685 | 38,723,808 | . | . | . | . | . |
| 15 | 92,875 | 96,810 | 189,685 | 38,630,933 | . | . | . | . | . |
| 16 | 93,107 | 96,577 | 189,685 | 38,537,826 | . | . | . | . | . |
| 17 | 93,340 | 96,345 | 189,685 | 38,444,486 | 116 | 119,515 | 70,170 | 189,685 | 27,948,411 |
| 18 | 93,573 | 96,111 | 189,685 | 38,350,912 | 117 | 119,813 | 69,871 | 189,685 | 27,828,598 |
| 19 | 93,807 | 95,877 | 189,685 | 38,257,105 | 118 | 120,113 | 69,571 | 189,685 | 27,708,485 |
| 20 | 94,042 | 95,643 | 189,685 | 38,163,063 | 119 | 120,413 | 69,271 | 189,685 | 27,588,071 |
| 21 | 94,277 | 95,408 | 189,685 | 38,068,787 | 120 | 120,714 | 68,970 | 189,685 | 27,467,357 |
| 22 | 94,513 | 95,172 | 189,685 | 37,974,274 | 121 | 121,016 | 68,668 | 189,685 | 27,346,341 |
| 23 | 94,749 | 94,936 | 189,685 | 37,879,525 | 122 | 121,319 | 68,366 | 189,685 | 27,225,022 |
| 24 | 94,986 | 94,699 | 189,685 | 37,784,540 | 123 | 121,622 | 68,063 | 189,685 | 27,103,400 |
| 25 | 95,223 | 94,461 | 189,685 | 37,689,316 | 124 | 121,926 | 67,759 | 189,685 | 26,981,474 |
| 26 | 95,461 | 94,223 | 189,685 | 37,593,855 | 125 | 122,231 | 67,454 | 189,685 | 26,859,244 |
| 27 | 95,700 | 93,985 | 189,685 | 37,498,155 | 126 | 122,536 | 67,148 | 189,685 | 26,736,707 |
| 28 | 95,939 | 93,745 | 189,685 | 37,402,216 | 127 | 122,843 | 66,842 | 189,685 | 26,613,864 |
| 29 | 96,179 | 93,506 | 189,685 | 37,306,037 | 128 | 123,150 | 66,535 | 189,685 | 26,490,714 |
| 30 | 96,419 | 93,265 | 189,685 | 37,209,618 | 129 | 123,458 | 66,227 | 189,685 | 26,367,257 |
| 31 | 96,660 | 93,024 | 189,685 | 37,112,957 | . | . | . | . | . |
| 32 | 96,902 | 92,782 | 189,685 | 37,016,055 | . | . | . | . | . |
| 33 | 97,144 | 92,540 | 189,685 | 36,918,911 | . | . | . | . | . |
| 34 | 97,387 | 92,297 | 189,685 | 36,821,523 | . | . | . | . | . |
| . | . | . | . | . | . | . | . | . | . |
| . | . | . | . | . | 296 | 187,331 | 2,353 | 189,685 | 754,020 |
| . | . | . | . | . | 297 | 187,799 | 1,885 | 189,685 | 566,220 |
| . | . | . | . | . | 298 | 188,269 | 1,416 | 189,685 | 377,951 |
| . | . | . | . | . | 299 | 188,740 | 945 | 189,685 | 189,211 |
| 57 | 103,144 | 86,541 | 189,685 | 34,513,171 | 300 | 189,211 | 473 | 189,685 | 0 |
| 58 | 103,402 | 86,283 | 189,685 | 34,409,770 | | 40,000,000 | 16,905,358 | 56,905,358 | |
| 59 | 103,660 | 86,024 | 189,685 | 34,306,110 | | | | | |
| 60 | 103,919 | 85,765 | 189,685 | 34,202,190 | | | | | |
| 61 | 104,179 | 85,505 | 189,685 | 34,098,011 | | | | | |
| 62 | 104,439 | 85,245 | 189,685 | 33,993,572 | | | | | |
| 63 | 104,701 | 84,984 | 189,685 | 33,888,871 | | | | | |
| 64 | 104,962 | 84,722 | 189,685 | 33,783,909 | | | | | |
| 65 | 105,225 | 84,460 | 189,685 | 33,678,684 | | | | | |
| 66 | 105,488 | 84,197 | 189,685 | 33,573,196 | | | | | |

Fig.2A

EXAMPLE IN WHICH 20-YEAR SWAP INTEREST RATE IS USED

Unit: 1000 yen

| PURCHASED INTEREST RATE OPTION | EXERCISE PRICE | 5.00% | 6.00% | 7.00% | 8.00% | 9.00% | 10.00% | 15.00% |
|---|---|---|---|---|---|---|---|---|
| PERIOD: 25 YEARS, OBJECTIVE INTEREST RATE: 20-YEAR SWAP INTEREST RATE (1.865%) | PURCHASE PRICE (1000 YEN) | 4,660 | 2,891 | 1870 | 1250 | 861 | 607 | 139 |
| PRINCIPAL: 100 million yen, VOLATILITY : 15% | RATIO TO PRINCIPAL | 4.7% | 2.9% | 1.9% | 1.3% | 0.9% | 0.6% | 0.1% |

CURRENT PRICE AMOUNT OF PURCHASED OPTION AFTER 10 YEARS

| RISE IN VOLATILITY | RISE IN INTEREST RATE | 5.00% | 6.00% | 7.00% | 8.00% | 9.00% | 10.00% | 15.00% |
|---|---|---|---|---|---|---|---|---|
| | RISE BY 0% (TO 1.865%) | 14,713 | 13,145 | 11,901 | 10,886 | 10,038 | 9,318 | 6,879 |
| | RISE BY 0.5% (TO 2.365%) | 20,855 | 18,715 | 17,015 | 15,623 | 14,456 | 13,461 | 10,061 |
| | RISE BY 1% (TO 2.865%) | 28,160 | 25,356 | 23,123 | 21,292 | 19,756 | 18,442 | 13,929 |
| 50 (+35) | RISE BY 1.5% (TO 3.365%) | 36,706 | 33,184 | 30,339 | 27,998 | 26,032 | 24,352 | 18,553 |
| | RISE BY 2% (TO 3.865%) | 46,505 | 42,287 | 38,791 | 35,874 | 33,412 | 31,304 | 24,022 |
| | RISE BY 2.5% (TO 4.365%) | 57,517 | 52,695 | 48,573 | 45,056 | 42,046 | 39,450 | 30,448 |
| | RISE BY 3% (TO 4.8655%) | 69,698 | 64,395 | 59,726 | 55,639 | 52,069 | 48,948 | 37,972 |
| | RISE BY 0% (TO 1.865%) | 22,834 | 21,608 | 20,595 | 19,734 | 18,988 | 18,332 | 15,910 |
| | RISE BY 0.5% (TO 2.365%) | 30,134 | 28,539 | 27,221 | 26,104 | 25,138 | 24,288 | 21,151 |
| | RISE BY 1% (TO 2.865%) | 38,297 | 36,300 | 34,643 | 33,238 | 32,024 | 30,957 | 27,026 |
| 75 (+60) | RISE BY 1.5% (TO 3.365%) | 47,360 | 44,950 | 42,930 | 41,207 | 39,714 | 38,404 | 33,585 |
| | RISE BY 2% (TO 3.865%) | 57,355 | 54,544 | 52,151 | 50,091 | 48,296 | 46,715 | 40,898 |
| | RISE BY 2.5% (TO 4.365%) | 68,309 | 65,128 | 62,373 | 59,970 | 57,858 | 55,986 | 49,058 |
| | RISE BY 3% (TO 4.8655%) | 80,255 | 76,748 | 73,657 | 70,922 | 68,490 | 66,317 | 58,176 |

Fig.2B

PRICE RISE RATIO = CURRENT PRICE AMOUNT + PURCHASE PRICE

Unit: 1000 yen

| EXERCISE PRICE | | 5.00% | 6.00% | 7.00% | 8.00% | 9.00% | 10.00% | 15.00% |
|---|---|---|---|---|---|---|---|---|
| RISE IN VOLATILITY | RISE IN INTEREST RATE | | | | | | | |
| | RISE BY 0% (TO 1.865%) | 3.16 | 4.55 | 6.36 | 8.71 | 11.66 | 15.35 | 49.49 |
| | RISE BY 0.5% (TO 2.365%) | 4.48 | 6.47 | 9.10 | 12.50 | 16.79 | 22.18 | 72.38 |
| | RISE BY 1% (TO 2.865%) | 6.04 | 8.77 | 12.37 | 17.03 | 22.95 | 30.38 | 100.21 |
| 50 (+35) | RISE BY 1.5% (TO 3.365%) | 7.88 | 11.48 | 16.22 | 22.40 | 30.23 | 40.12 | 133.47 |
| | RISE BY 2% (TO 3.865%) | 9.98 | 14.63 | 20.74 | 28.70 | 38.81 | 51.57 | 172.82 |
| | RISE BY 2.5% (TO 4.365%) | 12.34 | 18.23 | 25.97 | 36.04 | 48.83 | 64.99 | 219.05 |
| | RISE BY 3% (TO 4.8655%) | 14.96 | 22.27 | 31.94 | 44.51 | 60.48 | 80.64 | 273.18 |
| | RISE BY 0% (TO 1.865%) | 4.90 | 7.47 | 11.01 | 15.79 | 22.05 | 30.20 | 114.46 |
| | RISE BY 0.5% (TO 2.365%) | 6.47 | 9.87 | 14.56 | 20.88 | 29.20 | 40.01 | 152.17 |
| | RISE BY 1% (TO 2.865%) | 8.22 | 12.56 | 18.53 | 26.59 | 37.19 | 51.00 | 194.43 |
| 75 (+60) | RISE BY 1.5% (TO 3.365%) | 10.16 | 15.55 | 22.96 | 32.97 | 46.13 | 63.27 | 241.62 |
| | RISE BY 2% (TO 3.865%) | 12.31 | 18.87 | 27.89 | 40.07 | 56.09 | 76.96 | 294.23 |
| | RISE BY 2.5% (TO 4.365%) | 14.66 | 22.53 | 33.35 | 47.98 | 67.20 | 92.23 | 352.94 |
| | RISE BY 3% (TO 4.8655%) | 17.22 | 26.55 | 39.39 | 56.74 | 79.55 | 109.25 | 418.53 |

Fig.3A

*PRINCIPAL BALANCE AFTER 10 YEARS: 27,346 THOUSAND YEN*
*INITIAL BORROWING: 40 MILLION YEN (PAYMENT FOR 25 YEARS, INTEREST RATE 3%,*
*PRINCIPAL AND INTEREST EQUAL REPAYMENT)*

Unit: 1000 yen

| PURCHASED INTEREST RATE OPTION | EXERCISE PRICE | 5.00% | 6.00% | 7.00% | 8.00% | 9.00% | 10.00% | 15.00% |
|---|---|---|---|---|---|---|---|---|
| PERIOD: 25 YEARS, OBJECTIVE INTEREST RATE: 1.865% | PURCHASE PRICE TO 40 MILLION YEN | 1,864 | 1,156 | 748 | 500 | 344 | 243 | 56 |
| PRINCIPAL: 40 MILLION YEN, VOLATILITY 15% | RATIO TO PRINCIPAL | 4.66% | 2.89% | 1.87% | 1.25% | 0.86% | 0.61% | 0.14% |

*CURRENT PRICE AMOUNT OF PURCHASED OPTION AFTER 10 YEARS*

| | RISE IN INTEREST RATE | 5.00% | 6.00% | 7.00% | 8.00% | 9.00% | 10.00% | 15.00% |
|---|---|---|---|---|---|---|---|---|
| 50 (+35) | RISE BY 0% (TO 1.865%) | 5,885 | 5,258 | 4,760 | 4,354 | 4,015 | 3,727 | 2,752 |
| | RISE BY 0.5% (TO 2.365%) | 8,342 | 7,486 | 6,806 | 6,249 | 5,782 | 5,384 | 4,024 |
| | RISE BY 1% (TO 2.865%) | 11,264 | 10,142 | 9,249 | 8,517 | 7,902 | 7,377 | 5,572 |
| | RISE BY 1.5% (TO 3.365%) | 14,682 | 13,274 | 12,136 | 11,199 | 10,413 | 9,741 | 7,421 |
| | RISE BY 2% (TO 3.865%) | 18,602 | 16,915 | 15,516 | 14,350 | 13,365 | 12,522 | 9,609 |
| | RISE BY 2.5% (TO 4.365%) | 23,007 | 21,078 | 19,429 | 18,022 | 16,818 | 15,780 | 12,179 |
| | RISE BY 3% (TO 4.8655%) | 27,879 | 25,758 | 23,890 | 22,256 | 20,828 | 19,579 | 15,189 |
| 75 (+60) | RISE BY 0% (TO 1.865%) | 9,134 | 8,643 | 8,238 | 7,894 | 7,595 | 7,333 | 6,364 |
| | RISE BY 0.5% (TO 2.365%) | 12,054 | 11,416 | 10,888 | 10,442 | 10,055 | 9,715 | 8,460 |
| | RISE BY 1% (TO 2.865%) | 15,319 | 14,520 | 13,857 | 13,295 | 12,810 | 12,383 | 10,810 |
| | RISE BY 1.5% (TO 3.365%) | 18,944 | 17,980 | 17,172 | 16,483 | 15,886 | 15,362 | 13,434 |
| | RISE BY 2% (TO 3.865%) | 22,942 | 21,818 | 20,860 | 20,036 | 19,318 | 18,686 | 16,359 |
| | RISE BY 2.5% (TO 4.365%) | 27,324 | 26,051 | 24,949 | 23,988 | 23,143 | 22,394 | 19,623 |
| | RISE BY 3% (TO 4.8655%) | 32,102 | 30,699 | 29,463 | 28,369 | 27,396 | 26,527 | 23,270 |

Fig.3B

*PRINCIPAL REPAYMENT RATIO = OPTION CURRENT PRICE AMOUNT ÷ PRINCIPAL*
*BALANCE AFTER 10 YEARS: 27,346 THOUSAND YEN*

Unit: 1000 yen

| EXERCISE PRICE | RISE IN INTEREST RATE | 5.00% | 6.00% | 7.00% | 8.00% | 9.00% | 10.00% | 15.00% |
|---|---|---|---|---|---|---|---|---|
| 50 (+35) | RISE BY 0% (TO 1.865%) | 22% | 19% | 17% | 16% | 15% | 14% | 10% |
| | RISE BY 0.5% (TO 2.365%) | 31% | 27% | 25% | 23% | 21% | 20% | 15% |
| | RISE BY 1% (TO 2.865%) | 41% | 37% | 34% | 31% | 29% | 27% | 20% |
| | RISE BY 1.5% (TO 3.365%) | 54% | 49% | 44% | 41% | 38% | 36% | 27% |
| | RISE BY 2% (TO 3.865%) | 68% | 62% | 57% | 52% | 49% | 46% | 35% |
| | RISE BY 2.5% (TO 4.365%) | 84% | 77% | 71% | 66% | 62% | 58% | 45% |
| | RISE BY 3% (TO 4.8655%) | 102% | 94% | 87% | 81% | 76% | 72% | 56% |
| 75 (+60) | RISE BY 0% (TO 1.865%) | 33% | 32% | 30% | 29% | 28% | 27% | 23% |
| | RISE BY 0.5% (TO 2.365%) | 44% | 42% | 40% | 38% | 37% | 36% | 31% |
| | RISE BY 1% (TO 2.865%) | 56% | 53% | 51% | 49% | 47% | 45% | 40% |
| | RISE BY 1.5% (TO 3.365%) | 69% | 66% | 63% | 60% | 58% | 56% | 49% |
| | RISE BY 2% (TO 3.865%) | 84% | 80% | 76% | 73% | 71% | 68% | 60% |
| | RISE BY 2.5% (TO 4.365%) | 100% | 95% | 91% | 88% | 85% | 82% | 72% |
| | RISE BY 3% (TO 4.8655%) | 117% | 112% | 108% | 104% | 100% | 97% | 85% |

Fig.4A

*EFFECT WHEN THE TWO OPTIONS ARE PURCHASED*

PURCHASED INTEREST RATE OPTION
PERIOD: 25 YEARS, OBJECTIVE INTEREST RATE: 1.865%
PRINCIPAL: 40 MILLION YEN, VOLATILITY 15%

Unit: 1000 yen

| EXERCISE PRICE | | 5.00% | 6.00% | 7.00% | 8.00% | 9.00% | 10.00% | 15.00% |
|---|---|---|---|---|---|---|---|---|
| | PURCHASE PRICE (1000 YEN) | 3,728 | 2,313 | 1,496 | 1,000 | 689 | 486 | 111 |
| | RATIO TO PRINCIPAL | 9.32% | 5.78% | 3.74% | 2.50% | 1.72% | 1.21% | 0.28% |
| CURRENT PRICE AMOUNT OF PURCHASED OPTION AFTER 10 YEARS | | | | | | | | |
| | RISE IN INTEREST RATE | | | | | | | |
| 50 (+35) | RISE IN VOLATILITY | | | | | | | |
| | RISE BY 0% (TO 1.865%) | 11,770 | 10,516 | 9,521 | 8,709 | 8,030 | 7,454 | 5,503 |
| | RISE BY 0.5% (TO 2.365%) | 16,684 | 14,972 | 13,612 | 12,498 | 11,565 | 10,769 | 8,049 |
| | RISE BY 1% (TO 2.865%) | 22,528 | 20,285 | 18,498 | 17,034 | 15,805 | 14,754 | 11,143 |
| | RISE BY 1.5% (TO 3.365%) | 29,365 | 26,547 | 24,271 | 22,398 | 20,826 | 19,482 | 14,842 |
| | RISE BY 2% (TO 3.865%) | 37,204 | 33,830 | 31,033 | 28,699 | 26,730 | 25,043 | 19,218 |
| | RISE BY 2.5% (TO 4.365%) | 46,014 | 42,156 | 38,858 | 36,045 | 33,637 | 31,560 | 24,358 |
| | RISE BY 3% (TO 4.8655%) | 55,758 | 51,516 | 47,781 | 44,511 | 41,655 | 39,158 | 30,378 |
| 75 (+60) | RISE BY 0% (TO 1.865%) | 18,267 | 17,286 | 16,476 | 15,787 | 15,190 | 14,666 | 12,728 |
| | RISE BY 0.5% (TO 2.365%) | 24,107 | 22,831 | 21,777 | 20,883 | 20,110 | 19,430 | 16,921 |
| | RISE BY 1% (TO 2.865%) | 30,638 | 29,040 | 27,714 | 26,590 | 25,619 | 24,766 | 21,621 |
| | RISE BY 1.5% (TO 3.365%) | 37,888 | 35,960 | 34,344 | 32,966 | 31,771 | 30,723 | 26,868 |
| | RISE BY 2% (TO 3.865%) | 45,884 | 43,635 | 41,721 | 40,073 | 38,637 | 37,372 | 32,718 |
| | RISE BY 2.5% (TO 4.365%) | 54,647 | 52,102 | 49,898 | 47,976 | 46,286 | 44,789 | 39,246 |
| | RISE BY 3% (TO 4.8655%) | 64,204 | 61,398 | 58,926 | 56,738 | 54,792 | 53,054 | 46,541 |

Fig.4B

*PRINCIPAL REPAYMENT RATIO = OPTION CURRENT PRICE AMOUNT ÷ PRINCIPAL BALANCE AFTER 10 YEARS: 27,346 THOUSAND YEN*

Unit: 1000 yen

| EXERCISE PRICE | | 5.00% | 6.00% | 7.00% | 8.00% | 9.00% | 10.00% | 15.00% |
|---|---|---|---|---|---|---|---|---|
| | RISE IN INTEREST RATE | | | | | | | |
| 50 (+35) | RISE BY 0% (TO 1.865%) | 43% | 38% | 35% | 32% | 29% | 27% | 20% |
| | RISE BY 0.5% (TO 2.365%) | 61% | 55% | 50% | 46% | 42% | 39% | 29% |
| | RISE BY 1% (TO 2.865%) | 82% | 74% | 68% | 62% | 58% | 54% | 41% |
| | RISE BY 1.5% (TO 3.365%) | 107% | 97% | 89% | 82% | 76% | 71% | 54% |
| | RISE BY 2% (TO 3.865%) | 136% | 124% | 113% | 105% | 98% | 92% | 70% |
| | RISE BY 2.5% (TO 4.365%) | 168% | 154% | 142% | 132% | 123% | 115% | 89% |
| | RISE BY 3% (TO 4.8655%) | 204% | 188% | 175% | 163% | 152% | 143% | 111% |
| 75 (+60) | RISE BY 0% (TO 1.865%) | 67% | 63% | 60% | 58% | 56% | 54% | 47% |
| | RISE BY 0.5% (TO 2.365%) | 88% | 83% | 80% | 76% | 74% | 71% | 62% |
| | RISE BY 1% (TO 2.865%) | 112% | 106% | 101% | 97% | 94% | 91% | 79% |
| | RISE BY 1.5% (TO 3.365%) | 139% | 132% | 126% | 121% | 116% | 112% | 98% |
| | RISE BY 2% (TO 3.865%) | 168% | 160% | 153% | 147% | 141% | 137% | 120% |
| | RISE BY 2.5% (TO 4.365%) | 200% | 191% | 182% | 175% | 169% | 164% | 144% |
| | RISE BY 3% (TO 4.8655%) | 235% | 225% | 215% | 207% | 200% | 194% | 170% |

Fig.6A

*WHEN 10-YEAR SWAP INTEREST RATE IS USED*

| PURCHASED INTEREST RATE OPTION | EXERCISE PRICE | 5% | 6% | 7% | 8% | 11% | 15% |
|---|---|---|---|---|---|---|---|
| PERIOD: 25 YEARS, OBJECTIVE INTEREST RATE: 10-YEAR SWAP INTEREST RATE (1.32%) | PURCHASE PRICE | 4,602 | 3,223 | 2333 | 1743 | 862 | 408 |
| PRINCIPAL: 100 MILLION YEN, VOLATILITY 20% | RATIO TO PRINCIPAL | 4.6% | 3.2% | 2.3% | 1.7% | 0.9% | 0.4% |

*CURRENT PRICE AMOUNT OF PURCHASED OPTION AFTER 5 YEARS*     Unit: 1000 yen

| | RISE IN VOLATILITY | 5% | 6% | 7% | 8% | 11% | 15% |
|---|---|---|---|---|---|---|---|
| | RISE BY 0% (TO 1.32%) | 26,750 | 25,537 | 24,520 | 18,465 | 17,054 | 15,669 |
| | RISE BY 0.5% (TO 1.82%) | 32,921 | 31,442 | 30,203 | 22,006 | 20,324 | 18,678 |
| | RISE BY 1% (TO 2.32%) | 39,161 | 37,405 | 35,937 | 25,328 | 23,380 | 21,484 |
| 70 (+55) | RISE BY 1.5% (TO 2.82%) | 45,474 | 43,427 | 41,721 | 28,423 | 26,218 | 24,082 |
| | RISE BY 2% (TO 3.32%) | 51,862 | 49,519 | 47,565 | 31,296 | 28,841 | 26,473 |
| | RISE BY 2.5% (TO 3.82%) | 58,323 | 55,688 | 53,480 | 33,957 | 31,258 | 28,668 |
| | RISE BY 3% (TO 4.32%) | 64,851 | 61,939 | 59,479 | 36,419 | 33,481 | 30,675 |
| | RISE BY 0% (TO 1.32%) | 39,199 | 38,762 | 38,388 | 29,451 | 29,048 | 28,623 |
| | RISE BY 0.5% (TO 1.82%) | 46,691 | 46,139 | 45,671 | 34,395 | 33,871 | 33,325 |
| | RISE BY 1% (TO 2.32%) | 53,999 | 53,332 | 52,764 | 38,911 | 38,261 | 37,592 |
| 130 (+110) | RISE BY 1.5% (TO 2.82%) | 61,141 | 60,358 | 59,690 | 43,011 | 42,235 | 41,442 |
| | RISE BY 2% (TO 3.32%) | 68,135 | 67,239 | 66,471 | 46,723 | 45,820 | 44,904 |
| | RISE BY 2.5% (TO 3.82%) | 75,002 | 73,996 | 73,131 | 50,073 | 49,045 | 48,009 |
| | RISE BY 3% (TO 4.32%) | 81,760 | 80,650 | 79,690 | 53,092 | 51,942 | 50,787 |

Fig.6B

*PRICE RISE RATIO = CURRENT PRICE AMOUNT ÷ PURCHASE PRICE*     Unit: 1000 yen

| EXERCISE PRICE | RISE IN INTEREST RATE | 5% | 6% | 7% | 8% | 9% | 15% |
|---|---|---|---|---|---|---|---|
| | RISE BY 0% (TO 1.32%) | 5.81 | 7.92 | 10.51 | 10.59 | 19.78 | 38.40 |
| | RISE BY 0.5% (TO 1.82%) | 7.15 | 9.76 | 12.95 | 12.63 | 23.58 | 45.78 |
| | RISE BY 1% (TO 2.32%) | 8.51 | 11.61 | 15.40 | 14.53 | 27.12 | 52.66 |
| 70 (+55) | RISE BY 1.5% (TO 2.82%) | 9.88 | 13.47 | 17.88 | 16.31 | 30.42 | 59.02 |
| | RISE BY 2% (TO 3.32%) | 11.27 | 15.36 | 20.39 | 17.96 | 33.46 | 64.88 |
| | RISE BY 2.5% (TO 3.82%) | 12.67 | 17.28 | 22.92 | 19.48 | 36.26 | 70.26 |
| | RISE BY 3% (TO 4.32%) | 14.09 | 19.22 | 25.49 | 20.89 | 38.84 | 75.18 |
| | RISE BY 0% (TO 1.32%) | 8.52 | 12.03 | 16.45 | 16.90 | 33.70 | 70.15 |
| | RISE BY 0.5% (TO 1.82%) | 10.15 | 14.32 | 19.58 | 19.73 | 39.29 | 81.68 |
| | RISE BY 1% (TO 2.32%) | 11.73 | 16.55 | 22.62 | 22.32 | 44.39 | 92.14 |
| 130 (+110) | RISE BY 1.5% (TO 2.82%) | 13.29 | 18.73 | 25.59 | 24.68 | 49.00 | 101.57 |
| | RISE BY 2% (TO 3.32%) | 14.81 | 20.86 | 28.49 | 26.81 | 53.16 | 110.06 |
| | RISE BY 2.5% (TO 3.82%) | 16.30 | 22.96 | 31.35 | 28.73 | 56.90 | 117.67 |
| | RISE BY 3% (TO 4.32%) | 17.77 | 25.02 | 34.16 | 30.46 | 60.26 | 124.48 |

Fig.7A

*PRINCIPAL BALANCE AFTER 10 YEARS: 34,202 THOUSAND YEN*
*INITIAL BORROWING: 40 MILLION YEN (PAYMENT FOR 25 YEARS, INTEREST RATE 3%,*
*PRINCIPAL AND INTEREST EQUAL REPAYMENT)*

Unit: 1000 yen

| PURCHASED INTEREST RATE OPTION | EXERCISE PRICE | 5% | 6% | 7% | 8% | 11% | 15% |
|---|---|---|---|---|---|---|---|
| PERIOD: 25 YEARS, OBJECTIVE INTEREST RATE: 10-YEAR SWAP INTEREST RATE (1.32%) | PURCHASE PRICE TO 40 MILLION YEN | 1,841 | 1,289 | 933 | 697 | 345 | 163 |
| PRINCIPAL: 100 MILLION YEN, VOLATILITY 20% | RATIO TO PRINCIPAL | 4.60% | 3.22% | 2.33% | 1.74% | 0.86% | 0.41% |

| CURRENT PRICE AMOUNT OF PURCHASED OPTION AFTER 5 YEARS | | | | | | | |
|---|---|---|---|---|---|---|---|
| | RISE IN INTEREST RATE | | | | | | |
| | RISE BY 0% (TO 1.32%) | 10,700 | 10,215 | 9,808 | 7,386 | 6,822 | 6,268 |
| 70 (+55) | RISE BY 0.5% (TO 1.82%) | 13,168 | 12,577 | 12,081 | 8,802 | 8,130 | 7,471 |
| | RISE BY 1% (TO 2.32%) | 15,664 | 14,962 | 14,375 | 10,131 | 9,352 | 8,594 |
| | RISE BY 1.5% (TO 2.82%) | 18,190 | 17,371 | 16,688 | 11,369 | 10,487 | 9,633 |
| | RISE BY 2% (TO 3.32%) | 20,745 | 19,808 | 19,026 | 12,518 | 11,536 | 10,589 |
| | RISE BY 2.5% (TO 3.82%) | 23,329 | 22,275 | 21,392 | 13,583 | 12,503 | 11,467 |
| | RISE BY 3% (TO 4.32%) | 25,940 | 24,776 | 23,792 | 14,568 | 13,392 | 12,270 |
| | RISE BY 0% (TO 1.32%) | 15,680 | 15,505 | 15,355 | 11,780 | 11,619 | 11,449 |
| 130 (+110) | RISE BY 0.5% (TO 1.82%) | 18,676 | 18,456 | 18,268 | 13,758 | 13,548 | 13,330 |
| | RISE BY 1% (TO 2.32%) | 21,600 | 21,333 | 21,106 | 15,564 | 15,304 | 15,037 |
| | RISE BY 1.5% (TO 2.82%) | 24,456 | 24,143 | 23,876 | 17,204 | 16,894 | 16,577 |
| | RISE BY 2% (TO 3.32%) | 27,254 | 26,896 | 26,588 | 18,689 | 18,328 | 17,962 |
| | RISE BY 2.5% (TO 3.82%) | 30,001 | 29,598 | 29,252 | 20,029 | 19,618 | 19,204 |
| | RISE BY 3% (TO 4.32%) | 32,704 | 32,260 | 31,876 | 21,237 | 20,777 | 20,315 |

Fig.7B

*PRINCIPAL REPAYMENT RATIO = OPTION CURRENT PRICE AMOUNT ÷ PRINCIPAL*
*BALANCE AFTER 10 YEARS: 34,202 THOUSAND YEN*

Unit: 1000 yen

| EXERCISE PRICE | | 5% | 6% | 7% | 8% | 9% | 15% |
|---|---|---|---|---|---|---|---|
| | RISE IN INTEREST RATE | | | | | | |
| | RISE BY 0% (TO 1.32%) | 31% | 30% | 29% | 22% | 20% | 18% |
| 70 (+55) | RISE BY 0.5% (TO 1.82%) | 39% | 37% | 35% | 26% | 24% | 22% |
| | RISE BY 1% (TO 2.32%) | 46% | 44% | 42% | 30% | 27% | 25% |
| | RISE BY 1.5% (TO 2.82%) | 53% | 51% | 49% | 33% | 31% | 28% |
| | RISE BY 2% (TO 3.32%) | 61% | 58% | 56% | 37% | 34% | 31% |
| | RISE BY 2.5% (TO 3.82%) | 68% | 65% | 63% | 40% | 37% | 34% |
| | RISE BY 3% (TO 4.32%) | 76% | 72% | 70% | 43% | 39% | 36% |
| | RISE BY 0% (TO 1.32%) | 46% | 45% | 45% | 34% | 34% | 33% |
| 130 (+110) | RISE BY 0.5% (TO 1.82%) | 55% | 54% | 53% | 40% | 40% | 39% |
| | RISE BY 1% (TO 2.32%) | 63% | 62% | 62% | 46% | 45% | 44% |
| | RISE BY 1.5% (TO 2.82%) | 72% | 71% | 70% | 50% | 49% | 48% |
| | RISE BY 2% (TO 3.32%) | 80% | 79% | 78% | 55% | 54% | 53% |
| | RISE BY 2.5% (TO 3.82%) | 88% | 87% | 86% | 59% | 57% | 56% |
| | RISE BY 3% (TO 4.32%) | 96% | 94% | 93% | 62% | 61% | 59% |

Fig.8A

*EFFECT WHEN THE TWO OPTIONS ARE PURCHASED*

| PURCHASED INTEREST RATE OPTION | EXERCISE PRICE | 5% | 6% | 7% | 8% | 11% | 15% |
|---|---|---|---|---|---|---|---|
| PERIOD: 25 YEARS, OBJECTIVE INTEREST RATE: 10-YEAR SWAP INTEREST RATE (1.32%) | PURCHASE PRICE | 1,841 | 1,289 | 933 | 697 | 345 | 163 |
| PRINCIPAL: 100 MILLION YEN, VOLATILITY 20% | RATIO TO PRINCIPAL | 4.60% | 3.22% | 2.33% | 1.74% | 0.86% | 0.41% |

Unit: 1000 yen

*CURRENT PRICE AMOUNT OF PURCHASED OPTION AFTER 5 YEARS*

| | RISE IN INTEREST RATE | 5% | 6% | 7% | 8% | 11% | 15% |
|---|---|---|---|---|---|---|---|
| 70 (+55) | RISE BY 0% (TO 1.32%) | 21,400 | 20,430 | 19,616 | 14,772 | 13,643 | 12,535 |
| | RISE BY 0.5% (TO 1.82%) | 26,337 | 25,154 | 24,162 | 17,605 | 16,259 | 14,942 |
| | RISE BY 1% (TO 2.32%) | 31,329 | 29,924 | 28,750 | 20,262 | 18,704 | 17,187 |
| | RISE BY 1.5% (TO 2.82%) | 36,379 | 34,742 | 33,377 | 22,738 | 20,974 | 19,266 |
| | RISE BY 2% (TO 3.32%) | 41,490 | 39,615 | 38,052 | 25,037 | 23,073 | 21,178 |
| | RISE BY 2.5% (TO 3.82%) | 46,658 | 44,550 | 42,784 | 27,166 | 25,006 | 22,934 |
| | RISE BY 3% (TO 4.32%) | 51,881 | 49,551 | 47,583 | 29,135 | 26,785 | 24,540 |
| 130 (+110) | RISE BY 0% (TO 1.32%) | 31,359 | 31,010 | 30,710 | 23,561 | 23,238 | 22,898 |
| | RISE BY 0.5% (TO 1.82%) | 37,353 | 36,911 | 36,537 | 27,516 | 27,097 | 26,660 |
| | RISE BY 1% (TO 2.32%) | 43,199 | 42,666 | 42,211 | 31,129 | 30,609 | 30,074 |
| | RISE BY 1.5% (TO 2.82%) | 48,913 | 48,286 | 47,752 | 34,409 | 33,788 | 33,154 |
| | RISE BY 2% (TO 3.32%) | 54,508 | 53,791 | 53,177 | 37,378 | 36,656 | 35,923 |
| | RISE BY 2.5% (TO 3.82%) | 60,002 | 59,197 | 58,505 | 40,058 | 39,236 | 38,407 |
| | RISE BY 3% (TO 4.32%) | 65,408 | 64,520 | 63,752 | 42,474 | 41,554 | 40,630 |

Fig.8B

*PRINCIPAL REPAYMENT RATIO = OPTION CURRENT PRICE AMOUNT ÷ PRINCIPAL BALANCE AFTER 10 YEARS: 34,202 THOUSAND YEN*

Unit: 1000 yen

| EXERCISE PRICE | | 5% | 6% | 7% | 8% | 9% | 15% |
|---|---|---|---|---|---|---|---|
| | RISE IN INTEREST RATE | | | | | | |
| 70 (+55) | RISE BY 0% (TO 1.32%) | 63% | 60% | 57% | 43% | 40% | 37% |
| | RISE BY 0.5% (TO 1.82%) | 77% | 74% | 71% | 51% | 48% | 44% |
| | RISE BY 1% (TO 2.32%) | 92% | 87% | 84% | 59% | 55% | 50% |
| | RISE BY 1.5% (TO 2.82%) | 106% | 102% | 98% | 66% | 61% | 56% |
| | RISE BY 2% (TO 3.32%) | 121% | 116% | 111% | 73% | 67% | 62% |
| | RISE BY 2.5% (TO 3.82%) | 136% | 130% | 125% | 79% | 73% | 67% |
| | RISE BY 3% (TO 4.32%) | 152% | 145% | 139% | 85% | 78% | 72% |
| 130 (+110) | RISE BY 0% (TO 1.32%) | 92% | 91% | 90% | 69% | 68% | 67% |
| | RISE BY 0.5% (TO 1.82%) | 109% | 108% | 107% | 80% | 79% | 78% |
| | RISE BY 1% (TO 2.32%) | 126% | 125% | 123% | 91% | 89% | 88% |
| | RISE BY 1.5% (TO 2.82%) | 143% | 141% | 140% | 101% | 99% | 97% |
| | RISE BY 2% (TO 3.32%) | 159% | 157% | 155% | 109% | 107% | 105% |
| | RISE BY 2.5% (TO 3.82%) | 175% | 173% | 171% | 117% | 115% | 112% |
| | RISE BY 3% (TO 4.32%) | 191% | 189% | 186% | 124% | 121% | 119% |

Fig. 11A

EXAMPLE IN WHICH EXCHANGE OF JAPANESE YEN AND US DOLLAR IS USED
(WHEN YEN WEAKENS IN FUTURE)

Unit: 1000 yen

| PURCHASED EXCHANGE OPTION (DOLLAR CALL) | EXERCISE PRICE (YEN/US DOLLAR) | 110 | 120 | 130 | 140 | 150 | 160 | 170 |
|---|---|---|---|---|---|---|---|---|
| PERIOD: 25 YEARS, OBJECTIVE: YEN DOLLAR EXCHANGE (109.65 YEN/USD) | PURCHASE PRICE (JAPANESE YEN: 1000 YEN) | 4,295 | 2,036 | 1,020 | 536 | 292 | 165 | 96 |
| YEN INTEREST RATE 2.443%, US DOLLAR INTEREST RATE 9.049% | RATIO TO PRINCIPAL | 4.30% | 2.04% | 1.02% | 0.54% | 0.29% | 0.17% | 0.10% |
| PRINCIPAL: 100 US DOLLARS, VOLATILITY 9% | | | | | | | | |
| CURRENT PRICE AMOUNT (1000 YEN) OF PURCHASED OPTION AFTER 10 YEARS | | | | | | | | |
| RISE IN VOLATILITY | WHEN YEN WEAKENS | | | | | | | |
| | EXCHANGE RATE RISES BY 0% (109.65 YEN/USD) | 8,140 | 5,524 | 3,848 | 2,738 | 1,985 | 1,462 | 1,093 |
| 13 (+4) | EXCHANGE RATE RISES BY 10% (120.62 YEN/USD) | 13,642 | 9,295 | 6,506 | 4,660 | 3,402 | 2,524 | 1,899 |
| | EXCHANGE RATE RISES BY 20% (131.58 YEN/USD) | 21,592 | 14,879 | 10,460 | 7,521 | 5,516 | 4,114 | 3,112 |
| | EXCHANGE RATE RISES BY 0% (109.65 YEN/USD) | 10,245 | 7,578 | 5,716 | 4,385 | 3,419 | 2,686 | 2,140 |
| 15 (+6) | EXCHANGE RATE RISES BY 10% (120.62 YEN/USD) | 15,625 | 11,596 | 8,789 | 6,776 | 5,298 | 4,193 | 3,363 |
| | EXCHANGE RATE RISES BY 20% (131.58 YEN/USD) | 22,921 | 17,043 | 12,957 | 10,028 | 7,873 | 6,260 | 5,040 |

Fig. 11B

PRICE RISE RATIO = CURRENT PRICE AMOUNT ÷ PURCHASE PRICE

| EXERCISE PRICE (YEN/US DOLLAR) | 110 | 120 | 130 | 140 | 150 | 160 | 170 |
|---|---|---|---|---|---|---|---|
| RISE IN VOLATILITY | WHEN YEN WEAKENS | | | | | | |
| EXCHANGE RATE RISES BY 0% (109.65 YEN/USD) | 1.90 | 2.71 | 3.77 | 5.11 | 6.80 | 8.86 | 11.39 |
| 13 (+4) EXCHANGE RATE RISES BY 10% (120.62 YEN/USD) | 3.18 | 4.57 | 6.38 | 8.69 | 11.65 | 15.30 | 19.78 |
| EXCHANGE RATE RISES BY 20% (131.58 YEN/USD) | 5.03 | 7.31 | 10.25 | 14.03 | 18.89 | 24.93 | 32.42 |
| EXCHANGE RATE RISES BY 0% (109.65 YEN/USD) | 2.39 | 3.72 | 5.60 | 8.18 | 11.71 | 16.28 | 22.29 |
| 15 (+6) EXCHANGE RATE RISES BY 10% (120.62 YEN/USD) | 3.64 | 5.70 | 8.62 | 12.64 | 18.14 | 25.41 | 35.03 |
| EXCHANGE RATE RISES BY 20% (131.58 YEN/USD) | 5.34 | 8.37 | 12.70 | 18.71 | 26.96 | 37.94 | 52.50 |

Fig.12A

*PRINCIPAL BALANCE AFTER 10 YEARS: 27,346 THOUSAND YEN*
*INITIAL BORROWING: 40 MILLION YEN (PAYMENT FOR 25 YEARS, INTEREST RATE 3%, PRINCIPAL AND INTEREST EQUAL REPAYMENT)*

| PURCHASED EXCHANGE OPTION (DOLLAR CALL) | | 110 | 120 | 130 | 140 | 150 | 160 | 170 |
|---|---|---|---|---|---|---|---|---|
| PURCHASE PRICE (1000 YEN) | EXERCISE PRICE (YEN/US DOLLAR) | 1,718 | 814 | 408 | 214 | 117 | 66 | 38 |
| PERIOD: 25 YEARS, OBJECTIVE: YEN DOLLAR EXCHANGE (109.65 YEN/USD) PRINCIPAL: 100 US DOLLARS, VOLATILITY 9% | PURCHASE PRICE (1000 YEN) TO 40 MILLION YEN | | | | | | | |
| | RATIO TO PRINCIPAL | 4.30% | 2.04% | 1.02% | 0.54% | 0.29% | 0.17% | 0.10% |
| CURRENT PRICE AMOUNT (1000 YEN) OF PURCHASED OPTION AFTER 10 YEARS | | | | | | | | |
| RISE IN VOLATILITY | WHEN YEN WEAKENS | | | | | | | |
| 13 (+4) | EXCHANGE RATE RISES BY 0% (109.65 YEN/USD) | 3,256 | 2,210 | 1,539 | 1,095 | 794 | 585 | 437 |
| | EXCHANGE RATE RISES BY 10% (120.62 YEN/USD) | 5,457 | 3,718 | 2,602 | 1,864 | 1,361 | 1,010 | 760 |
| | EXCHANGE RATE RISES BY 20% (131.58 YEN/USD) | 8,637 | 5,952 | 4,184 | 3,008 | 2,206 | 1,646 | 1,245 |
| 15 (+6) | EXCHANGE RATE RISES BY 0% (109.65 YEN/USD) | 4,098 | 3,031 | 2,286 | 1,754 | 1,368 | 1,074 | 856 |
| | EXCHANGE RATE RISES BY 10% (120.62 YEN/USD) | 6,250 | 4,638 | 3,516 | 2,710 | 2,119 | 1,677 | 1,345 |
| | EXCHANGE RATE RISES BY 20% (131.58 YEN/USD) | 9,168 | 6,817 | 5,183 | 4,011 | 3,149 | 2,504 | 2,016 |

Fig.12B

*PRINCIPAL REPAYMENT RATIO = OPTION TIME VALUE AMOUNT ÷ PRINCIPAL BALANCE AFTER 10 YEARS: 27,346 THOUSAND YEN*

| EXERCISE PRICE (YEN/US DOLLAR) | | 110 | 120 | 130 | 140 | 150 | 160 | 170 |
|---|---|---|---|---|---|---|---|---|
| RISE IN VOLATILITY | WHEN YEN WEAKENS | | | | | | | |
| 13 (+4) | EXCHANGE RATE RISES BY 0% (109.65 YEN/USD) | 12% | 8% | 6% | 4% | 3% | 2% | 2% |
| | EXCHANGE RATE RISES BY 10% (120.62 YEN/USD) | 20% | 14% | 10% | 7% | 5% | 4% | 3% |
| | EXCHANGE RATE RISES BY 20% (131.58 YEN/USD) | 32% | 22% | 15% | 11% | 8% | 6% | 5% |
| 15 (+6) | EXCHANGE RATE RISES BY 0% (109.65 YEN/USD) | 15% | 11% | 8% | 6% | 5% | 4% | 3% |
| | EXCHANGE RATE RISES BY 10% (120.62 YEN/USD) | 23% | 17% | 13% | 10% | 8% | 6% | 5% |
| | EXCHANGE RATE RISES BY 20% (131.58 YEN/USD) | 34% | 25% | 19% | 15% | 12% | 9% | 7% |

Fig. 13A

*EFFECT WHEN THE TWO OPTIONS ARE PURCHASED*

| PURCHASED EXCHANGE OPTION (DOLLAR CALL) | EXERCISE PRICE (YEN/US DOLLAR) | 110 | 120 | 130 | 140 | 150 | 160 | 170 |
|---|---|---|---|---|---|---|---|---|
| PERIOD: 25 YEARS, OBJECTIVE: YEN DOLLAR EXCHANGE (109.85 YEN/USD) | PURCHASE PRICE (1000 YEN) | 3,436 | 1,629 | 816 | 429 | 234 | 132 | 77 |
| PRINCIPAL: 100 US DOLLARS, VOLATILITY 9% | RATIO TO PRINCIPAL | 8.59% | 4.07% | 2.04% | 1.07% | 0.58% | 0.33% | 0.19% |
| CURRENT PRICE AMOUNT (1000 YEN) OF PURCHASED OPTION AFTER 10 YEARS | | | | | | | | |
| RISE IN VOLATILITY | WHEN YEN WEAKENS | | | | | | | |
| 13 | EXCHANGE RATE RISES BY 0% (109.85 YEN/USD) | 6,512 | 4,419 | 3,078 | 2,190 | 1,588 | 1,170 | 874 |
|  | EXCHANGE RATE RISES BY 10% (120.62 YEN/USD) | 10,914 | 7,436 | 5,205 | 3,728 | 2,722 | 2,019 | 1,519 |
| (+4) | EXCHANGE RATE RISES BY 20% (131.58 YEN/USD) | 17,274 | 11,903 | 8,368 | 6,017 | 4,413 | 3,291 | 2,490 |
| 15 | EXCHANGE RATE RISES BY 0% (109.85 YEN/USD) | 8,196 | 6,062 | 4,573 | 3,508 | 2,735 | 2,149 | 1,712 |
|  | EXCHANGE RATE RISES BY 10% (120.62 YEN/USD) | 12,500 | 9,277 | 7,031 | 5,421 | 4,238 | 3,354 | 2,690 |
| (+6) | EXCHANGE RATE RISES BY 20% (131.58 YEN/USD) | 18,337 | 13,634 | 10,366 | 8,022 | 6,298 | 5,008 | 4,032 |

Fig. 13B

*PRINCIPAL REPAYMENT RATIO = OPTION TIME VALUE AMOUNT + PRINCIPAL BALANCE AFTER 10 YEARS: 27,346 THOUSAND YEN*

| EXERCISE PRICE (YEN/US DOLLAR) | 110 | 120 | 130 | 140 | 150 | 160 | 170 |
|---|---|---|---|---|---|---|---|
| RISE IN VOLATILITY | | | | | | | |
| WHEN YEN WEAKENS | | | | | | | |
| EXCHANGE RATE RISES BY 0% (109.85 YEN/USD) | 24% | 16% | 11% | 8% | 6% | 4% | 3% |
| 13 — EXCHANGE RATE RISES BY 10% (120.62 YEN/USD) | 40% | 27% | 19% | 14% | 10% | 7% | 6% |
| (+4) EXCHANGE RATE RISES BY 20% (131.58 YEN/USD) | 63% | 44% | 31% | 22% | 16% | 12% | 9% |
| EXCHANGE RATE RISES BY 0% (109.85 YEN/USD) | 30% | 22% | 17% | 13% | 10% | 8% | 6% |
| 15 — EXCHANGE RATE RISES BY 10% (120.62 YEN/USD) | 46% | 34% | 26% | 20% | 15% | 12% | 10% |
| (+6) EXCHANGE RATE RISES BY 20% (131.58 YEN/USD) | 67% | 50% | 38% | 29% | 23% | 18% | 15% |

Fig.15A

*WHEN NY DOW IS USED (WHEN DOWN IN FUTURE)*

| PURCHASED STOCK PRICE OPTION (PUT) | EXERCISE PRICE (US DOLLAR) | 9,000 | 8,000 | 7,000 | 6,000 | 5,000 | 4,000 |
|---|---|---|---|---|---|---|---|
| PERIOD: 25 YEARS, OBJECTIVE: NY DOW (10,240 USD) | PURCHASE PRICE (US DOLLAR) | 41,100 | 22,000 | 10,600 | 4,500 | 1,600 | 400 |
| PRINCIPAL: ONE MILLION US DOLLARS, VOLATILITY 12% | RATIO TO PRINCIPAL | 4.11% | 2.20% | 1.06% | 0.45% | 0.16% | 0.04% |

*CURRENT PRICE AMOUNT OF PURCHASED OPTION AFTER 10 YEARS*     Unit: US dollar

| RISE IN VOLATILITY | WHEN NY DOW DROPS | | | | | | |
|---|---|---|---|---|---|---|---|
| 30 (+18) | DOW DROPS BY 0% (10,240 USD) | 220,500 | 175,800 | 135,700 | 100,300 | 69,700 | 44,300 |
|  | DOW DROPS BY 10% (9,216 USD) | 246,800 | 197,500 | 153,100 | 113,800 | 79,700 | 51,100 |
|  | DOW DROPS BY 20% (8,192 USD) | 278,600 | 224,000 | 174,500 | 130,500 | 92,200 | 59,700 |
| 50 (+38) | DOW DROPS BY 0% (10,240 USD) | 398,800 | 339,400 | 282,600 | 228,600 | 177,600 | 130,200 |
|  | DOW DROPS BY 10% (9,216 USD) | 416,900 | 355,300 | 296,200 | 239,900 | 186,700 | 137,200 |
|  | DOW DROPS BY 20% (8,192 USD) | 438,000 | 373,600 | 311,800 | 253,000 | 197,300 | 145,300 |

Fig.15B

*PRICE RISE RATIO = CURRENT PRICE AMOUNT ÷ PURCHASE PRICE*

| EXERCISE PRICE (US DOLLAR) | | 9,000 | 8,000 | 7,000 | 6,000 | 5,000 | 4,000 |
|---|---|---|---|---|---|---|---|
| RISE IN VOLATILITY | WHEN NY DOW DROPS | | | | | | |
| 30 (+18) | DOW DROPS BY 0% (10,240 USD) | 5.36 | 7.99 | 12.80 | 22.29 | 43.56 | 110.75 |
|  | DOW DROPS BY 10% (9,216 USD) | 6.00 | 8.98 | 14.44 | 25.29 | 49.81 | 127.75 |
|  | DOW DROPS BY 20% (8,192 USD) | 6.78 | 10.18 | 16.46 | 29.00 | 57.63 | 149.25 |
| 50 (+38) | DOW DROPS BY 0% (10,240 USD) | 9.70 | 15.43 | 26.66 | 50.80 | 111.00 | 325.50 |
|  | DOW DROPS BY 10% (9,216 USD) | 10.14 | 16.15 | 27.94 | 53.31 | 116.69 | 343.00 |
|  | DOW DROPS BY 20% (8,192 USD) | 10.66 | 16.98 | 29.42 | 56.22 | 123.31 | 363.25 |

Fig.16A

PRINCIPAL BALANCE AFTER 10 YEARS: 290,634 DOLLAR
INITIAL BORROWING: 400 THOUSAND DOLLARS (PAYMENT FOR 25 YEARS, INTEREST RATE 3%, PRINCIPAL AND INTEREST EQUAL REPAYMENT)

Unit: US dollar

| PURCHASED STOCK PRICE OPTION (PUT) | EXERCISE PRICE (US DOLLAR) | 9,000 | 8,000 | 7,000 | 6,000 | 5,000 | 4,000 |
|---|---|---|---|---|---|---|---|
| PERIOD: 25 YEARS, OBJECTIVE: NY DOW (10,240 USD) | PURCHASE PRICE (US DOLLAR) | 16,440 | 8,800 | 4,240 | 1,800 | 640 | 160 |
| PRINCIPAL: ONE MILLION US DOLLARS, VOLATILITY 12% | RATIO TO PRINCIPAL | 4.11% | 2.20% | 1.06% | 0.45% | 0.16% | 0.04% |
| CURRENT PRICE AMOUNT OF PURCHASED OPTION AFTER 10 YEARS | | | | | | | |
| RISE IN VOLATILITY | WHEN NY DOW DROPS | | | | | | |
| | DOW DROPS BY 0% (10,240 USD) | 88,200 | 70,320 | 54,280 | 40,120 | 27,880 | 17,720 |
| | DOW DROPS BY 10% (9,216 USD) | 98,720 | 79,000 | 61,240 | 45,520 | 31,880 | 20,440 |
| | DOW DROPS BY 20% (8,192 USD) | 111,440 | 89,600 | 69,800 | 52,200 | 36,880 | 23,880 |
| 30 (+18) | DOW DROPS BY 0% (10,240 USD) | 159,520 | 135,760 | 113,040 | 91,440 | 71,040 | 52,080 |
| | DOW DROPS BY 10% (9,216 USD) | 166,760 | 142,120 | 118,480 | 95,960 | 74,680 | 54,880 |
| 50 (+38) | DOW DROPS BY 20% (8,192 USD) | 175,200 | 149,440 | 124,720 | 101,200 | 78,920 | 58,120 |

Fig.16B

PRINCIPAL REPAYMENT RATIO = OPTION CURRENT VALUE AMOUNT ÷ PRINCIPAL
BALANCE AFTER 10 YEARS: 290,634 DOLLARS

| EXERCISE PRICE (US DOLLAR) | | 9,000 | 8,000 | 7,000 | 6,000 | 5,000 | 4,000 |
|---|---|---|---|---|---|---|---|
| RISE IN VOLATILITY | When NY Dow-Jones falls | | | | | | |
| | DOW DROPS BY 0% (10,240 USD) | 30% | 24% | 19% | 14% | 10% | 6% |
| | DOW DROPS BY 10% (9,216 USD) | 34% | 27% | 21% | 16% | 11% | 7% |
| | DOW DROPS BY 20% (8,192 USD) | 38% | 31% | 24% | 18% | 13% | 8% |
| 30 (+18) | DOW DROPS BY 0% (10,240 USD) | 55% | 47% | 39% | 31% | 24% | 18% |
| | DOW DROPS BY 10% (9,216 USD) | 57% | 49% | 41% | 33% | 26% | 19% |
| 50 (+38) | DOW DROPS BY 20% (8,192 USD) | 60% | 51% | 43% | 35% | 27% | 20% |

Fig.17A

EFFECT WHEN THE TWO OPTIONS ARE PURCHASED

Unit: US dollar

| PURCHASED STOCK PRICE OPTION (PUT) | | | | | | | |
|---|---|---|---|---|---|---|---|
| PERIOD: 25 YEARS, OBJECTIVE: NY DOW (10,240 USD) | | | | | | | |
| PRINCIPAL: ONE MILLION US DOLLARS, VOLATILITY 12% | | | | | | | |
| EXERCISE PRICE (US DOLLAR) | | 9,000 | 8,000 | 7,000 | 6,000 | 5,000 | 4,000 |
| PURCHASE PRICE (US DOLLAR) | | 32,880 | 17,600 | 8,480 | 3,600 | 1,280 | 320 |
| RATIO TO PRINCIPAL | | 82.20% | 44.00% | 21.20% | 9.00% | 3.20% | 0.80% |
| CURRENT PRICE AMOUNT OF PURCHASED OPTION AFTER 10 YEARS | | | | | | | |
| RISE IN VOLATILITY | WHEN NY DOW DROPS | | | | | | |
| 30 (+18) | DOW DROPS BY 0% (10,240 USD) | 176,400 | 140,640 | 108,560 | 80,240 | 55,760 | 35,440 |
|  | DOW DROPS BY 10% (9,216 USD) | 197,440 | 158,000 | 122,480 | 91,040 | 63,760 | 40,880 |
|  | DOW DROPS BY 20% (8,192 USD) | 222,880 | 179,200 | 139,600 | 104,400 | 73,760 | 47,760 |
| 50 (+38) | DOW DROPS BY 0% (10,240 USD) | 319,040 | 271,520 | 226,080 | 182,880 | 142,080 | 104,160 |
|  | DOW DROPS BY 10% (9,216 USD) | 333,520 | 284,240 | 236,960 | 191,920 | 149,360 | 109,760 |
|  | DOW DROPS BY 20% (8,192 USD) | 350,400 | 298,880 | 249,440 | 202,400 | 157,840 | 116,240 |

Fig.17B

PRINCIPAL REPAYMENT RATIO = OPTION CURRENT VALUE AMOUNT ÷ PRINCIPAL
BALANCE AFTER 10 YEARS: 290,634 DOLLARS

| EXERCISE PRICE (US DOLLAR) | | 9,000 | 8,000 | 7,000 | 6,000 | 5,000 | 4,000 |
|---|---|---|---|---|---|---|---|
| RISE IN VOLATILITY | WHEN NY DOW DROPS | | | | | | |
| 30 (+18) | DOW DROPS BY 0% (10,240 USD) | 61% | 48% | 37% | 28% | 19% | 12% |
|  | DOW DROPS BY 10% (9,216 USD) | 68% | 54% | 42% | 31% | 22% | 14% |
|  | DOW DROPS BY 20% (8,192 USD) | 77% | 62% | 48% | 36% | 25% | 16% |
| 50 (+38) | DOW DROPS BY 0% (10,240 USD) | 110% | 93% | 78% | 63% | 49% | 36% |
|  | DOW DROPS BY 10% (9,216 USD) | 115% | 98% | 82% | 66% | 51% | 38% |
|  | DOW DROPS BY 20% (8,192 USD) | 121% | 103% | 86% | 70% | 54% | 40% |

Fig. 19A

| Date | DOW: CLOSING PRICE | DOW: VOLATILITY |
|---|---|---|
| 1980/1 | 875.85 | 17.71% |
| 1980/2 | 854.44 | 9.81% |
| ⋮ | ⋮ | ⋮ |
| 1996/8 | 5,616.21 | 6.04% |
| 1996/9 | 5,882.17 | 9.93% |
| 1996/10 | 6,029.38 | 9.95% |
| 1996/11 | 6,521.70 | 9.67% |
| 1996/12 | 6,448.27 | 13.07% |
| 1997/1 | 6,813.09 | 13.46% |
| 1997/2 | 6,877.74 | 14.25% |
| 1997/3 | 6,583.48 | 14.33% |
| 1997/4 | 7,008.99 | 16.99% |
| 1997/5 | 7,331.04 | 16.25% |
| 1997/6 | 7,672.79 | 16.66% |
| ⋮ | ⋮ | ⋮ |
| 1998/10 | 8,592.10 | 38.18% |
| 1998/11 | 9,116.55 | 40.08% |
| 1998/12 | 9,181.43 | 12.23% |
| 1999/1 | 9,358.83 | 13.34% |
| 1999/2 | 9,306.58 | 9.72% |
| 1999/3 | 9,786.16 | 8.29% |

Fig. 19B

| Date | DOW: CLOSING PRICE | DOW: VOLATILITY |
|---|---|---|
| 2000/5 | 10,522.33 | 21.87% |
| 2000/6 | 10,447.89 | 15.75% |
| 2000/7 | 10,521.98 | 4.24% |
| 2000/8 | 11,215.10 | 12.78% |
| 2000/9 | 10,650.92 | 16.49% |
| 2000/10 | 10,971.14 | 16.81% |
| 2000/11 | 10,414.49 | 20.29% |
| 2000/12 | 10,786.85 | 16.86% |
| ⋮ | ⋮ | ⋮ |
| 2001/11 | 9,851.56 | 30.47% |
| 2001/12 | 10,021.50 | 29.29% |
| 2002/1 | 9,920.00 | 13.43% |
| 2002/2 | 10,106.13 | 13.54% |
| 2002/3 | 10,403.94 | 5.80% |
| 2002/4 | 9,946.22 | 11.49% |
| 2002/5 | 9,925.25 | 11.34% |
| 2002/6 | 9,243.26 | 15.43% |
| 2002/7 | 8,736.59 | 10.29% |
| 2002/8 | 8,663.50 | 11.92% |
| 2002/9 | 7,591.93 | 17.66% |
| 2002/10 | 8,397.03 | 33.79% |
| 2002/11 | 8,896.09 | 35.16% |
| 2002/12 | 8,341.63 | 37.26% |
| 2003/1 | 8,053.81 | 26.83% |
| 2003/2 | 7,891.08 | 18.07% |
| 2003/3 | 7,992.13 | 11.10% |
| 2003/4 | 8,480.09 | 14.50% |
| 2003/5 | 8,850.26 | 12.15% |
| 2003/6 | 8,985.44 | 7.78% |

FIG.20A

CALL OPTION

| Date | | |
|---|---|---|
| NOV-96 (TIME OF PURCHASE) | NY DOW | 6,521US dollars |
| | VOLATILITY | 9.67 |
| | NOTIONAL PRINCIPAL | 250,000US dollars |
| | STRIKE (EXERCISE PRICE) | 15,000US dollars |
| | EXERCISE PERIOD | 25 years |
| | PURCHASE PRICE (RATIO TO NOTIONAL PRINCIPAL) | 5,500US dollars (2.2%) |
| | PURCHASE NUMBER OF OPTIONS | Two sheets |
| Nov-98 | NY DOW | 9,116US dollars |
| | VOLATILITY | 40.08 |
| | NOTIONAL PRINCIPAL | 250,000US dollars |
| | STRIKE (EXERCISE PRICE) | 15,000US dollars |
| | EXERCISE PERIOD | 25 years |
| | CURRENT VALUE AMOUNT | 96,700US dollars |
| | PURCHASE NUMBER OF OPTIONS | Two sheets |
| | COLLECTED AMOUNT (RATIO TO NOTIONAL PRINCIPAL) | 193,400US dollars (77%) |

FIG.20B

PUT OPTION

| Date | | |
|---|---|---|
| AUG-00 (TIME OF PURCHASE) | NY DOW | 11,215US dollars |
| | VOLATILITY | 12.78 |
| | NOTIONAL PRINCIPAL | 250,000US dollars |
| | STRIKE (EXERCISE PRICE) | 8,000US dollars |
| | EXERCISE PERIOD | 25 years |
| | PURCHASE PRICE (RATIO TO NOTIONAL PRINCIPAL) | 1267.5US dollars (0.51%) |
| | PURCHASE NUMBER OF OPTIONS | Ten sheets |
| Dec-02 | NY DOW | 8,341US dollars |
| | VOLATILITY | 37.26 |
| | NOTIONAL PRINCIPAL | 250,000US dollars |
| | STRIKE (EXERCISE PRICE) | 8,000US dollars |
| | EXERCISE PERIOD | 25 years |
| | CURRENT VALUE AMOUNT | 44,075US dollars |
| | PURCHASE NUMBER OF OPTIONS | Ten sheets |
| | COLLECTED AMOUNT (RATIO TO NOTIONAL PRINCIPAL) | 440,750US dollars (176%) |

Fig.21A
*WHEN NY DOW IS USED (WHEN DOWN IN FUTURE)*

| | | | | | | | Unit: US dollar |
|---|---|---|---|---|---|---|---|
| PURCHASED STOCK PRICE OPTION (PUT) | EXERCISE PRICE (US DOLLAR) | 9,000 | 8,000 | 7,000 | 6,000 | 5,000 | 4,000 |
| PERIOD: 25 YEARS, OBJECTIVE: NY DOW (10,240 USD) | PURCHASE PRICE (US DOLLAR) | 210 | 106 | 44 | 14 | 3 | 0.393 |
| PRINCIPAL: TEN THOUSAND US DOLLARS, VOLATILITY 12% | RATIO TO PRINCIPAL | 2.10% | 1.06% | 0.44% | 0.14% | 0.03% | 0.004% |

| CURRENT PRICE AMOUNT OF PURCHASED OPTION AFTER 3 YEARS | | | | | | | |
|---|---|---|---|---|---|---|---|
| RISE IN VOLATILITY | WHEN NY DOW DROPS | | | | | | |
| | DOW DROPS BY 0% (10,240 USD) | 1,484 | 1,116 | 795 | 524 | 310 | 155 |
| 30 | DOW DROPS BY 10% (9,216 USD) | 1,739 | 1,327 | 960 | 646 | 391 | 201 |
| (+18) | DOW DROPS BY 20% (8,192 USD) | 2,048 | 1,585 | 1,167 | 802 | 500 | 266 |
| | DOW DROPS BY 0% (10,240 USD) | 2,833 | 2,342 | 1,878 | 1,444 | 1,046 | 695 |
| 50 | DOW DROPS BY 10% (9,216 USD) | 3,039 | 2,524 | 2,034 | 1,573 | 1,150 | 771 |
| (+38) | DOW DROPS BY 20% (8,192 USD) | 3,273 | 2,732 | 2,214 | 1,725 | 1,271 | 862 |

Fig.21B
*PRICE RISE RATIO = CURRENT PRICE AMOUNT ÷ PURCHASE PRICE*

| EXERCISE PRICE | | 9,000 | 8,000 | 7,000 | 6,000 | 5,000 | 4,000 |
|---|---|---|---|---|---|---|---|
| RISE IN VOLATILITY | WHEN NY DOW DROPS | | | | | | |
| | DOW DROPS BY 0% (10,240 USD) | 7.07 | 10.53 | 18.07 | 37.43 | 103.33 | 394.40 |
| 30 | DOW DROPS BY 10% (9,216 USD) | 8.28 | 12.52 | 21.82 | 46.14 | 130.33 | 511.45 |
| (+18) | DOW DROPS BY 20% (8,192 USD) | 9.75 | 14.95 | 26.52 | 57.29 | 166.67 | 676.84 |
| | DOW DROPS BY 0% (10,240 USD) | 13.49 | 22.09 | 42.68 | 103.14 | 348.67 | 1,768.45 |
| 50 | DOW DROPS BY 10% (9,216 USD) | 14.47 | 23.81 | 46.23 | 112.36 | 383.33 | 1,961.83 |
| (+38) | DOW DROPS BY 20% (8,192 USD) | 15.59 | 25.77 | 50.32 | 123.21 | 423.67 | 2,193.38 |

Fig.22A

LEASE DEBT BALANCE AFTER 3 YEARS: 140 THOUSAND DOLLARS
INITIAL LEASE REMAINDER: 200 THOUSAND DOLLARS 10-YEAR LEASE

Unit: US dollar

| PURCHASED STOCK PRICE OPTION (PUT) | EXERCISE PRICE (US DOLLAR) | 9,000 | 8,000 | 7,000 | 6,000 | 5,000 | 4,000 |
|---|---|---|---|---|---|---|---|
| PERIOD: 25 YEARS, OBJECTIVE: NY DOW (10,240 USD) | PURCHASE PRICE (US DOLLAR) TO 200 THOUSAND DOLLARS | 4,200 | 2,120 | 880 | 280 | 60 | 8 |
| PRINCIPAL: TEN THOUSAND US DOLLARS, VOLATILITY 12% | RATIO TO PRINCIPAL | 1.05% | 0.53% | 0.22% | 0.07% | 0.02% | 0.00% |
| | NUMBER OF OPTIONS WHEN A PURCHASE OF 10 THOUSAND DOLLARS IS MADE | 2 | 4 | 11 | 35 | 166 | 1,272 |

| CURRENT PRICE AMOUNT OF PURCHASED OPTION AFTER 3 YEARS | | | | | | | |
|---|---|---|---|---|---|---|---|
| RISE IN VOLATILITY | WHEN NY DOW DROPS | | | | | | |
| | DOW DROPS BY 0% (10,240 USD) | 59,360 | 89,280 | 174,900 | 366,800 | 1,029,200 | 3,943,200 |
| 30 | DOW DROPS BY 10% (9,216 USD) | 69,560 | 106,160 | 211,200 | 452,200 | 1,298,120 | 5,113,440 |
| (+18) | DOW DROPS BY 20% (8,192 USD) | 81,920 | 126,800 | 256,740 | 561,400 | 1,660,000 | 6,767,040 |
| | DOW DROPS BY 0% (10,240 USD) | 113,320 | 187,360 | 413,160 | 1,010,800 | 3,472,720 | 17,680,800 |
| 50 | DOW DROPS BY 10% (9,216 USD) | 121,560 | 201,920 | 447,480 | 1,101,100 | 3,818,000 | 19,614,240 |
| (+38) | DOW DROPS BY 20% (8,192 USD) | 130,920 | 218,560 | 487,080 | 1,207,500 | 4,219,720 | 21,929,280 |

Fig.22B

PRINCIPAL REPAYMENT RATIO = OPTION TIME VALUE AMOUNT + LEASE DEBT
BALANCE AFTER 3 YEARS: 140 THOUSAND DOLLARS

| EXERCISE PRICE | | 9,000 | 8,000 | 7,000 | 6,000 | 5,000 | 4,000 |
|---|---|---|---|---|---|---|---|
| RISE IN VOLATILITY | WHEN NY DOW DROPS | | | | | | |
| | DOW DROPS BY 0% (10,240 USD) | 42% | 64% | 125% | 262% | 735% | 2817% |
| 30 | DOW DROPS BY 10% (9,216 USD) | 50% | 76% | 151% | 323% | 927% | 3652% |
| (+18) | DOW DROPS BY 20% (8,192 USD) | 59% | 91% | 183% | 401% | 1186% | 4834% |
| | DOW DROPS BY 0% (10,240 USD) | 81% | 134% | 295% | 722% | 2481% | 12629% |
| 50 | DOW DROPS BY 10% (9,216 USD) | 87% | 144% | 320% | 787% | 2727% | 14010% |
| (+38) | DOW DROPS BY 20% (8,192 USD) | 94% | 156% | 348% | 863% | 3014% | 15664% |

Fig.23

| REMAINING PRINCIPAL OF LOAN | US$220,195 | (INITIAL LEASE CONTRACT 250 THOUSAND |
| --- | --- | --- |
| LOAN REMAINING PERIOD | 20 | INITIAL LEASE PERIOD 25 YEARS |
| INTEREST RATE APPLIED TO REMAINING PRINCIPAL OF LOAN | 4.65% | |
| 20-YEAR INTEREST RATE AT ANTICIPATION | 12.00% | (THIS IS USED AS REFERENCE INTEREST |
| 10-YEAR INTEREST RATE AT ANTICIPATION | 12.00% | (THIS IS USED AS REFERENCE INTEREST |
| 1-YEAR INTEREST RATE AT ANTICIPATION | 8.00% | (THIS IS USED AS REFERENCE INTEREST |
| FORWARD OF INTEREST RATE IS CONSIDERED TO BE STRAIGHT LINE BY USING THE INTEREST RATE | | |

| NUMBER OF MONTHS | YIELD CURVE | LOAN REPAYMENT AMOUNT | PRESENT VALUE OF LOAN REPAYMENT AMOUNT |
| --- | --- | --- | --- |
| | | US$220,195 | US$134,837 |
| 1 | 8.000% | US$1,411 | US$1,402 |
| 2 | 8.034% | US$1,411 | US$1,392 |
| 3 | 8.067% | US$1,411 | US$1,383 |
| 4 | 8.101% | US$1,411 | US$1,373 |
| 5 | 8.134% | US$1,411 | US$1,364 |
| 6 | 8.168% | US$1,411 | US$1,355 |
| 7 | 8.202% | US$1,411 | US$1,345 |
| 8 | 8.235% | US$1,411 | US$1,336 |
| 9 | 8.269% | US$1,411 | US$1,326 |
| 10 | 8.303% | US$1,411 | US$1,317 |
| 11 | 8.336% | US$1,411 | US$1,307 |
| 12 | 8.370% | US$1,411 | US$1,298 |
| 120 | 12.000% | US$1,411 | US$428 |
| 240 | 12.000% | US$1,411 | US$130 |

FIG. 25

| | | | |
|---|---|---|---|
| TIME OF PURCHASE | INTEREST RATE | 4.65% | |
| | VOLATILITY | 3.488 | |
| | NOTIONAL PRINCIPAL | 250,000US dollars | |
| | STRIKE (EXERCISE PRICE) | 15,000US dollars | |
| | EXERCISE PERIOD | 25years | |
| | PURCHASE PRICE | 3,488US dollars | |
| | PURCHASE NUMBER OF OPTIONS | 3 | |
| AFTER 5 YEARS | INTEREST RATE | 9.65% | 9.65% |
| | VOLATILITY | 10 | 20 |
| | CURRENT PRICE VALUE | 31,727US dollars | 49,836US dollars |
| | PURCHASE NUMBER OF OPTIONS | 3 | 3 |
| | PROFIT | 95,181US dollars | 149,509US dollars |

Fig.26

PRINCIPAL AND INTEREST EQUAL REPAYMENT SPECIFICATION LIST

| BORROWED AMOUNT | PREPAYMENT AMOUNT | BORROWING RATE | NUMBER OF SCHEDULED PAYMENTS |
|---|---|---|---|
| 200,000 | 1,931 | 3.00% | 120 |

| NUMBER OF TIMES | PRINCIPAL | AGREED INTEREST | REPAYMENT AMOUNT | BALANCE OF MONEY LOANS | REPAYMENT BALANCE |
|---|---|---|---|---|---|
| 1 | 1,431 | 500 | 1,931 | 198,569 | 229,815 |
| 2 | 1,435 | 496 | 1,931 | 197,134 | 227,883 |
| 3 | 1,438 | 493 | 1,931 | 195,696 | 225,952 |
| 4 | 1,442 | 489 | 1,931 | 194,254 | 224,021 |
| 5 | 1,446 | 486 | 1,931 | 192,808 | 222,090 |
| 6 | 1,449 | 482 | 1,931 | 191,359 | 220,158 |
| 7 | 1,453 | 478 | 1,931 | 189,906 | 218,227 |
| 8 | 1,456 | 475 | 1,931 | 188,450 | 216,296 |
| 9 | 1,460 | 471 | 1,931 | 186,990 | 214,365 |
| 10 | 1,464 | 467 | 1,931 | 185,526 | 212,434 |
| 11 | 1,467 | 464 | 1,931 | 184,058 | 210,502 |
| 12 | 1,471 | 460 | 1,931 | 182,587 | 208,571 |
| 13 | 1,475 | 456 | 1,931 | 181,113 | 206,640 |
| 14 | 1,478 | 453 | 1,931 | 179,634 | 204,709 |
| 15 | 1,482 | 449 | 1,931 | 178,152 | 202,778 |
| ... | ... | ... | ... | ... | ... |
| 57 | 1,646 | 285 | 1,931 | 112,439 | 121,667 |
| 58 | 1,650 | 281 | 1,931 | 110,789 | 119,735 |
| 59 | 1,654 | 277 | 1,931 | 109,135 | 117,804 |
| 60 | 1,658 | 273 | 1,931 | 107,477 | 115,873 |
| 61 | 1,663 | 269 | 1,931 | 105,814 | 113,942 |
| 62 | 1,667 | 265 | 1,931 | 104,147 | 112,010 |
| 63 | 1,671 | 260 | 1,931 | 102,477 | 110,079 |
| ... | ... | ... | ... | ... | ... |
| 117 | 1,912 | 19 | 1,931 | 5,765 | 5,794 |
| 118 | 1,917 | 14 | 1,931 | 3,848 | 3,862 |
| 119 | 1,922 | 10 | 1,931 | 1,926 | 1,931 |
| 120 | 1,926 | 5 | 1,931 | 0 | 0 |
|  | 200,000 | 31,746 | 231,746 |  |  |

Fig.27

| REMAINING PRINCIPAL OF LEASE | US$115,873 (INITIAL LEASE CONTRACT 200 THOUSAND DOLLARS) |
|---|---|
| LOAN REMAINING PERIOD | 5 INITIAL LEASE PERIOD 10 YEARS |
| EREST RATE APPLIED TO REMAINING PRINCIPAL OF LEASE | 3.00% |
| 20-YEAR INTEREST RATE AT ANTICIPATION | 12.00% (THIS IS USED AS REFERENCE INTEREST RATE) |
| 10-YEAR INTEREST RATE AT ANTICIPATION | 12.00% (THIS IS USED AS REFERENCE INTEREST RATE) |
| 1-YEAR INTEREST RATE AT ANTICIPATION | 8.00% (THIS IS USED AS REFERENCE INTEREST RATE) |
| FORWARD OF INTEREST RATE IS CONSIDERED TO BE STRAIGHT LINE BY USING THE INTEREST RATE | |

| NUMBER OF MONTHS | YIELD CURVE | LEASE REPAYMENT AMOUNT | PRESENT VALUE OF LOAN REPAYMENT AMOUNT |
|---|---|---|---|
| | | US$115,873 | US$89,780 |
| 1 | 8.000% | US$1,931 | US$1,918 |
| 2 | 8.068% | US$1,931 | US$1,905 |
| 3 | 8.136% | US$1,931 | US$1,892 |
| 4 | 8.203% | US$1,931 | US$1,879 |
| 5 | 8.271% | US$1,931 | US$1,866 |
| 6 | 8.339% | US$1,931 | US$1,852 |
| 7 | 8.407% | US$1,931 | US$1,839 |
| 8 | 8.475% | US$1,931 | US$1,825 |
| 9 | 8.542% | US$1,931 | US$1,812 |
| 10 | 8.610% | US$1,931 | US$1,798 |
| 11 | 8.678% | US$1,931 | US$1,784 |
| 12 | 8.746% | US$1,931 | US$1,770 |
| 60 | 12.000% | US$1,931 | US$1,063 |

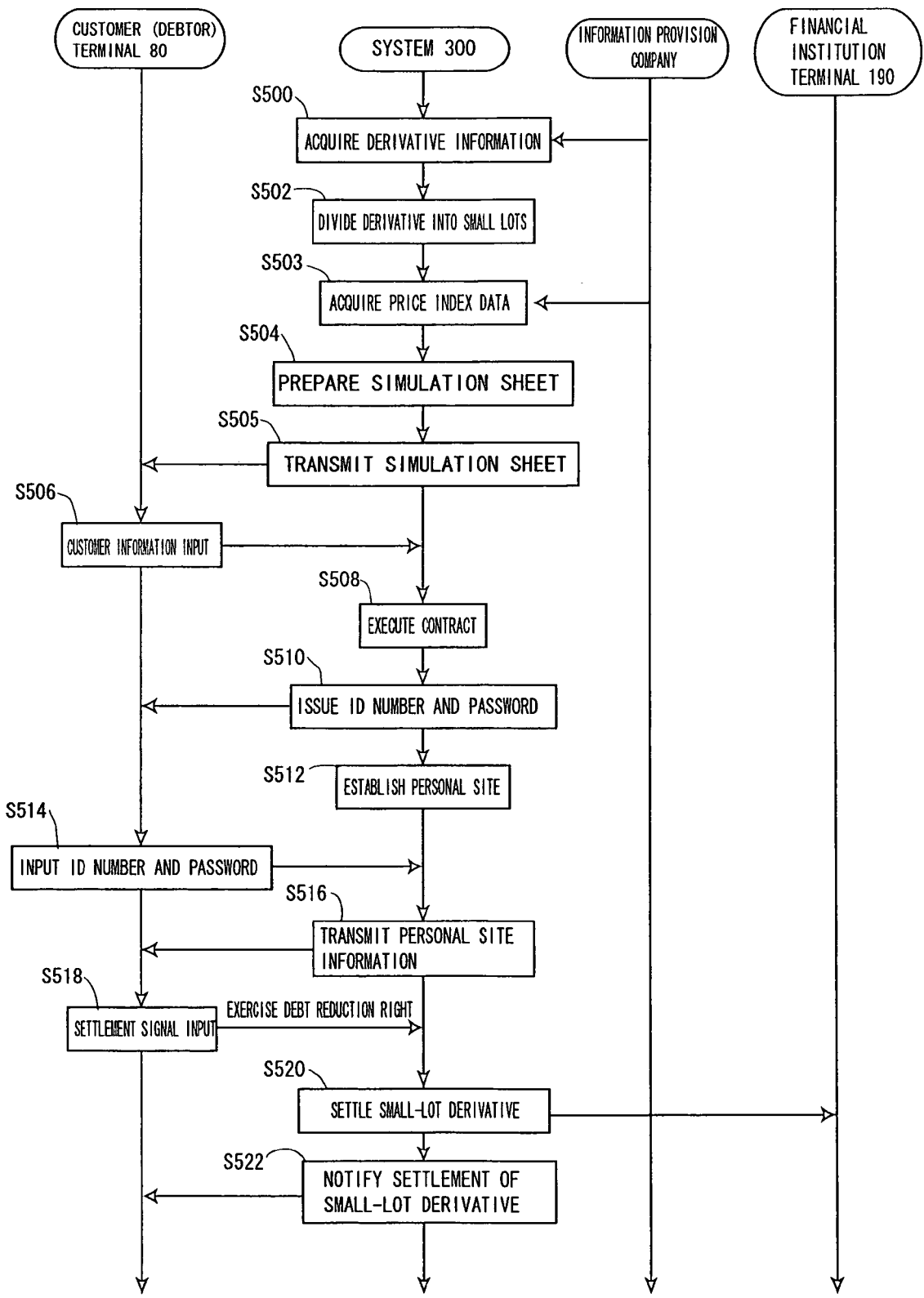

DEBT REDUCTION METHOD AND DEVICE THEREOF

BACKGROUND OF THE INVENTION

The present invention relates to a contract in which in a contract with a risk due to the fluctuation of the economical environment produced by various causes, for a debt of a debtor using a loan or a lease for financing over a relatively middle and long period, such as housing acquisition, an equipment fund for business or a working fund, or a debt of an issuer of a nation bond, a public bond, and a corporate bond (hereinafter referred to as a nation/public/corporate bond), and a debt (hereinafter referred to as a debt) such as payment obligation including payment to an insured person in life insurance and nonlife insurance (hereinafter referred to as insurance), the debt is reduced or extinguished, or a part of or all of the credit or investment is collected and a profit is obtained, and further, relates to a social invention in which a creditor, such as a financial institution, a nation/public/corporate bond buyer, a lease trader, or a lender for an insured person or the like, is enabled to perform risk hedging, so that the rights and duties of safe long-term credit and debt can be kept.

Incidentally, any of the following financial terms used in the invention are described in respective pages of "KINYUU JITSUMU DAIJITEN" (edited by KINZAI INSTITUTE FOR FINANCIAL AFFAIRS, INC., issued on Sep. 19, 2000), and are widely generally used in the financial industry. For example, payment (p. 353), present value (p. 476), loan (p. 1775), housing loan (p. 802), option (p. 163), swap (p. 944), volatility (p. 1587), risk (p. 1731), and the like are described.

On looking back upon the 20th century, there is a case where both a creditor and a debtor are ruined by abrupt change of the macro economy. During good times (time of inflation), although there is a fear that depression (time of deflation) gradually occurs, in the present circumstance, means for taking measures against the risk is not provided at the side of the debtor when for example, a housing fund is borrowed. The same applies to the case where the time of deflation is changed to the time of inflation.

With respect to the risk when the macro economical environment is changed, when the macro economy is abruptly changed by, for example, long-term depression, degradation of the balance of international payments, financial failure due to excessive issuance of nation bonds or public bonds, collapse of money credit by failure of economy and currency policy, the failure of extreme resource distribution, or the like, the lending risk and borrowing risk of the creditor and debtor are abruptly increased, the economy itself is abruptly reduced, and it is conceivable that the creditors and especially many debtors have problems.

In the case where the micro economical environment is changed and the interest rate rises, the debtor and the creditor have the following situation.

(a) Under the inflation economy, in the case where various prices rise suddenly, and the income in proportion to them does not follow, for example, a debtor such as a housing fund loan debtor has trouble in payment of the debt. Especially, the debtor adopting the variable interest rate is required to pay high interest, and the payment of the loan becomes difficult.

(b) Under the deflation economy, general demand is decreased, and many enterprises have difficulty in management or are ruined, so that the employment is decreased or the income is decreased, and the loan debtor such as the housing fund loan debtor becomes insolvent. For example, under the financial crisis which occurred in New York in 1929, the unemployment rate reached 25%. Besides, when the guarantee value is abruptly decreased by the deflation, in the case where the debtor becomes unable to pay the principal and/or interest, there occurs a state where the guarantee can not be changed to money, and substantially an excessive liability state occurs. Further, for the loan debtor adopting the fixed interest rate, the payment of the high interest is continued, and it is conceivable that finally, it becomes unable to pay the principal and interest, and the agreed repayment becomes impossible.

Further, under the deflation economy, since the debtor delays the repayment, goes bankrupt, or becomes insolvent, bad debts extremely increase, not only the interest but also the principal can not be collected, and there is a fear that the creditor is also ruined. Besides, the value of the hypothecated asset is also decreased, and it becomes difficult to exchange the hypothecated asset to money.

Japan in the 1990s underwent these cases, the bad asset of financial institutions exceeded 100 trillion yen, and the problem of the failure of the financial institutions developed. On the other hand, since the government must take pump-priming measures, it is difficult to avoid the increase of the interest rate due to this, and the housing loan over 20 to 30 years has a high risk of future rising interest rates.

Although there are many derivatives (financial derivatives) to avoid such an economical risk, there is no patent document in which in the case where a commoner (consumer) as a debtor and a general business owner (enterprise) perform financing, the risk of rising interest rates is hedged by a blanket or small-lot derivative corresponding to the debt amount so as to support the debtor. Besides, at present, in an investment, credit, debt, or credit and debt with conditions, which is intended for a commoner, a risk hedge using a derivative has not been performed.

In "NEW FINANCIAL SYSTEM—PREPARATION FOR FUTURE HUGE RISK" (written by Robert J. Shiller, Professor of Yale University) issued by Nihon Keizai Shinbun, Inc. before the application (Feb. 9, 2004) of the invention, as a new method of insurance to avoid the drop risk of the house price of a housing acquisition person (housing loan debtor) by home-equity insurance, it is disclosed that claim for insurance is settled on the basis of a house price index (p. 180), and it is emphasized that the social necessity for countermeasures to a drop in house prices has been especially intensified in recent years. Although its direction is quite common to the invention, the concept and specific method described here are based on the risk hedge using the insurance and its method against a future drop in house prices, which is different from the invention.

Besides, although following patent documents 1 and 2 describe methods of avoiding a financial risk relating to debt redemption, the risk of the loan debtor is not targeted, and further, with respect to a method of avoiding a risk that the profit of a creditor is decreased by the refunding of a loan debtor according to the change of economical situation or by the repayment before the deadline, subrogated performance such as trust is used, and there is no concept that the burden of the loan debtor is reduced or extinguished by using the present value of the debt discounted by a yield curve.

Besides, a credit arises from the debt, and the creditor is also required to safeguard the credit with a risk. The credit at the creditor side includes housing loan lending credit, lease credit, lending credit to a juristic person over a relatively long period, and reinsurance credit in an insurance company.

Patent document 1 JP-A-2002-342579
Patent document 2 JP-A-2002-358428

BRIEF SUMMARY OF THE INVENTION

The invention has been made in view of the above problems, and provides a method of avoiding a risk or an increase of the risk of a creditor and a debtor in buying and selling of an article or credit due to a large fluctuation of economical situation within a period in which the repayment of a debt such as a loan, lease or insurance is agreed. Besides, with respect to the profit recited below in the invention, since consideration is not given to a tax, a commission, a use fee of the invention and the like, the amount of money of those is subtracted from the profit. However, in the case where a commodity is sold or issued by using the invention, the use fee of the invention may be included in the selling price, or various costs of these may be included in the purchase price of the derivative when it is indicated, and it is not necessary to largely change the method and apparatus of the invention. Only a slight change in numerical value occurs in the premium purchase amount and credit reduction ratio.

The present inventor has found that after-mentioned stocks, valuable instruments of credit or the like, an interest rate, a currency, a spot of a commodity (oil, metal, agricultural commodities, gold, etc.) or an index (including future delivery) significantly fluctuates in the macro economy in the past 5 years to 30 years (equivalent period of the debt of housing loan or nation/public/corporate bond), and when a derivative is set up with these in view of volatility, in realistic actual results, when the debtor pays a small premium as compared with the debt amount of the debt such as the loan, lease, nation/public/corporate bond or payment obligation including payment of insurance which occurs in future or has a possibility of occurrence, and purchase the small-lot (debt reduction right) corresponding to the long-term debt amount of the housing loan or the like, the loan debt including the housing loan, the lease debt, the debt of nation/public/corporate bond issuance or the payment obligation including the payment of insurance which occurs in future or has a possibility of occurrence can be reduced at a relatively high frequency, and the invention has been completed.

That is, the invention of claim 1 has an object to promote the sale of a building with land attached or a building and to make a profit and is a housing loan reduction apparatus for reducing a housing loan debt by using a derivative on a communication network and by following means.

(a) Derivative acquisition means for acquiring the derivative from a financial institution or a derivative setting-up person.

(b) Small-lot forming means which divides the acquired derivative to create a small-lot derivative conforming to a housing loan debt amount of the housing loan debt and its condition.

(c) Premium receiving means for receiving a payment of a premium to purchase the derivative from a housing loan debtor or a debt-cause interested party.

(d) Contract means for concluding a purchase contract of the small-lot derivative at a time of agreement of the housing loan debt, or before or after that.

(e) Individual communication means to the housing loan debtor or its interested party after the conclusion of the purchase contract.

(f) Settlement means for, when a profit by the small-lot derivative is obtained, repaying part of or all of the housing loan debt by the profit.

In claim 1, the debt-cause interested party includes a joint guarantor, a guarantor, a distributor of house with land attached, a house seller, a housing loan creditor, a housing loan securitizing trader and the like.

Incidentally, in the invention of claim 1, there is a case where a previously determined commission is included in the premium paid to the means of (c).

Besides, the invention of claim 3 is the apparatus for reducing the housing loan debt recited in claim 1 or 2 and is characterized by including at least one of notification means for advertising the derivative created by the small-lot forming means, information provision means for diagnosing a total risk amount and providing information, and settlement support means for supporting a settlement chance of the contracted derivative.

According to the invention, the system is configured in which the derivative is divided or treated as a single unit and the contract to perform selling and buying/loan for consumption is concluded, the risk of the contract of the housing loan is reduced, and a feeling of safety is given to the debtor or a debt expected person, so that an effect to promote the buying intention is obtained. It is preferable that the derivative premium is relatively small in view of the further financial burden of the debtor, and is intended to be about approximately 5% of the debt. However, the invention includes a case where the debtor pays more premium to increase the possibility of reducing the payment debt.

The roles of the respective means constituting the invention are as follows.

(a) Derivative Acquisition Means

Means for acquiring the derivative from the financial institution such as a market, a bank, a call loan dealer or a stock company, or Financial Technology Research Institute, Inc. or the like. In the housing loan, since a long-term repayment plan of 20 to 35 years is generally made, and the repayment is made to a creditor such as a bank, it is preferable that the acquired derivative has an exercise period of a long period (for example, 10 years to 30 years).

(b) Small-Lot Forming Means

In the long-period derivative acquired by the derivative acquisition means, the unit of the notional principal of the transaction is in a unit of one hundred million yen, and its premium price becomes high. On the other hand, in the case where the housing loan debtor borrows the housing loan, a detached house or a condominium apartment is generally in a unit of several tens million yen, and the burden of purchasing the long-period derivative is large for such a housing loan debtor and it is very difficult. Then, the long-period derivative is divided (into small lots), so that a small-lot derivative (debt reduction right) conforming to the conditions such as the debt amount of the loan debtor and the repayment period is created. Incidentally, in a multiple dwelling such as a condominium including plural apartments, in the case where the cost of construction is high and the housing loan debt amount is also high, the long-period derivative is not divided, but the derivative (debt reduction right) may be created as a single unit.

(c) Premium Receiving Means

Means for receiving the payment of the premium for purchasing the derivative from the housing loan debtor or the debt-cause interested party. Here, the debt-cause interested party means an interested party such as an assignee of the housing loan debt or a guarantee.

(d) Contract Means

Means for concluding the purchase contract of the small-lot derivative with the housing loan debtor at the time of the agreement of the housing loan, or before or after that.

(e) Individual Communication Means

A personal site is provided on the home page of a financial support company and the derivative price information and the like can be seen through the password of the loan debtor.

(f) Settlement Means

The fund is settled for the debtor having sold the small-lot derivative (debt reduction right). At the time of the loan contract, the derivative (debt reduction right) is contracted in order to hedge the risk of the loan debt. In the case where the economical situation is changed during the repayment, and a loan reduction amount (profit) is produced in the small-lot derivative (debt reduction right), the debt balance is automatically repaid by contract, and at this time, the profit is once received by money, valuable instrument or the like, and the debt balance is repaid. Further, when a surplus profit exists, this is acquired.

(g) Notification Means

The price information is get through the computer from each market pertaining to this commodity, and a commodity price table for displaying the price of the commodity timely is provided in accordance with the characteristic and condition of the commodity price. Besides, a simulation sheet (a system to specify that for example, when a certain amount of money is paid at the housing borrowing and when the interest rate comes to have a certain value in percent after a certain number of years, how much the principal can be reduced) is created from the commodity price table, and the apparatus and the features of the invention are made to be known to the public through print media such as a pamphlet, a catalog, and a newspaper, electric media such as a television and a homepage, and other advertising media.

(h) Information Provision Means

The commodity purchased by the debtor and the condition of the debtor are electrically managed, the total risk amount of the debtor is diagnosed, and the subsequent commodity price information and the information suitable for the condition of the debtor and a situation are provided by the electric communication medium such as the homepage or the e-mail whenever necessary, or by the print medium such as direct mail every predetermined day. Besides, a consulting system is created which can respond to inquiry, request for information, and complaint. Besides, among the present commodities or commodities similar to the present commodities, a commodity not open to the public on the exchange market is opened to the public and is inserted in the medium such as the newspaper.

(i) Settlement Support Means

The settlement price of the derivative (debt reduction right) is suitably notified to a person who desires to settle this commodity by the electric communication medium or telephone medium such as a call center, and the information necessary for the debtor as the customer, such as the received cash flow in the case where the small-lot derivative (debt reduction right) is settled at the present time point, is notified to support the debtor's (customer's) decision making of the settlement of the small-lot derivative (debt reduction right). However, in the case where the condition previously determined in the contract or the like is satisfied, the settlement is automatically made.

As stated above, since the transaction unit of the long-period derivative is normally in a unit of one hundred million yen, and a current general debtor can not deal with it, a system or a financial support company is required which divides this into small lots, and deals with or sells it. A housing loan borrowing person, that is, the debtor makes a derivative contract with a financial institution or the financial support company having the small-lot derivative (debt reduction right) selling system. Accordingly, the right to settle the derivative is given to the debtor, and the loan balance, the principal and interest payment amount, the interest payment amount or part thereof can be extinguished by the profit produced by this settlement, and therefore, this is called the debt reduction right in the invention.

There are following patterns A to D in which the debt reduction right is set.

A. Borrowing from the Housing Loan Corporation+selection of the debt reduction right.

B. Borrowing from a bank+selection of the debt reduction right (in the case of the same bank, there is also a case where structured borrowing occurs).

C. Selection of the debt reduction right to the borrowing from the Housing Loan Corporation+bank.

D. Purchase of only the debt reduction right (existing borrowing can also be dealt with).

Incidentally, the bank is a general financial institution or a financial company, and the financial support company is, except the above, a stock company, a housing company, or a trader including a general relevant company including a sub-divider, which supports the loan debtor to adopt the invention.

In the case of the pattern A, an amount of money for the debt reduction right is newly borrowed from a bank (the bank can lend a small amount of loan by the new commodity), or owned funds are used.

In the case of the pattern B, since it is treated as the structured borrowing, the price of the debt reduction right and the borrowing amount are related to each other.

In the case of the D pattern, an amount of money for the debt reduction right is newly borrowed from a bank (the bank can lend a small amount of loan by the new commodity), or owned funds are used.

As the settlement of the debt reduction right, following means are adopted.

The debtor previously determines a loan reduction amount by debt reduction right settlement, and concludes a contract to execute automatic settlement with the financial institution or the financial support company. In the case where the debtor does not perform the above automatic settlement, the debtor gets information relating to the loan reduction amount ratio by the debt reduction right settlement from the financial institution or the financial support company by a talk, a document, a telephone, a facsimile, electric communication means such as a homepage or electric mail, and according to the judgment of the debtor, as the need arises, the above means is used and the debt reduction right is settled by the financial institution or the financial support company. In the case where the loan balance remains after the loan reduction right is settled, when the debtor desires, the loan debtor can newly purchase the debt reduction right from the financial institution or the financial support company, and can make settlement whenever necessary.

Incidentally, at the beginning of the loan borrowing, before purchasing the debt reduction right corresponding to the loan repayment period or a relatively medium-term or long-term one, a short-term debt reduction right is purchased, and the profit of the debt reduction right can be applied to the purchase fund of the medium-term or long-term debt reduction right.

For example, when the debt reduction right is set up by using an option, in the case of the borrowing period exceeding 20 years, in the option as the basis of the debt reduction right corresponding to the loan repayment period or for the medium or long period, the temporal value occupies almost all the purchase price. This is the basic scheme of an option, and is a so-called time decay theory in which the temporal value is extinguished on the expiry date.

Accordingly, in order to suppress the purchase price per one unit of the option, a considerable number of short-term options, each of which is, for example, a call option of stock price future delivery with a purchase price of 3 yen per one sheet (one sheet is a unit of the option, and one unit is one thousand yen) or a put option, are purchased. In the case where the stock price rises by the fluctuation of the stock price, since it is not a rare case that the call becomes 30 yen even if 3 yen of the put becomes 0 yen, the rise of the current price amount due to the fluctuation of the economy is expected while this is performed every month, and at the time point when the profit is obtained, the profit is made a capital, and the debt reduction right corresponding to the loan repayment period or for a relatively middle or long period is purchased.

By this, the debtor not familiar with the debt reduction right is made to understand the advantage of the debt reduction right, and a feeling of burden to the debt reduction right corresponding to the loan repayment period or for the relatively medium or long period can also be removed.

The invention of claim 4 is an apparatus for reducing a housing loan debt, and especially the apparatus uses integral-type or network-type electric communication means and reduces the housing loan debt by following means.

(1) Balance calculation means for calculating a housing loan debt balance A.

(2) Present value calculation means for calculating a present value B by discounting all of or part of a future principal and interest payment amount of the housing loan debt by using an interest rate in each period indicated by a yield curve corresponding to the period, (3) Housing loan debt value judgment means for comparing a value read out from the balance calculation means with a value read out from the present value calculation means and for notifying a result.

(4) Security providing means by which, when the housing loan debt balance A read out from the housing loan debt value judgment means and the present value B satisfies a condition of $A^3B$, actual money and/or a valuable instrument (hereinafter referred to as C) equivalent to the present value B is directly or indirectly provided to the financial institution.

(5) Swap means by which the debtor swaps the A and B with a creditor or a third party, and by using the swap, a right to acquire a cash flow corresponding to the C and generated for years to come is acquired from the partner of the swap.

For the debtor who made, for example, a housing loan contract at a fixed interest rate, an unrealized profit is produced in the debt by a subsequent rise in interest rate, and in order to acquire an actual profit from the unrealized profit, the debt is evaluated with the present value, and all of or part of the future principal and interest payment amount is reduced by an amount of money smaller than the debt balance at the time point. For example, in the case where the market interest rate becomes higher than that at the time of borrowing, the loan debtor using the fixed interest rate performs the swap, so that the surplus value (unrealized profit) produced in the fixed interest rate debt can be made to contribute to the debt reduction. The invention uses the present value B obtained by discounting all of or part of the future principal and interest payment amount of the debt by using the yield curve in which the interest rate in each period is plotted. When the rise of the interest rate becomes noticeable, the price of the present value B becomes lower than the debt balance A.

Although all of or part of the future principal and interest payment amount can be reduced by the swap and by an amount smaller than the debt balance at the time point, there is a possibility that even if the financial institution or the financial support company as the central existence of the invention recommends each debtor to use the swap, the understanding of the debtor can not be gained.

Accordingly, the financial institution or the financial support company explains the swap to the debtor in advance, the debtor concludes a forward contract of the swap with the financial institution or the financial support company and a comparison information provision contract of the debt balance A and the present value B, the financial institution or the financial support company, which concluded the contract, provides the comparison information of the debt balance A and the present value B to the debtor periodically or at any time according to the demand of the debtor (customer), and a preliminary contract is made such that the swap is automatically made at the time point when the present value B discounted by using the yield curve reaches the level (for example, half of the debt is substantially repaid by the execution of the swap) previously agreed by the debtor and the financial institution or the financial support company, or the debtor makes the swap based on the information provision as the need arises, which is also included in the invention.

Besides, after the debtor substantially repays the part of or all of the debt to the creditor by using the swap, the right left to the debtor and based on the swap contract may be held by the debtor or may be assigned to the creditor or a third party.

The case where the debtor holds the right based on the swap contract means that the debtor holds the right to acquire the cash flow, and means a case where the debtor repays the creditor by using, for example, the cash flow paid from the partner of the swap to the debtor and corresponding to the principal and interest payment amount, the interest payment amount or part thereof. Besides, the case where the right based on the swap contract is assigned to the creditor means the case where for example, in the case of the housing loan, the right to acquire the cash flow, which is owned by the loan debtor, is assigned to the loan creditor, and means the case where the lending destination of the creditor is substantially changed from the loan debtor to the partner of the swap such as the financial institution.

In the case where the right based on the swap contract is assigned to the creditor, as described later, there is a merit that a contribution to an increase in the net worth ratio of the creditor is obtained.

On the other hand, in the case where the debtor holds the right based on the swap contract, there is a merit that in accordance with the fluctuation of the interest rate after the swap contract, an unrealized profit is produced in the cash flow, and the debtor can obtain a further profit. That is, in the right to acquire the cash flow obtained by the swap, the unrealized profit is produced by the drop of the interest rate. Thus, when the present value of the right to acquire the cash flow discounted by the yield curve at the time point exceeds the debt balance at the time point, the debtor sells the right to the third party at the present value, repays the debt balance to the creditor by the proceeds from sale, and can obtain the surplus as the profit.

The invention of claim 5 is, in the housing loan debt reduction apparatus as recited in claim 4, characterized by comprising contract means for concluding a purchase contract of the derivative of an amount of money corresponding to the housing loan debt balance, a principal and interest payment amount, an interest payment amount or part thereof, or the small-lot derivative obtained by dividing the derivative into small lots by receiving payment of a premium at a time of agreement, or before or after that, based on the housing loan debt, in order to create the C, and applying means for, when a profit by the small-lot derivate is obtained, applying all of or part of the profit to the C.

The invention of claim 6 is a housing loan debt reduction method including sale promoting means including advertising and for promoting sale of a building with land attached or a building by using an apparatus as recited in any one of claims 1 to 5, and use price collection means for collecting a predetermined apparatus use price of a sales total, and the commission, the use fee of the invention or the like is paid to the person having the right of the invention irrespective of success or failure of the derivative.

The invention of claim 7 is a system of reducing a housing loan debt by using a computer and is characterized by comprising a debtor terminal of a debtor, receiving means for receiving debtor information transmitted from the debtor terminal, housing loan debt balance calculation means for calculating a housing loan debt balance of the debtor at a present time point based on the received debtor information, storage means storing interest rate data and a present value calculation rule, present value calculation means for calculating a present value of a principal and interest payment amount remaining to the debtor at the present time point, and notification or transmission means for notifying or transmitting information to notify that the housing loan debt of the debtor has an unrealized profit to the debtor terminal in a case where the housing loan debt balance calculated by the housing loan debt balance calculation means is larger than the present value calculated by the present value calculation means, wherein a swap transaction process is performed when the receiving means receives a signal, notified or transmitted from the debtor terminal of the debtor, to instruct a swap process.

The invention of claim 8 is a housing loan debt reduction system of reducing a housing loan debt by using a computer and is characterized by comprising storage means for receiving information relating to a derivative acquired from a financial institution and storing, as small-lot derivative (housing loan debt reduction right) data, the derivative as it is or after dividing it into small lots, a debtor terminal of a debtor, and receiving means for receiving a purchase application instruction of the derivative notified or transmitted from the debtor terminal or for receiving input of the purchase application instruction, wherein by the receiving means, a notification from the debtor or a settlement signal, transmitted from the debtor terminal, to instruct settlement of the derivative is received by or inputted to the computer, and a settlement process is performed based on the settlement signal directly or by using a network.

The invention of claim 9 is characterized in that in the housing loan debt reduction system of claim 8, the storage means receives information relating to the derivative from a terminal of an external information provision company directly or by using a network, and stores it as price index data, and advertising data created based on the small-lot derivative data and the price index data is notified to the debtor (customer) or is transmit to the debtor (customer) terminal.

In the invention, the derivative can use a spot, a future delivery, an option, a swap, a swaption, and the like, and further, a suitable derivative developed in future is used. The derivative is selected by the financial institution or the financial support company (recited in the embodiments), and is divided into small lots each conforming to the debt reduction amount (profit) desired by the debtor (customer) and is provided as the debt reduction right. Since there is a possibility that a loss occurs infinitely, it is preferable to purchase the derivative with a limited loss. Besides, as the derivative, for example, in the option, it is preferable that a long-term option with a volatility of 25% or less is purchased in the out-of-the-money, and the debt reduction amount is secured by the abrupt rise of the volatility and the rising/falling of the underlying asset. The characteristics of the derivative of the future delivery, the option, the swap, and the swaption will next be described.

The future delivery is a transaction in which with respect to a certain underlying asset, a transaction condition at the future point of time is specified at the present point of time, and has a similar movement to the rising and falling of the price of the underlying asset. Typical future delivery includes Nikkei 225, a stock future delivery of TOPIX or the like, a bond future delivery of nation bonds or the like, an interest rate future delivery dealing with interest rates, a commodity future delivery of agricultural commodities, oil, gold or the like, and an exchange future delivery dealing with foreign exchange. Further, the invention includes that the derivative uses the spot and/or future delivery index of stock or valuable instrument markets of New York Dow, NASDAQ, London (FT), Paris (CAC), Frankfurt (DAX), Seoul (KOSPI), Taipei (KAROHOSU), Shingapore (SIMEX), and the like, and further, the spot and/or future delivery index at international exchange markets such as LME (financial exchange market) of London, CRB, CMB (grain exchange market) of Chicago, and long-term prime rates and the like (for example, Lombard rate) of respective countries including Japan.

The option is a right (call option) to buy the underlying asset at an exercise price on the expiry date, or a right (put option) to sell it, the call option has a similar movement to the fluctuation of the underlying asset price, and the put option has a movement opposite to the fluctuation of the underlying asset.

The swap is a trade in which different currencies, debt principals or interest payments with different base interest rates are exchanged among plural concerned parties by mutual consensus, and is based on an idea that various elements such as an amount of money, a period, a currency and an interest rate are recombined into an optimum combination.

The swaption is an option transaction intended for a swap, in which a right to perform a swap transaction of a fixed period (swap period) after a fixed period (option period) is dealt with, and includes a call option and a put option.

The above four derivatives are singly used or are combined and used to set up the debt reduction right of the invention. The step of setting up is performed in a procedure as described below.

1. A derivative most closely tied to a risk to be dispersed is selected. For example, with respect to an interest rate, an interest rate future delivery, a bond future delivery, an interest rate option, or a swaption is selected. Besides, with respect to a raw material, a future delivery of raw material, or an option is selected, and this is used as a single unit or divided into small lots and is made the debt reduction right.

2. In the case where the derivative does not have the marketability, a future delivery and the underlying asset are used to set up a derivative to produce the same effect as the above derivative, and this is divided into small lots and is made the debt reduction right. At that time, in order to reduce the cost of the debt reduction right, for example, there may be adopted a method in which a derivative is used, the loan reduction amount not lower than the reduction of the debt balance, the principal and interest payment amount, the interest payment amount, or part thereof is discarded to reduce the cost, or a method in which a derivative transaction is performed based on the debt balance of each month/each year in accordance with a repayment plan, and the cost is reduced.

Incidentally, in order to prevent that a non-sold part of the debt reduction right is held and a loss is caused in future, it is preferable that the financial institution or the financial support company performs hedge transaction of the non-sold part of the debt reduction right on the market, and for example, in the case where the minimum composition/trading unit of the derivative is one hundred million yen (notional principal), and the debt reduction right of 40 million yen (notional principal) is sold to the loan debtor, with respect to the outstanding amount of 60 million yen (notional principal) (equivalent to the non-sold part of the debt reduction right), all of or part of it is sold to another customer (loan debtor), or a hedge transaction concerning the part of or all of it is performed on the future delivery market.

The possibility that the debt reduction right can be advantageously settled can be judged as follows. For example, when an interest rate option is used as an example, in the corrected Black-Scholes model as one of determination theories of the option price, since the determination is made on the assumption that the fluctuation in future interest rate obeys the probability distribution function of the normal distribution, it is a price system on the assumption that there is little possibility that the interest rate rises suddenly or drops suddenly by the change of abrupt economical fluctuations. However, it is recognized as an empirical rule that the actual economical environment is abruptly changed, and the creditor and the loan debtor are exposed to the abruptly changed risk.

Accordingly, the base of the invention is such that the price system determined by the corrected Black-Scholes model is used, and in the case of application to a borrowing interest rate, derivatives such as a very inexpensive and long-lasting effective interest rate option and an interest rate swaption are combined and are purchased, so that the risk of the creditor and the general housing loan debtor is reduced, and stable economical activity can be secured.

For example, in the case of the interest rate option, when an abrupt fluctuation in interest rate occurs, the option price by the corrected Black-Scholes model exponentially abruptly rises since the main index "gamma" and "vega" constituting the model abruptly rise. This suggests that a large unrealized profit is produced in a very short period, and one object of the invention is achieved by returning the unrealized profit to the loan debtor. Incidentally, the gamma is a numerical value indicating the sensitivity of delta at the time when the interest rate fluctuates by 1%, and the delta is a numerical value indicating the sensitivity at the time when the interest rate of the option price fluctuates by 1%. Besides, the vega is a numerical value indicating the sensitivity of volatility at the time when the interest rate fluctuates by 1%, and the volatility is an index indicating the variability of underlying asset price at the present time point and a mean value of the fluctuation of the underlying asset price. When the numerical value of the volatility is increased, the premium price becomes high. Here, when the relation between a premium C of a call and a volatility L115\f"Symbol"\s12 is indicated by the Black-Scholes model, it is expressed by a following formula.

$$C = SN(d_1) - Ke^{-rT}N(d_2), \text{ where } d_1 \text{ and } d_2 \text{ are } d_1 = (\log(S/K) + (r + s^2/2)T)/sT^{1/2}, d_2 = d_1 - sT^{1/2},$$

and the relation is such that when the volatility is increased, the premium C becomes large. Incidentally, S denotes an asset price, K denotes an exercise price, r denotes an interest rate, and T denotes an exercise period. N(d) means a cumulative density function of the normal distribution, and indicates a bell-shaped figure.

The economy has history in which business prosperity and business depression are repeated, and in the (corrected) Black-Scholes model at the time of business prosperity, since it is assumed that a further business prosperity and a next-occurring business depression have the same probability, the interest rate option price of the low interest rate at the time of business prosperity becomes cheap in view of the realistic probability. For example, during the late 1980s and the 1990s, Japan experienced the so-called bubble economy, however, the contraction of the subsequent economy was very large, and the economy repeats circulation. For example, at the time when the economy grows by 10%, according to the Black-Scholes model, with respect to the subsequent growth rate, it is assumed that 15% growth and minus 5% growth (10±5%) have the same probability=same price. From this concept, since a combination of the credit and debt (underlying asset) and various derivative commodities becomes possible, a wide range application of safer selection of the credit and debt becomes possible.

Incidentally, the invention can be applied to a general pecuniary debt at a debtor side, such as a debt caused by nation bonds, public/corporate bonds (public bonds issued by a self-governing body, cooperate bonds (including respective guaranteed bonds) issued by a juristic person, etc.), and a payment obligation debt including payment of insurance, in addition to a loan debt other than the housing loan debt, a lease debt, a general borrowed money debt of, in the main, a juristic person.

Besides, in the invention, the derivative including the swap is embodied into a stock, a subscriber's share on the capital, a unit of contribution, a bond, a beneficiary certificate, or an insurance to reduce the debt, and in the case where it is impossible to sell the swap or the derivative directly to the customer (debtor), for example, an SPC (Special Purpose Corporation) is established, the SPC performs the swap or performs the purchase and settlement of the derivative, and the debtor as a general customer sells or buys the subscriber's share on the capital for the SPC, so that the swap or derivative is indirectly used.

In the case where the debtor is an individual as in the housing loan and it is troublesome to grasp the contents of the details of the swap or the derivative, or in the case where it is difficult to cause the debtor to directly sell or buy the swap or the derivative because of legal limitations, the swap or the derivative is embodied into another financial commodity, for example, the stock, the subscriber's share on capital, the unit of contribution, the bond, the beneficiary certificate, or the insurance, so that there is a merit that the circulation of these is accelerated.

Besides, in the invention, there is a case where it is stipulated in a contract, a note, an agreement document agreed between the creditor of the debt, the debtor and its interested party, or a back bond such as a signed memorandum that the debtor or its assignee can execute this method as the right, and the contract content of the invention is recited in a contract, a written guarantee, a treaty wording, a memorandum or the like between at least one company (person) of the financial institution, the financial support company, a housing manufacture and/or sales company, a subdivider, an insurance company, and its relevant party and the debtor and/or a guarantee of the debtor.

For example, a clause of a swap forward contract, a current price provision contract of the derivative, a current price provision contract of the debt, a debt reduction right contract or the like is added to the housing loan and its repayment plan, so that the contract is integrally incorporated in the buying and selling of the article. Further, it is specified that in the recited contract, in the case where a profit is not obtained by the economical situation or failure of investment management, the creditor does not bear the responsibility of the contract.

Besides, in the invention, there is a case where the debt reduction method is explained or advertised by using at least one of a printing, a broadcast, and an electronic communication medium, and in that case, the system to reduce the burden of the debtor due to the fluctuation of the economical situation after the time of contract of a loan or the like is widely advertised to general consumers, so that there is an effect that the demand is aroused, and the economical support for the debtor is promoted.

Besides, in the invention, there is a case where commodity selling is made while a premium (including a commission, a use fee of the invention, etc.) of the derivative is included in a commodity price treated by a housing supplier, a building company, a real estate agent, a leasing company, a financial institution, a financial support company or the like, and the commission, the use fee of the invention and the like are paid to the person having the right of the invention irrespective of the success or failure of the derivative. The purchaser of the commodity resultantly purchases the derivative, and when the derivative produces a profit, there occurs a merit that the debt can be reduced by the profit.

Besides, in the case where the invention is especially applied to a debt caused by a nation bond, a public/cooperate bond (public bond issued by a self-governing body or the like, a cooperate bond (including each guaranteed bond) issued by a juristic person, etc.), issuers of the nation/public/corporate bonds or dealers of those directly or indirectly purchase the derivative for the purpose of reducing the debt, or incorporate the purchased derivative in the commodity or the nation/public/corporate bonds and sell (issue) it directly or indirectly.

Since the nation bond, the public bond, and the corporate bond are circulated as bonds, and many and unspecified persons invest, the price of the bond fluctuates by the creditworthiness of the bond, and the interest rate also fluctuates. For example, the issuer of Japanese government bonds is Japan, and in the case where the credit status of Japan is lowered by the rating of the international rating agency, various economical phenomena occur.

By using the various phenomena, part of or all of the nation bond is redeemed using the derivative. Specifically, in the case where the credit status of the issuer (Japan) of Japanese government bonds is lowered, Japanese yen, nation bonds, and stocks are sold all at once. Accordingly, when a derivative to obtain a profit in the case where cheap yen rate occurs in the exchange rate, a derivative to obtain a profit in the case where the price of the nation bonds drops sharply, and a derivative to obtain a profit in the case where Nikkei Stock Average drops sharply are previously purchased, redeeming is performed in the case where the credit of Japan drops sharply.

As a recent specific example, Argentina government bonds experienced that the price of Argentina government bonds, one share of which was 100 yen or more, dropped to the level lower than 30 yen. When Argentina purchased the above derivative in advance, it appears to function very effectively when the Argentina nation bonds drop suddenly and the economy is being contracted.

Besides, in the public bond, the corporate bond, and the like, when the bond with this derivative is issued, an investor can invest in the bond at ease, and besides, when it is informed to the investor that the derivative as stated above has been purchased, the credit of the bond issuer is resultantly raised.

Besides, especially in the case where the invention is applied to a pecuniary debt such as a payment obligation including benefits of insurance, there is a case where an insurance company directly or indirectly purchases the derivative for the purpose of hedging or reducing a payment risk to an insured person, or incorporates the derivative in the commodity and directly or indirectly sells (issues) it.

The insurance company pays a premium to effect reinsurance in order to hedge the risk of insurance fee payment. Thus, a considerable reinsurance premium is paid to a reinsurance accepting company or trader (for example, Lloyd's, etc.), however, instead of the payment of the premium or in combination with the reinsurance, the derivative is directly or indirectly purchased, so that the payment to the insured person can be hedged or reduced. It is conceivable that the insurance category includes life insurance, various nonlife insurance, marine insurance (a kind of nonlife insurance) and the like. At present, there is also a case where re-reinsurance is effected in addition to the reinsurance.

In the insurance, it is possible to estimate the payment obligation (future debt) including future insurance benefits.

Accordingly, in the case where the interest rate is increased, the future debt is discounted by the yield curve to obtain the present value, and in the case where the amount of money of the present value is lower than or equal to the amount of money of the future debt, actual money and/or a valuable instrument equivalent to the actual money is provided to the financial institution to make a swap for the future debt, or the future debt is swapped for the cash flow generated in the insurance company in future.

Besides, in the invention, there is a case where a housing supplier, a building company, a real estate agent, a leasing company, a financial institution, a financial support company, an issuer of nation/public/corporate bonds or a trader thereof is obliged to pay a predetermined use fee of the invention to the applicant, an assigner or a successor thereof from the price for a commodity to be treated, and the use fee of the invention is acquired from the price of the commodity irrespective of whether the commission or the use fee of the invention is included in the premium of the derivative, and the profit of the rightful person of the invention is ensured. On the other hand, the seller of the commodity has a risk until the collection of bill of the commodity over a long period is completed, and has a benefit of hedging the risk.

Besides, in the invention, there is a case where the creditor of the debt uses the small-lot derivative to protect the credit, and in addition to a commission generally imposed by the financial institution, the derivative is used, so that even if an unexpected situation occurs to the debtor, the loss can be compensated by the profit of the derivative. In this case, the location of the right to acquire the profit of the derivative is changed according to which of the creditor and the debtor pays the premium of the derivative, and it is an item to be determined by negotiation between the interested parties. In any event, the invention includes that the creditor uses the invention.

Besides, the "reduction" of the debt is a concept including not only extinction of part of the debt to reduce the debt, but also extinction of all the debt.

Besides, the "reduction" of the debt is a concept including not only extinction of part of the debt to reduce the debt, but also extinction of all the debt.

According to the invention, the debtor swaps all of or part of the future principal and interest payment amount of the debt or the payment obligation including the payment of insurance occurring in future by actual money and/or valuable instrument equivalent to the present value discounted by the yield curve, so that the debt is substantially extinguished.

Especially, in the case where a commoner is a debtor as in the housing loan, after the debtor assigns the swapped right to the creditor, the debtor is changed to the financial institution or the financial support company, and the repayment of the outstanding credit is received based on the initial contract, and accordingly, the creditor such as the financial institution can completely acquire the initially scheduled profit, and when the creditor is the bank, a contribution to improvement of net worth ratio is also obtained.

Further, according to the invention, following merits are obtained.

1. Redress Against Failure Due to Macro Economy Change (A) In the Case Where Interest Rate is Raised (Including Hyperinflation)

(a) Debtor

Under the inflation economy, since many enterprises have difficulty in management by abrupt rise of the interest rate and raw material, employment is abruptly decreased, and there is a possibility that the debtor becomes insolvent, however, the debtor using the method and apparatus of the invention executes the swap or settles the debt reduction right, so that the debt balance, the principal and interest payment amount, the interest payment amount or part thereof is reduced and the occurrence of insolvency can be prevented. For example, the debtor adopting the variable interest rate is required to pay high interest and finally, there is a possibility that the payment of the interest becomes impossible, however, when the previously purchased debt reduction right is settled, the debt balance, the principal and interest payment amount, the interest payment amount or part thereof is reduced, and therefore, the occurrence of insolvency can be prevented. Besides, since the asset value rises by the value rise of the hypothecated asset, the debtor has double effects.

(b) Creditor

The bad loan abruptly increases by the business failure of the debtor or the insolvency, the creditor can not receive not only the interest but also the principal, and there is a possibility that the financial difficulty or failure occurs. However, the debtor using the method and apparatus of the invention executes the swap or settles the debt reduction right, so that the debt balance, the principal and interest payment amount, the interest payment amount or part thereof is reduced, and the occurrence of the insolvency can be prevented, and therefore, the creditor as the holder of the credit can prevent the credit from becoming the bad loan, and the financial difficulty or failure can be avoided.

The influence on the creditor, especially on the financial institution is very large. For example, at the time of financing, since the risk of the financing in which the commodity based on the invention is directly or indirectly given to the debtor is reduced, the probability that it is estimated as a substandard loan or a bankruptcy anxiety loan is significantly reduced as compared with the related art. By this, required reserve fund becomes smaller than a present one, and the bank management is stabilized, so that the bank has a financing margin, and a large contribution is made to the activation of the economy. Further, when it is agreed with the debtor that the creditor can settle the debt reduction right, the credit can be extinguished.

Besides, in the housing loan in which an ordinary individual is a debtor, the influence on the financial institution, such as the bank, by the swap is very large.

There are two merits for the creditor. One is that the risk of the anticipation is extremely decreased, and the other is the contribution to an increase in net worth ratio.

That is, the creditor always has a risk (loan refunding risk) in which the loan debtor performs the anticipation at the time of a low interest rate, and in the present circumstances, heading to the risk is performed. However, the financial institution or the financial support company as the partner of the swap by this invention has an obligation to pay the loan balance according to the initial loan contract, the principal and interest payment amount, the interest payment amount, or part thereof (that is, cash flow generated in the loan debtor for years to come and to be paid to the loan creditor) to the loan creditor irrespective of the future fluctuation in the interest rate, so that the swapped loan credit has no risk of the anticipation. This effect is remarkable in the case where the interest rate is once increased, and then the interest rate is lowered. That is, the loan debtor makes the swap in the process where the interest rate is once increased, and the agreed repayment of the loan is ensured, so that the swapped loan becomes the loan credit in which the anticipation is not performed even if the interest rate is lowered after the interest rate is raised, and therefore, it becomes the credit in which risk hedge to the drop of the interest rate is unnecessary.

Besides, since the anticipation of the loan credit does not occur as stated above, the creditor resultantly provides a great merit to the investor who purchased the loan credit which was securitized for the risk hedge. For example, the investor who purchased the securitized commodity of the loan credit can account for a stable investment profit without being influenced by the tendency of the interest rate.

Another merit of the creditor is that not to mention the case where the present value of the future principal and interest payment amount is lower than the debt balance, even in the case where it is equivalent thereto, in the case where all of or part of the right to acquire the cash flow which the loan debtor acquired by the swap contract is assigned from the debtor to the loan creditor, the net worth ratio of the creditor is raised.

The creditor of the loan is generally the bank, and in the bank, there is net worth ratio regulation by BIS (Bank of International Settlements), and in the case where the net worth ratio calculated by the BIS regulation is less than 8%, the bank can not perform international business. The net worth ratio is calculated by net worth/(asset amount ' risk weight for each asset category), and the mechanism is such that the smaller the risk weight for each asset category is, the larger the net worth ratio is.

Although the risk weight for each asset category varies between countries, in Japan, for example, in the case of the housing loan, it is necessary to multiply the loan balance by 50%, whereas in the case of borrowing and lending between banks, the loan balance has only to be multiplied by 20%, and in the case of the same net worth and the same loan balance, for example, in the case of the net worth of 10 and the loan assets of 100, in the housing loan, it is 20% (10/100 ' 50%)), whereas in the borrowing and lending between banks, it becomes 50% (10/(100 ' 20%)), and in this comparison, the net worth ratio is improved by a factor of 2.5. Incidentally, since the risk weight of financing to a corporation is 100%, in the case where the above calculation of the net worth ratio is performed, it is 10% (10/(100 ' 100%), and when this is changed to the borrowing and lending between banks, the net worth ratio is increased by a factor of 5, and the influence is very large.

This effect occurs when the loan debtor assigns the right of the swap to the creditor after the swap, and this is because the borrower is changed from the loan debtor to the bank.

Accordingly, in the judgment of the creditor, in order to raise the net worth ratio, even if the present value of the future principal and interest payment amount is higher than the debt balance, in the case where there is economical rationality, there can be a case where the loan creditor gives some economical supply to the debtor, and recommends the debtor to execute the swap and to assign it to the loan creditor.

(B) Case Where the Interest Rate is Lowered (Including Hyperdeflation)

(a) Debtor

Under the deflation economy, the demand is decreased and many enterprises have difficulty in management, and it becomes difficult for the debtor to make payment, however, when the debtor using the invention settles the debt reduction right, the loan balance, the principal and interest payment amount, the interest payment amount or part thereof is reduced and the occurrence of insolvency can be prevented. Besides, even in the case where the security value is lowered, since the debt is reduced or repaid, the substantial excessive liability state can be avoided. Further, although the loan debtor adopting the fixed interest rate continues paying the high interest, when the debt reduction right is used, since the housing borrowed principal is reduced by the marginal profit between the fixed agreed interest rate and the lowered market interest rate, the occurrence of the insolvency can be prevented.

(b) Creditor

When the debtor goes bankrupt or becomes insolvent, the bad loan increases, and not only the received interest, but also the principal can not be collected, and the creditor also has difficulty in management. However, when the debtor settles the debt reduction right, since the debt balance, the principal and interest payment amount, the interest payment amount, or part thereof is reduced or repaid, the creditor does not suffer a loss.

Besides, although the value of the hypothecated asset is also decreased, when the debtor settles the debt reduction right, since the debt balance, the principal and interest payment amount or part thereof is reduced, it is evaluated as healthy normal credit in the evaluation of assets of the creditor, and therefore, reserve fund insufficiency does not occur, and financial difficulties do not occur. The same effects as those recited in the foregoing column (b) Creditor of (A) In the case where interest rate is raised (including hyperinflation) is obtained.

2. Improvement of Buying Intention Due to Nonexistence of Macro Economy Abrupt Change Risk Since the loan debtor using the borrowing method in which the debt reduction right is given can avoid the macro economy abrupt change risk, as compared with the loan debtor using the conventional borrowing method, it becomes possible to bear a higher debt, and it becomes possible to enjoy a richer consumption or investment life. Besides, conventional excessive saving (so-called mattress money) performed in preparation for the abrupt change of the micro economy is opened to the consumption or investment, so that the circulation speed of funds increases, and as a result, there is obtained an effect that the credit creation of the currency normally functions, and the economy itself is activated.

3. Reduction of Sudden Change Risk of Macro Economy

In the case where the debt reduction right described in the invention is widened to credit and debt in a wide range in addition to the housing borrowing, against the force to cause the sudden change of the interest rate, the customer as the debtor having purchased the debt reduction right of the invention settles this commodity, so that the countervailing power functions against the change of the interest rate, and one-way abrupt rise or drop of the interest rate is reduced. By this countervailing power, trouble due to the instability of the economy by the inflation or deflation can be avoided.

4. Efficiency of Economy is Raised

The excessive risk which the debtor presently bears is reduced, and money saved at a level over a proper risk is circulated to more efficient investment and consumption, so that the efficiency of the whole economical society is promoted. This is similar to the fact that the Internet raises the efficiency of information, and this mechanism has an economical value.

Since the loan commodity using the invention is not put on the market until now, the loan debtor resultantly bears all borrowing risks, however, when the loan debtor widely uses the invention, the market is opened and the borrowing risks are greatly reduced.

Until now, since the commodity of the invention is not put on the market as a sales tool for home sales or the like, the price of the future delivery, option, swap, or swaption is set to be very high, and in the present circumstances, most of the loan debtors can not use (at least all housing loan borrowing persons can not use), however, according to the invention which enables the common people such as the housing loan debtors to use, a new circulation market is created and enlarged, the price of the future delivery, the option, the swap, or the swaption is converged on a proper one, and the invention can be used at lower cost.

BRIEF DESCRIPTION OF THE DRAWINGS

FIG. 1 is a list of housing loan principal and interest equal repayment specification (Embodiment 1)

FIG. 2 (a) is a price table of a 20-year swap interest rate option, in which a current price amount after 10 years is calculated, and (b) is a table in which a rise ratio of the option price is calculated (Embodiment 1).

FIG. 3 (a) is a table in which in the case where a 20-year swap interest rate option is divided, the current price amount of a premium price after 10 years is calculated, and (b) is a table indicating a principal repayment ratio (Embodiment 1).

FIG. 4 (a) is a table in which in the case where two 20-year swap interest rate options are purchased, a current price amount after 10 years is calculated, and (b) is a table indicating a principal repayment ratio (Embodiment 1)

FIG. 6 (a) is a table in which a current price amount after 5 years is calculated using a 10-year swap interest ratio option, and (b) is a table in which a rise ratio of a premium price is calculated (Embodiment 2).

FIG. 7 (a) is a table in which in the case where a 10-year swap interest rate option is divided, a current price amount after 5 years is calculated, and (b) is a table in which a principal repayment ratio is calculated (Embodiment 2).

FIG. 8 (a) is a table in which in the case where two 10-year swap interest rate options are purchased, a current price amount after 5 years is calculated, and (b) is a table indicating a principal repayment ratio (Embodiment 2)

FIG. 11 (a) is a table in which calculation is made for an exchange option (dollar call) using exchange of Japanese yen and US dollar in the case where the Japanese yen is weakened, and (b) is a table in which a rise ratio of a premium price is calculated (Embodiment 5).

FIG. 12 (a) is a table in which a current price amount of the exchange option after 10 years is calculated, and (b) is a table in which a principal repayment ratio is calculated (Embodiment 5).

FIG. 13 (a) is a table in which two exchange options are purchased and a current price amount after 10 years is calculated, and (b) is a table in which a principal repayment ratio is calculated (Embodiment 5).

FIG. 15 (a) is a table in which NY Dow stock price is used, and a current price amount after 10 years in the case where it drops in future is calculated, and (b) is a table in which a rise ratio of option price is calculated (Embodiment 6).

FIG. 16 (a) is a table in which a current price amount after 10 years is calculated in the case where a NY Dow stock price option is divided, and (b) is a table in which a principal repayment ratio is calculated (Embodiment 6).

FIG. 17 (a) is a table in which two NY Dow stock price options are purchased and a current price amount after 10 years is calculated, and (b) is a table in which a principal repayment ratio is calculated (Embodiment 6).

FIGS. 19 (a) and (b) are tables of actual result values of NY Dow and volatility for 24 years (Embodiment 6).

FIG. 20 is a table showing a profit of an option using NY Dow, (a) shows a call option, and (b) shows a case of a put option (Embodiment 6).

FIG. 21 (a) is a price table of NY Dow stock price option, and (b) is a table in which a rise ratio of the option price is calculated (Embodiment 7).

FIG. 22 (a) is a price table of a small-lot NY Dow stock price option, and (b) is a table indicating a repayment ratio to lease debt balance (Embodiment 7).

FIG. 23 is a table indicating results in which a present value of a loan debt is calculated (Embodiment 8).

FIG. 25 is a profit notional calculation sheet of an interest rate option (Embodiment 8).

FIG. 26 is a list of principal and interest equal repayment specification of a lease debt (Embodiment 9).

FIG. 27 is a table showing results in which a present value of a lease debt is calculated (Embodiment 9).

FIG. 31 is a flow view showing a process procedure in the apparatus of embodiment 11 of the invention.

DETAILED DESCRIPTION OF THE INVENTION

Figure 5:
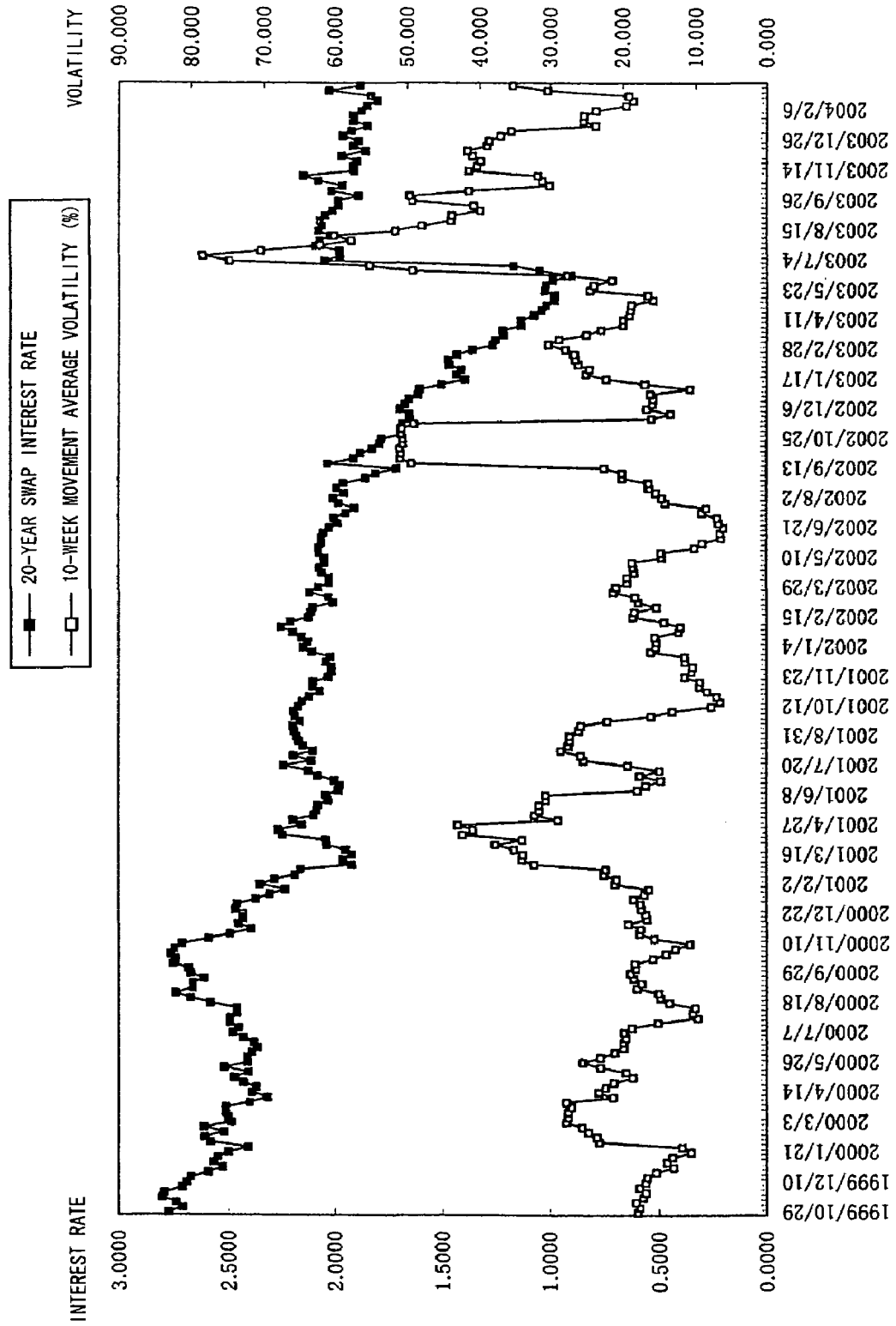
FIG. 5 is a graph in which actual results of a 20-year swap interest rate are plotted (Embodiment 1).

In the case where a fund for purchase is prepared by using a loan for a real right or an obligatory right, for example, a house, which becomes an object of option purchase and has an underlying asset price, the option is simultaneously set, so that the risk due to the fluctuation of the economy is avoided, and the repayment of the borrowed principal is realized.

Besides, a nation/public/corporate bond issuer has a debt over a long period, and has a large risk according to the economical situation and interest rate situation, however, when the invention is used, part of or all of the risk due to the change of the situation can be hedged, a good international and social influence is exerted, and the applicability is large.

Embodiment 1

This embodiment relates to a method of reducing a housing loan debt, and an example in which a house with 40 million yen is purchased will be described. FIG. 1 shows a part of a principal and interest equal repayment specification list in the case where a housing loan of 40 million yen as a fund for purchase is borrowed at a fixed interest rate of 3%. A repayment period is 25 years (300 months). The total debt of the borrower including the agreed interest is 56,905,358 yen, and a risk such as the difficulty in repayment of the loan debtor due to the fluctuation of the economy for 25 years is not considered.

Here, consideration is given to a case where after 10 years from the start of the repayment, the housing borrowing interest rate rises from 3% of the fixed interest rate at the present time point (time point of the borrowing) by 0% to 3%. FIG. 2 shows present purchase prices of a call option of the interest rate calculated by the Black-Scholes model at respective exercise prices in the case where "20-year swap interest rate" (here, the swap interest rate is made one obtained by subtracting approximately 1% from the housing loan) is made an object, the asset price (principal) is one hundred million yen, the volatility is 15%, and the exercise period is 25 years corresponding to the borrowing period, and the price change of the option in the case where the swap interest rate rises from 0% to 3% after ten years later, and the volatility rises. In the Black-Scholes model, when the option of the out-of-the-money approaches the in-the-money, an element having an influence on the option price, such as the volatility, rises, and the current price amount of the option is abruptly raised, and accordingly, even in the option separate from the in-the-money, when it approaches the in-the-money, the current price amount rises, and a large profit can be gained with the small purchase price.

The way of seeing FIG. 2(a) is exemplified. Although the exercise prices of 5.0%, 6.0% . . . 15% are located at positions rather separate from the present (the time of the purchase of the option) interest rate of 1.865%, when the swap interest rate rises by 3%, 4.8655% is the in-the-money, and 5% of the exercise price approaches the in-the-money. As stated above, the exercise price indicates the level on which the in-the-money is obtained.

The purchase price is the option purchase price (premium price) at each exercise price, and as it becomes close to the in-the-money, the price becomes high. With respect to the asset price (principal) of one hundred million yen, the option purchase price with the exercise price of 5% is 4,660 thousand yen, and the ratio to the principal is 4.7%. With respect to the volatility, as shown in FIG. 5, in the actual results during the past 4 years on the 20-year swap interest rate market, the volatility of 15% or more was realized six times, and the volatility of 50% or more was realized twice, and after the option is purchased, the volatility of 50% or more can be sufficiently realized. Thus, in FIG. 2, it is assumed that 10 years after, the volatility becomes 50% or 75% from 15% which is a value at the time of the option contract.

With respect to each case where during this, the swap interest rate rises from a present one by 0% to 3% at intervals of 0.5%, the current price amount of the purchased option is calculated and is listed. The figure (b) shows the rise ratio of the current price amount after 10 years to the purchase price of the purchased option, and for example, in the case where the exercise price is 5.0%, the purchase price is 4,660 thousand yen, and after 10 years, when the rise of the swap interest rate is 0%, and the volatility is 50, the current price amount of the option is 14,713 thousand yen, the rise ratio is 3.16 (times), and they are respectively shown at the corresponding positions.

Here, it should be noted that in the figure (b), in the column where the exercise price is 5.0%, in the case where the interest rate rises by 3% and becomes 4.8655%, when the volatility is 50%, the rise rate of the purchase price is 14.96 times, and although the borrowed principal balance at this time point is not shown, in the case of the fixed interest rate of 3% and the 25-year principal and interest equal repayment, it is 68,365 thousand yen. On the other hand, the current price amount of the swap interest rate option by the housing loan principal reduction contract purchased by the loan debtor according to the invention is 69,698 thousand yen and exceeds the borrowed principal, so that all amount can be repaid by selling the option. Similarly, when the volatility is 75%, the rise rate is 17.22 times, and the current price amount is 80,255 thousand yen. This indicates that as compared with other exercise prices, although the rise rate is low, the invention has actual advantage for the loan debtor. As it becomes close to the in-the-money, the current price amount of the purchased option is increased, however, the rise rate of the option immediately before the in-the-money becomes dull. This is a feature of the Black-Scholes model using the logarithmic normal distribution.

It can not be necessarily said that the profit of the purchased option becomes large as the separation from the in-the-money becomes large, and it varies according to the desired principal reduction amount of the purchasing loan debtor and the feeling of burden of the purchase price in the purchase of the option. The details will be described in the next section.

FIG. 3 shows a state of an option equivalent to an asset price of 40 million yen obtained by dividing the above 20-year swap interest rate option with an asset price of one hundred million yen. The exercise period is similarly made 25 years, the swap interest rate at the time of the option purchase is 1.865%, and the volatility is 15%. According to the principal and interest equal repayment specification list shown in FIG. 1, the principal balance after 10 years is 27,346 thousand yen. In order to reduce this balance, with reference to FIG. 3(a), when the option purchase price for which the housing loan debtor does not feel the burden is about one million yen, the option with the exercise price of 6% (option purchase price is 1,156 thousand yen) has only to be selected. The current price amount of the option with the exercise price of 6% after 10 years is 25,758 thousand yen in the case where the swap interest rate rises by 3% and the volatility 50%, and as shown in the figure (b), the ratio of the current price amount to the loan balance is 94%, and it is understood that most of the loan balance can be repaid. When the exercise price is 5%, the option purchase price is 1,864 thousand yen and is relatively high, and although the repayment ratio is 102% and is sufficient, it is not a very large expansion as compared with 94%. Rather, it may be better to consider the purchase of the exercise price of 7% at 748 thousand yen, and the repayment rate of 87% by the rise of the purchase price. This selection is left at housing loan debtor's disposal.

Although the foregoing example indicates the case where one option is purchased, an example in which two options are purchased is shown in FIG. 4. In the figure (a), although the purchase condition is the same as the option shown in FIG. 3, since the two options are purchased, the option purchase price becomes twice. Accordingly, when the exercise price is 6%, the purchase price is 2,313 thousand yen, and the burden is large for the loan debtor, and accordingly, the exercise price of 8% is selected. The option purchase price is 1,000 thousand yen, and the ratio to the borrowed principal is 2.5%. The financing (loan) balance after 10 years is 27,346 thousand yen, and in the case where the swap interest rate rises by 2% and the volatility is 50%, the current price amount of the purchased premium is 28,699 thousand yen, and all of the loan balance can be extinguished (repaid). Besides, in the case where under the same purchase condition, the swap interest rate rises by 1% and the volatility is 50%, the current price amount is 17,034 thousand yen, and 62% of the principal outstanding amount can be reduced. It appears that this condition is realized at a rather high probability, and the reason will be described in the next section.

With respect to the manner of change of the swap interest rate, the past actual results of the 20-year swap interest rate were checked. The results are shown by a graph of FIG. 5. The period is about 4 years from October of 1999 to February of 2004. Although the interest rate fluctuates in a range of from 2.7% to 1%, the volatility fluctuates in a range of from 10% to 75%. The volatility is an index having a large influence on the premium price of the swap interest rate option, and it is advantageous to purchase the option of the volatility of less than 20%. As stated above, the calculation is made under the assumption that the objective 20-year swap interest rate is 1.865% and the volatility is 50% and 75%, and this appears to be adequate based on the actual results of the past about 4 years.

In the foregoing example, although the case where the swap interest rate rises has been described, in the case where the interest rate drops, although not shown especially, when the 20-year swap interest rate is about 6% and the volatility is 20%, and when the exercise price is 3% in a 25-year interest rate put option, the purchase price is 154 thousand yen for the principal of 40 million yen. In case the interest rate becomes 3% and the volatility becomes 70% on the 10th year, the current price amount of the purchase price becomes 6,600 thousand yen, and the current price amount of the purchase price becomes almost 43 times larger. As a result, when five options (154 thousand yen ' 5=770 thousand yen) are purchased, it becomes 6,600 thousand yen ' 5=33,000 thousand yen, and 27,346 thousand yen of the housing borrowed money balance after 10 years can be repaid.

Embodiment 2

This embodiment relates to a method of reducing a housing loan debt by using a swap interest rate option.

Figure 9:
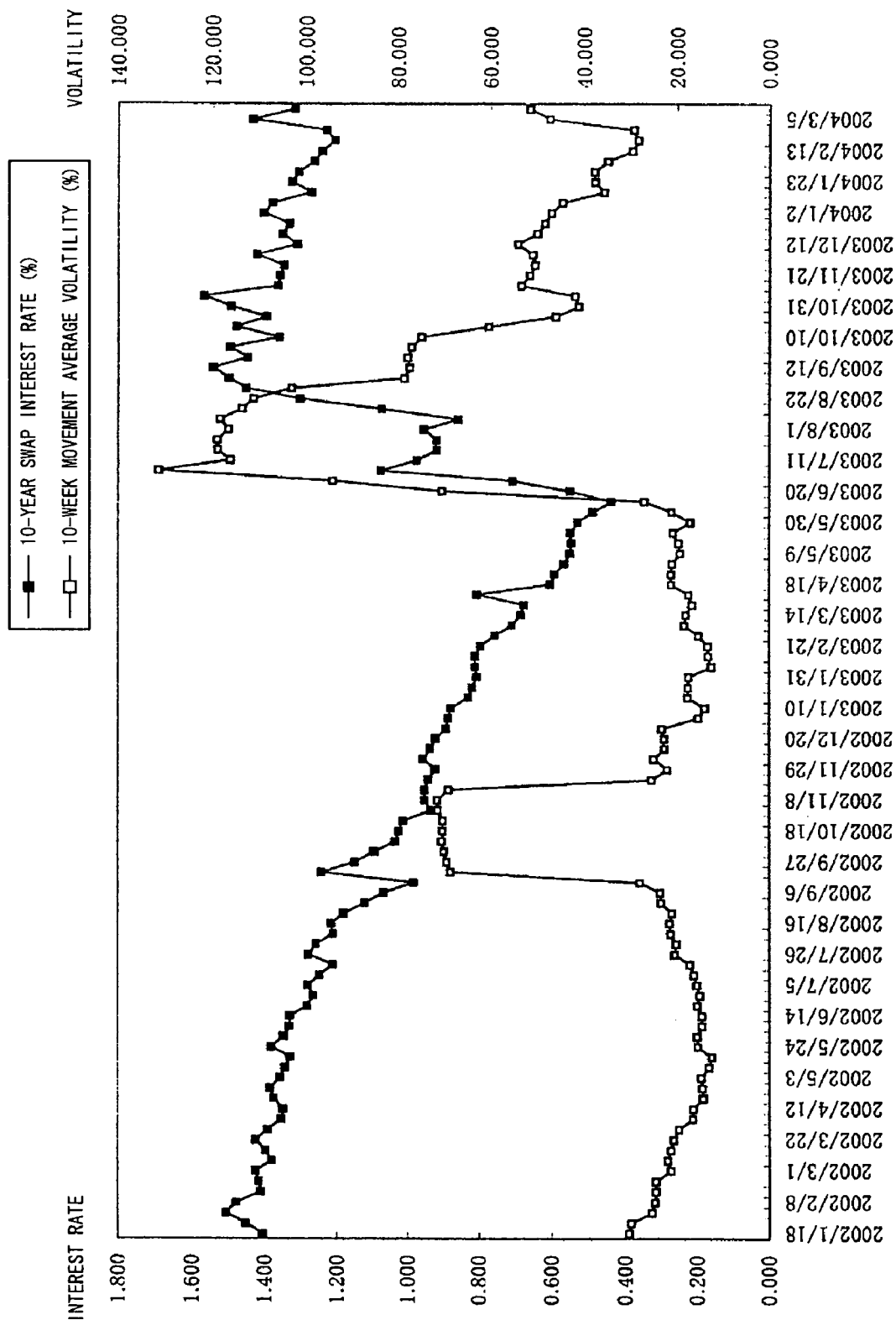
FIG. 9 is a graph in which actual results of a 10-year swap interest rate are plotted (Embodiment 2).

FIG. 6 shows an option in the case where a 10-year swap interest rate option is used. The exercise period is 25 years, the objective swap interest rate is 1.32%, the asset price (principal) as a unit of transaction is one hundred million yen, the exercise price at the time when the volatility is 20% is set to 5% to 15%, and the respective premium prices (purchase prices) are calculated. In the figure (a), the rise of the volatility is 70% and 130% since reference is made to the past actual results. The graph shown in FIG. 9 is obtained by plotting the actual result values of the 10-year swap interest rate of from January of 2002 to March of 2004. The swap interest rate shows a fluctuation of 0.5 to 1.6%, while the volatility severely fluctuates in a range of 15% to 130%. The fluctuation of the volatility has a large influence on the premium price, and produces a chance to secure the profit. In the case where FIG. 2(a) showing the 20-year swap interest rate is compared with FIG. 6(a) showing the 10-year swap interest rate, for example, when the rise of the interest rate is 0%, at the exercise price of 5%, the current price amount of the 10-year swap interest rate is 26,750 thousand yen, and the current price amount of the 20-year swap interest rate is 14,713 thousand yen, and the ratio is 1.8. The cause is a difference in the rise rate of the set volatility. When similar comparison is made for other exercise prices, it is understood that there is a difference of 1.7 to 2.0 times.

FIG. 7 (a) shows current price amounts for respective exercise prices after five years in the case where an option obtained by dividing the 10-year interest rate swap option with the asset price of one hundred million yen into small parts each having the asset price of 40 million yen (dividing into small lots) is purchased. The figure (b) shows that when the loan debtor of the housing loan (borrowed principal is 40 million yen, fixed interest rate is 3%, repayment period is 25 years) similar to that of embodiment 1 purchases the small-lot option, how much repayment can be made to the loan balance of 34,202 thousand yen after 5 years. When the repayment (reduction) of about 50% is desired, it is understood that this can be achieved at a rather high probability. When the economical situation fluctuates, and the interest rate rises by 3% and the volatility rises to 130%, the repayment of 96% becomes possible. When the loan debtor desires the option purchase price of several million yen or less, the exercise price of 7% of FIG. 7(a) is selected, and when the option of the purchase price (premium price) of 933 thousand yen is purchased, there is a high probability that about 50% of the loan balance can be repaid after 5 years, and the burden of the loan debtor is greatly reduced.

FIG. 8(a) shows a case where when the option is purchased, the number of purchased options is made two. When the option purchase price is one million yen or less, the purchase price of 690 thousand yen is selected in which the exercise price is 11%. When the swap interest rate rises by 1% and the volatility is 70%, the current price amount is 18,704 thousand yen, and when reference is made to the figure (b), the repayment ratio of the loan balance is 55%.

Embodiment 3

This embodiment relates to a method of reducing a housing loan debt, and an example in which an interest rate option based on a nation bond interest rate with an exercise period of 25 years is applied to the debt reduction of a housing loan similar to embodiment 1 will be described based on the actual results of Jan. 1, 1995 to Oct. 1, 2004. Incidentally, it is assumed that the time of loan borrowing is Jan. 1, 1995, and the interest rate option is purchased in a lump at the beginning of the loan borrowing.

Figure 10:
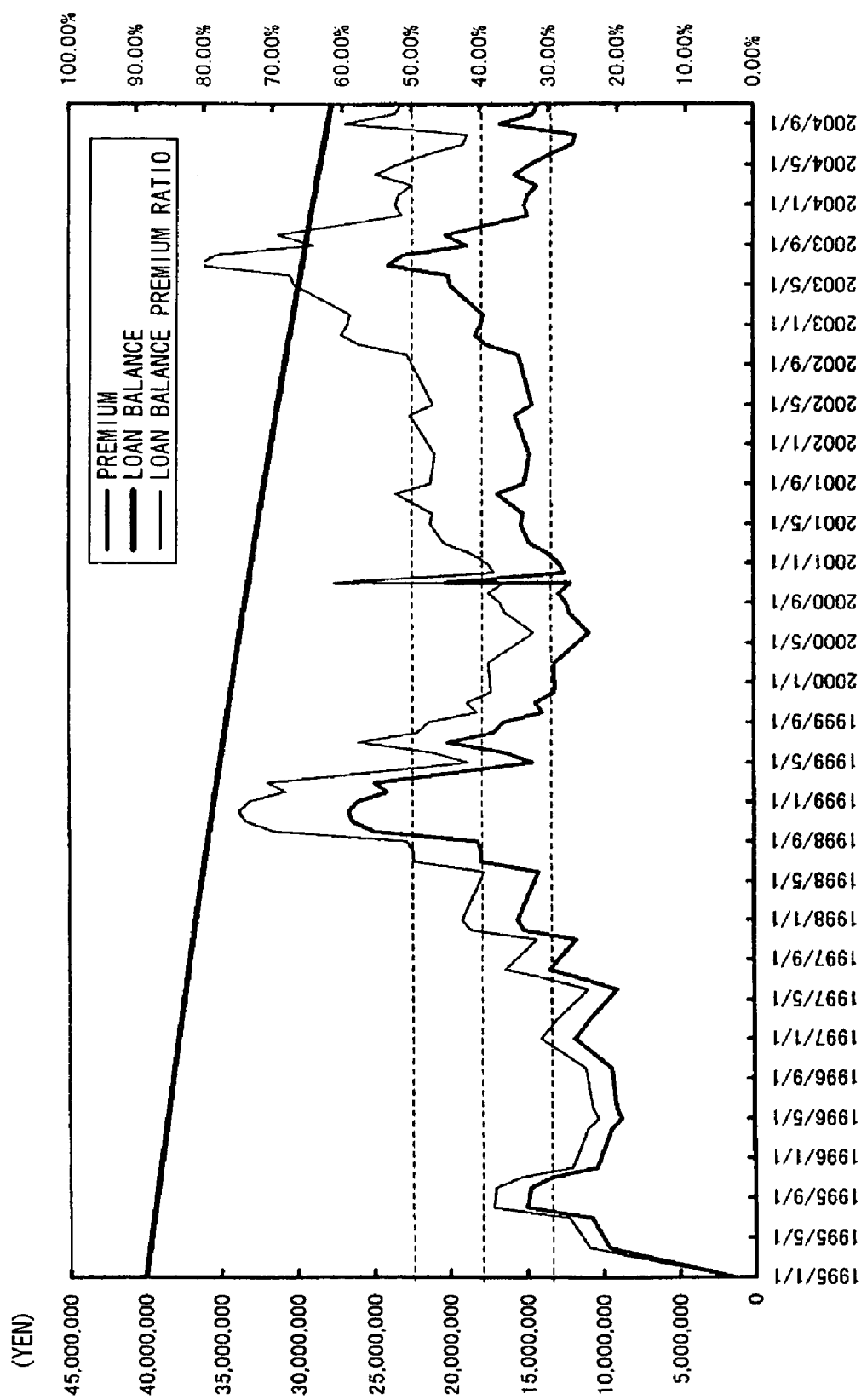
FIG. 10 is a graph indicating actual result values of a premium price of an interest rate option of a 25-year nation bond, a loan balance, and a ratio of the premium price to the loan balance (Embodiment 3).

FIG. 10 is such that with respect to the premium price of the interest rate option in the period, the asset price is 40 million yen corresponding to the loan borrowed principal, and the strike (exercise price) is 3.83, and based on the interest rates of the nation bond in respective periods and the volatilities of the nation bond, the premiums in the respective periods are calculated using the Black-Scholes calculation expression and are plotted.

With respect to the 25-year nation bond interest rate option, the principal is made 40 million yen, the volatility on Jan. 1, 1995 is 8.182%, and the premium price with the strike 3.83 is calculated to be 1,387,172 yen. In this way, the premiums in the respective periods are calculated. In the figure, the horizontal axis indicates the period, and the vertical axis indicates the loan balance, the premium (yen) and the ratio (%) of the premium price to the loan balance. The ratios of 30, 40 and 50% are indicated in the table by dotted lines, and for example, in the solid line portion indicating the ratio positioned above the dotted line indicating 40%, the loan balance of 40% or more can be reduced. In the period after Jan. 1, 1998, most of the portion corresponds to this. In this embodiment, at the beginning of the period, the volatility was as low as 8.182%, and the premium had a rather low price, which resulted in the lucky result.

Embodiment 4

In the case of a borrowing period of a 25-year housing loan, with respect to the purchase of the option in the foregoing embodiments 1 and 2, the option is purchased in a lump at the beginning of the loan borrowing, and the period (exercise period) of the option until the expiry date is made 25 years corresponding to the borrowing period of the housing loan, and therefore, the temporal value occupies almost all amount of the purchase price. This is the basic mechanism of the option and obeys the so-called time decay theory in which the temporal value of the purchased option is extinguished at the expiry date. Accordingly, in order to suppress the purchase price of the option to be low, in this embodiment, the period is made short, and the purchase price of one unit is suppressed to be low. In this case, although it is difficult to repay (reduce) all of or most of the borrowed principal by one hit, the profit by the sale of the short period option can be applied to the fund for purchase of a long-term debt reduction right to be purchased subsequently.

As an example, in the case where a Nikkei 225 option is purchased, in the case where an exercise period is made six months, and 1000 put options each having an exercise price of 7500 yen on the delivery month of September of 2004 are purchased at 3 yen/option, the purchase price is 3 yen ' 1000=3000 yen. (Nikkei Average price at the time point of March of 2004 is 11,500 yen, and the volatility is 25%) In the case where this is repeated every month, the number of options becomes 6000 (payment of 18,000 yen) for 6 months, and when it is assumed that the macro economy changes 3 months after, in the case where the Nikkei Average drops by 2,000 yen, and the volatility rises to 80%, as a result, the above purchased option becomes 500 yen/option, the current price amount becomes 500 yen ' 3000=1,500 thousand yen, and this can be acquired. This 1,500 yen is made a fund, and the purchase of a long-term option for acquiring the subsequent debt reduction right can be made to have been already paid. In the case where at the beginning of borrowing of the housing loan, funds for purchasing the option as described in the embodiments 1 and 2 are insufficient, or in the case where since there is no familiarity with the option, the feeling of burden occurs in the purchase of the option of about one million yen, and the purchase of the option is avoided, this proposal is useful for causing the advantage of the option to be understood by recommending the purchase of the option of very inexpensive purchase price, and after the option transaction of this embodiment proves successful, a long-term option corresponding to the loan repayment period may be contracted.

Practically, a constant amount (3,000 yen, 5,000 yen, or 10,000 yen) is paid every month as a fund for purchase of the option. That is, although the option purchase price is daily changed by the change of the volatility, the constant amount is determined every month, and the number of options is changed according to the purchase price at each time, and the options are purchased. Since the remaining borrowing period of 25 years is decreased with the lapse of time, the long-term option corresponding to the loan repayment period can be sequentially inexpensively purchased. Besides, in the foregoing method, it is possible to consider a method in which in the indexes of the exchange, interest rate, stock, etc., one in which for example, the volatility is low is made to have priority, and is purchased every month at the constant amount. In this case, as described above, in the halfway of the period, in the case where the investment amount can be collected by the change of the volatility, part of the collected amount is used for the subsequent investment amount, so that the subsequent investment amount can be made to have been paid for the loan debtor.

Embodiment 5

An example in which an option using an exchange of Japanese yen and US dollar is applied to the debt reduction of a housing loan similar to embodiment 1 will be described on the assumption that the depression of yen occurs in future. FIG. 11(*a*) shows results in which with respect to the exchange option doll call, the exercise period is 25 years, the object: yen dollar exchange (109.65 yen/USD), the yen interest rate is 2.443%, the US dollar interest rate is 9.049%, the principal is one million US dollars, the volatility is 9%, the exercise price is set between 110 yen to 170 yen, and a trial calculation is made as to the current price amount indicated by the premium price at each exercise price after 10 years. The figure (b) shows the rise ratio of the current price amount after 10 years to the premium at the beginning of the purchase.

In FIG. 12, the figure (a) shows the results of calculation of the price which is indicated after 10 years by the current price amount (premium) of the exchange option dollar call option, and the figure (b) shows the ratio of the current price amount at the time point of calculation to the loan balance after 10 years from the start of the repayment period. When consideration is made in a period of 10 years, it is considerably expected that the yen/dollar becomes about 110 to 130 yen. For example, when the loan debtor desires the option purchase price of one million yen or less, when the exercise price of the option to be purchased is made 120 yen, the purchase price can be suppressed to 814 thousand yen not higher than one million yen. With respect to such an option, in case the exchange rate rises by 20% after 10 years and becomes 131.58 yen and the volatility at that time is 13%, the current price amount becomes 5,952 thousand yen and is 7.3 times higher than the option purchase price. When the loan debtor sells the option, as shown in the figure (b), 25% of the loan balance of 27,346 thousand yen after 10 years can be repaid (reduced).

Figure 14:
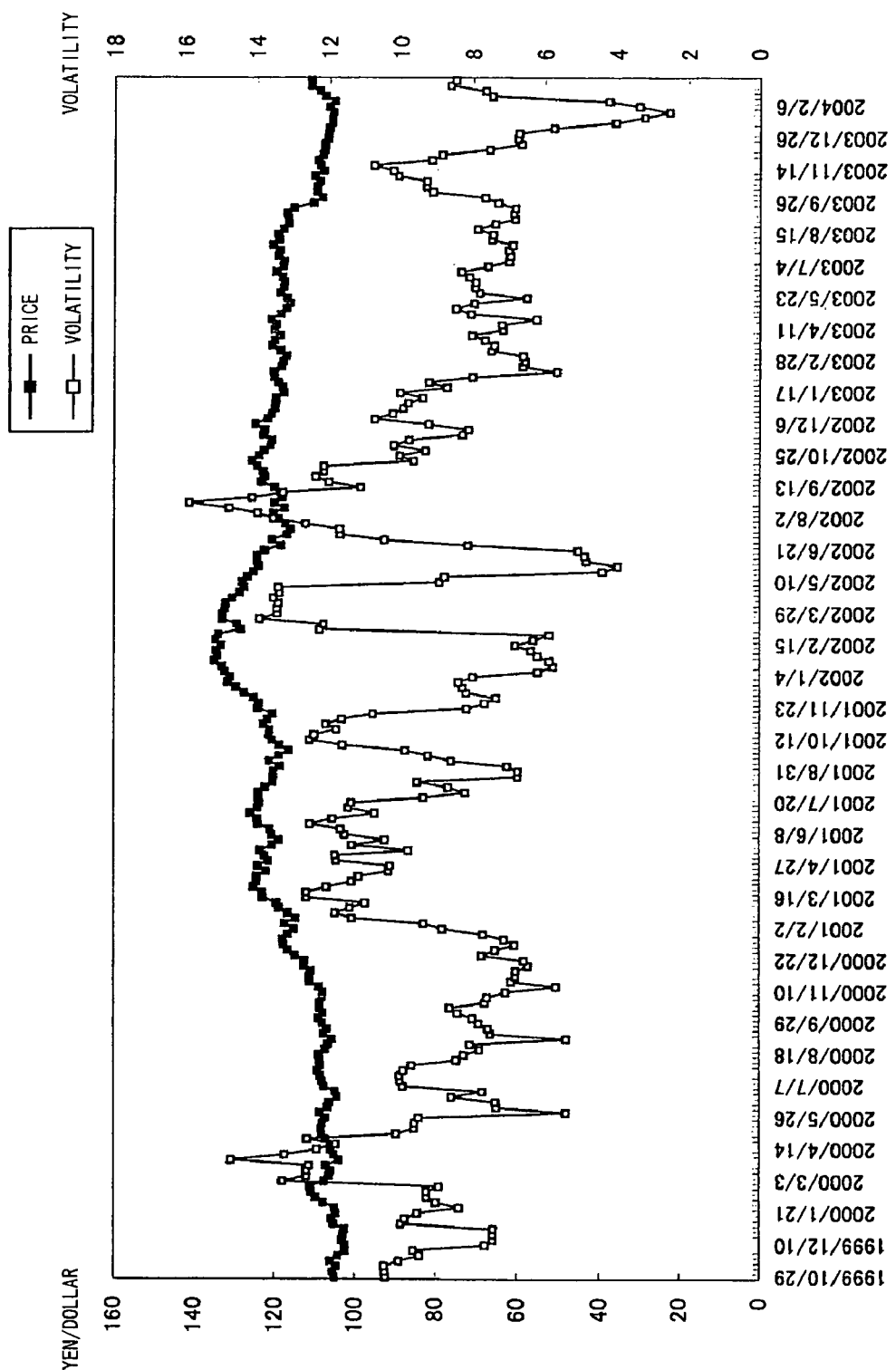
FIG. 14 is a graph in which actual result values of exchange price of Japanese yen/US dollar are plotted (Embodiment 5).

FIG. 13 shows an example in which two such exchange options are purchased. Since two options are purchased, the premium price becomes twice, and in the case where the purchase price is suppressed to one million yen or less, it is appropriate that the exercise price of 130 yen (purchase price of 816 thousand yen) is selected. After 10 years, when the exchange rate rises by 20% and the volatility is 13%, the option current price amount becomes 8,368 thousand yen, and is almost 10 times higher than the purchase amount. The repayment ratio of the loan balance at this time point is 31%, and even if the purchased option fee is subtracted, the profit of 7,552 thousand yen can be secured. In FIG. 14, the past actual results of the yen/dollar exchange and the volatility are plotted. The period is about 4 years from October of 1999 to February of 2004. The price of yen/US dollar changes in the range of 102 yen to 130 yen, and the volatility fluctuates in the range of 2 to 16%. Thus, the above example can actually occur in which the option is purchased when the volatility is 9%, and the settlement is made when it is 13%.

Embodiment 6

An example in which an option using NY Dow is applied to housing loan debt reduction will be described on the assumption that the NY Dow is lowered in future. FIG. 15(*a*) shows the purchase price (premium price) of a stock price option (put) in the case where the exercise period is 25 years, object: NY Dow (10,240 USD), the asset price (principal) is one million US dollars, the volatility is 12%, and the exercise price (US dollar) is set to 9,000 US dollars to 4,000 US dollars, and the current price amount to each exercise price in the case where the Dow is lowered after 10 years and the volatility fluctuates to 30% and 50%, and FIG. 15(*b*) shows the rise rate of the exercise price at that time.

FIG. 16(*a*) shows the current price amount after ten years in the case where an option obtained by dividing the NY Dow stock option with the asset price of one million US dollars into small lots each having the asset price of 400 thousand US dollars is purchased, and the figure (b) shows that the housing borrowed principal is 400 thousand US dollars, the period is 25 years, the interest rate is 4.5%, and when the loan debtor who performs the principal and interest equal repayment purchases the small-lot option, how much repayment can be made to the loan balance of 290,634 US dollars after 10 years. In the case where the option with the exercise price of 7,000 US dollars is purchased at the premium price of 4,240 US dollars, when the drop of the Dow after 10 years is 0% and the volatility value is 30, the current price amount becomes 54,280 US dollars, and is about 13 times higher than the option purchase amount, however, as shown in the figure (b), the repayment ratio of the loan balance is 19%. Besides, even if the Dow drops by 10%, the current price amount of the option is 61,240 US dollars, the rise rate is about 14 times, and the repayment ratio is 21%. In such a case, when two such options are purchased, the repayment ratio can be improved. FIG. 17(*a*) shows an example in which the two options are purchased. Although the option purchase price becomes twice, in the case of the exercise price of 7000 US dollars, the purchase price is as reasonable as 8,480 dollars, and when reference is made to the figure (b), even when the drop of the Dow is 0%, the repayment ratio of the loan balance reaches 37%. Further, when the Dow drops by 10%, the repayment ratio becomes 42%.

Figure 18A:
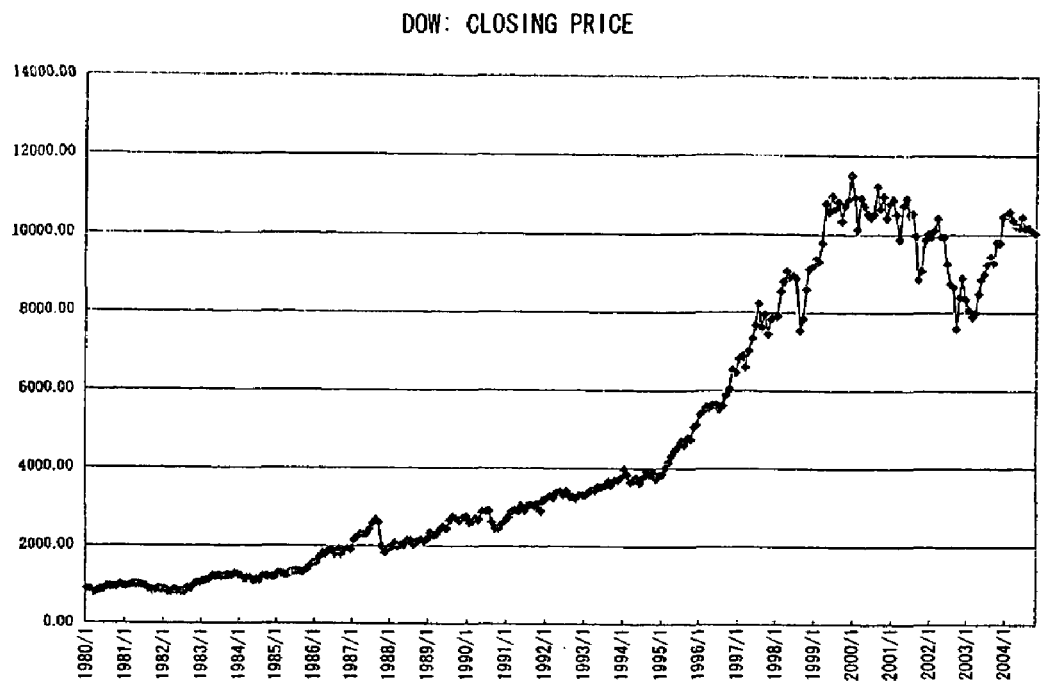
FIG. 18 (a) is a graph of NY Dow stock price, and (b) is a graph in which actual result values of volatility for 24 years are plotted (Embodiment 6).
Figure 18B:
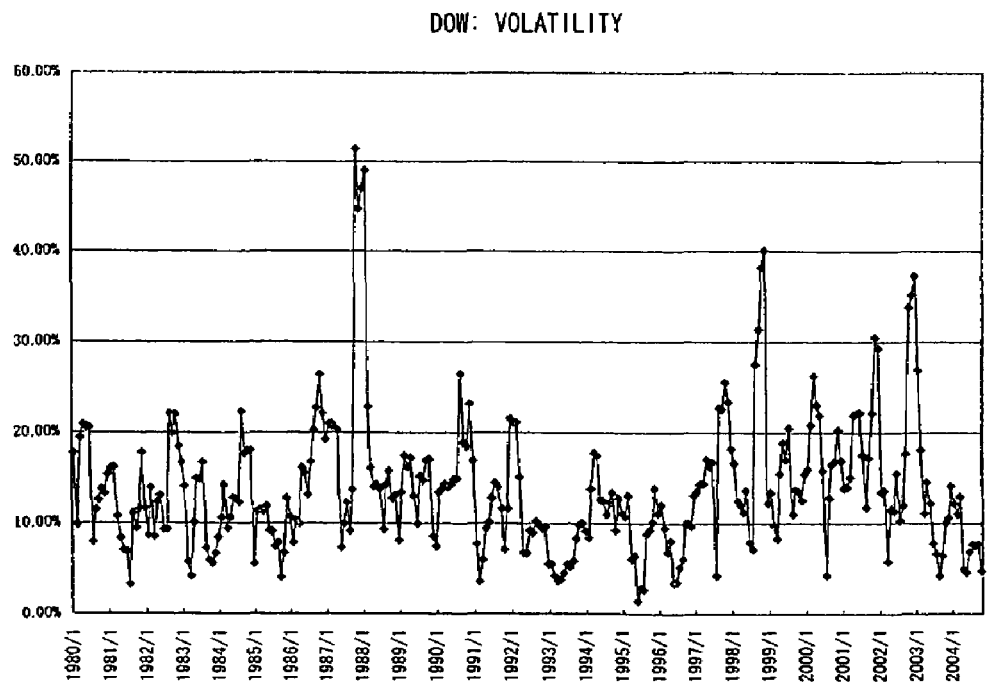

In FIGS. 18(*a*) 18(*b*), the change of the NY Dow stock price and the volatility are plotted from the past actual result values. The period is 24 years from January of 1980 to October of 2004. During this, the NY Dow stock price fluctuates in the range of 810 US dollars to 11,200 US dollars, and the volatility shows a considerable fluctuation between roughly 3 and 46%. As described above, the premium price of the option becomes high as the volatility value becomes high in addition to the fluctuation of the stock price. Then, an option which is easy to purchase is set, and on the basis of FIG. 19 and FIG. 20, a verification is made on how much profit can be acquired based on the actual results. FIG. 19 shows extracts of the past actual result values of the NY Dow stock price and the volatility of FIG. 18, and FIG. 20(*a*) shows a set call, and FIG. 20(*b*) shows a set put option.

First, the call option will be described.

As shown in FIG. 19(*a*), the actual result value of November of 1996 is such that the NY Dow is 6,521 US dollars, and the volatility value is 9.67%. It is assumed that at this time point, the loan debtor who borrowed the loan borrowing amount (notional principal) of 250,000 US dollars, purchases two (purchase price is 11,000 US dollars) call options (each purchase price is 5,500 US dollars) with the exercise period of 25 years and the strike (exercise price) of 15,000 US dollars.

The amount is 2.2% of the notional principal. With respect to the purchased option, at the time point of November of 1998 after two years from the purchase, the Dow is 9116 US dollars, the volatility value is 40.08%, and the current price amount becomes 17.6 times (96,700 US dollars) higher than the purchase price by the rise of the Dow and the volatility value. When the loan debtor sells the purchased option at this time point, 193,400 US dollars (96,700 US dollars ' 2) can be collected. This amount corresponds to 77% of the notional principal, and the loan debtor obtains the fund to greatly reduce the debt (see FIG. 20(a)).

Next, a case where a put option is purchased will be described. The notional principal is made 250,000 US dollars.

As shown in FIG. 19(b), the actual result value of August of 2000 is such that the NR Dow is 11,215 US dollars, and the volatility value is 12.78%. It is assumed that at this time point, the loan debtor, who borrowed the loan borrowing amount (notional principal) of 250,000 US dollars similarly to the above, purchases 10 (purchase amount is 12,675 US dollars) put options (each purchase price is 1,267,5 US dollars) with the exercise period of 25 years and the strike (exercise price) of 8,000 US dollars. Thereafter, the Dow drops by the influence of the international terrorist act (911) or the like, and becomes 8,341 US dollars on December of 2002 and the volatility is 37.26%. The current price amount of the purchased option with the strike (exercise price) of 8,000 US dollars at this time point is 44,075 US dollars. Thus, 440,750 US dollars (44,075 US dollars ' 10) can be collected by selling all the 10 purchased options (see FIG. 20(b)), and it is needless to say that all the notional principal can be repaid. In the example of US, the investment trust balance exceeds nationwide deposit balance, the fluctuation of the stock price has a large direct influence on the housing loan principal and interest repayment scheme, and the invention is very useful.

Embodiment 7

FIG. 21 shows a case where a NY Dow stock price option is used. A financial support company purchases a stock price option (dollar put) with a period of 10 years at a principal of 10,000 US dollars when the NY Dow is 10.045 US dollars and the volatility value is 12%, and creates an original exercise price table shown in the figure (a). The exercise price is provided between 9,000 dollars and 4,000 dollars at intervals of 1,000 dollars, and the purchase prices of respective exercise prices are shown, and for example, when the exercise price is 9,000 dollars, the option purchase price is 210 dollars, and the ratio to the principal is 2.10%. With respect to the current price amount of this option after three years, it is assumed that the NY Dow drops by 0%, 10%, 20%, and the volatility value at that time rises by 18% to become 30%, and rises by 38% to become 50%, the current price amount of the purchase price is calculated. For example, when the NY Dow drops by 10% and the volatility value is 30%, the purchase price of 210 dollars rises to 1,739 dollars. The rise rate is shown in the figure (b). The figure (b) shows the ratio of the purchase price to the current price amount after three years, and 1,739 dollars is 8.28 times higher than 210 dollars at the time of the purchase. The NY Dow at the time of the purchase is 10,045 dollars, 9,000 dollars of the exercise price is positioned near the at-the-money, and it is understood that although the rise rate is not so large, the rise rate of the purchase price of the separate exercise price, for example, 8,000 dollars or 7,000 dollars is rather large.

FIG. 22 shows a case where the 10-year lease debt of a leased object of 200 thousand dollars is reduced by using the foregoing NY Dow stock price option. The NY Dow is 10,045 US dollars, and the volatility value is 12%. A description will be given to the transition of the option purchase price in the case where at first, the leased object price is 200 thousand dollars, a 10-year lease is contracted, and the lease debt balance after three years is made 140 thousand dollars. On the assumption that the stock price drops, the stock price option (dollar put) is selected. In the structure of FIG. 22(a), the exercise price is set in the range of 9,000 dollars to 4,000 dollars at intervals of 1,000 dollars, and the ratios of the respective purchase prices to the principal, that is, to the leased object price are shown. When the lease debtor desires the purchase price of less than 10 thousand dollars, the number of options which can be purchased is shown. The way of seeing the table will be exemplified. The option purchase price of the exercise price of 9,000 dollars is 4,200 dollars, the ratio to the leased object of 200 thousand dollars is 1.05%, and the burden is slight. The purchase number is two, and they are purchased at 8,400 dollars. When the current price amount of the purchased option after 3 years is calculated, in case the Dow drops by 10% and the volatility value at that time rises by 30%, the current price amount is 69,560 dollars, and further, when reference is made to FIG. 22(b), it reaches 50% with respect to the lease balance of 140 thousand dollars after three years. In case the economical situation in which the Dow drops is abruptly changed, the volatility value further rises and becomes 50%, and in the case where the Dow drops by 10%, the ratio of the current price amount to the balance in lease obligation rises to 87%, and the lease debtor can escape the trouble.

The foregoing exercise price of 9,000 dollars is the exercise price close to the at-the-money when the NY Dow is 10,045 dollars and has a falling tendency, and the rise rate of the current price amount is not so high. When the column of the exercise price of 8,000 dollars is seen, the purchase price is 2,120 dollars, and the lease debtor purchases four options. In case the Dow drops by 10% after one year and the volatility value is 30%, the current price amount is 106,160 dollars, and when reference is made to the figure (b), it reaches indeed 76% of the lease balance of 140 thousand dollars. In case volatility value rises to 50%, it reaches 144% of the lease balance, and when the economy situation is unstable, the lease debt can be completely repaid.

Embodiment 8

A method in which a loan debtor who made a loan contract at a fixed interest rate uses an unrealized profit produced in the loan debt when the interest rate rises in the middle of repayment and advantageously performs the repayment of the loan debt will be described with reference to FIGS. 23 and 24.

It is assumed that the loan debtor first borrows 250 thousand US dollars at a fixed interest rate of 4.65% by principal and interest equal repayment for 25 years. In this case, the loan balance after 5 years is 220,195 US dollars. In view of the interest rate and the like at this time point, based on the yield curve obtained from a predetermined calculation expression previously determined to a swap trader, a discount interest rate in each month after 5 years from the loan contract is calculated, and the present value of the loan repayment amount is shown in FIG. 23. In details, the loan repayment amount in each month is calculated by [loan repayment monthly amount/(1+discount interest rate/12)$^{number\ of\ months}$], and this is summed up from the fifth year of the loan contract to the expiry month, so that the total amount of the loan repayment amount, that is, the present value of cash flow which is repaid by the loan debtor to the loan creditor every month is calculated.

Figure 24:
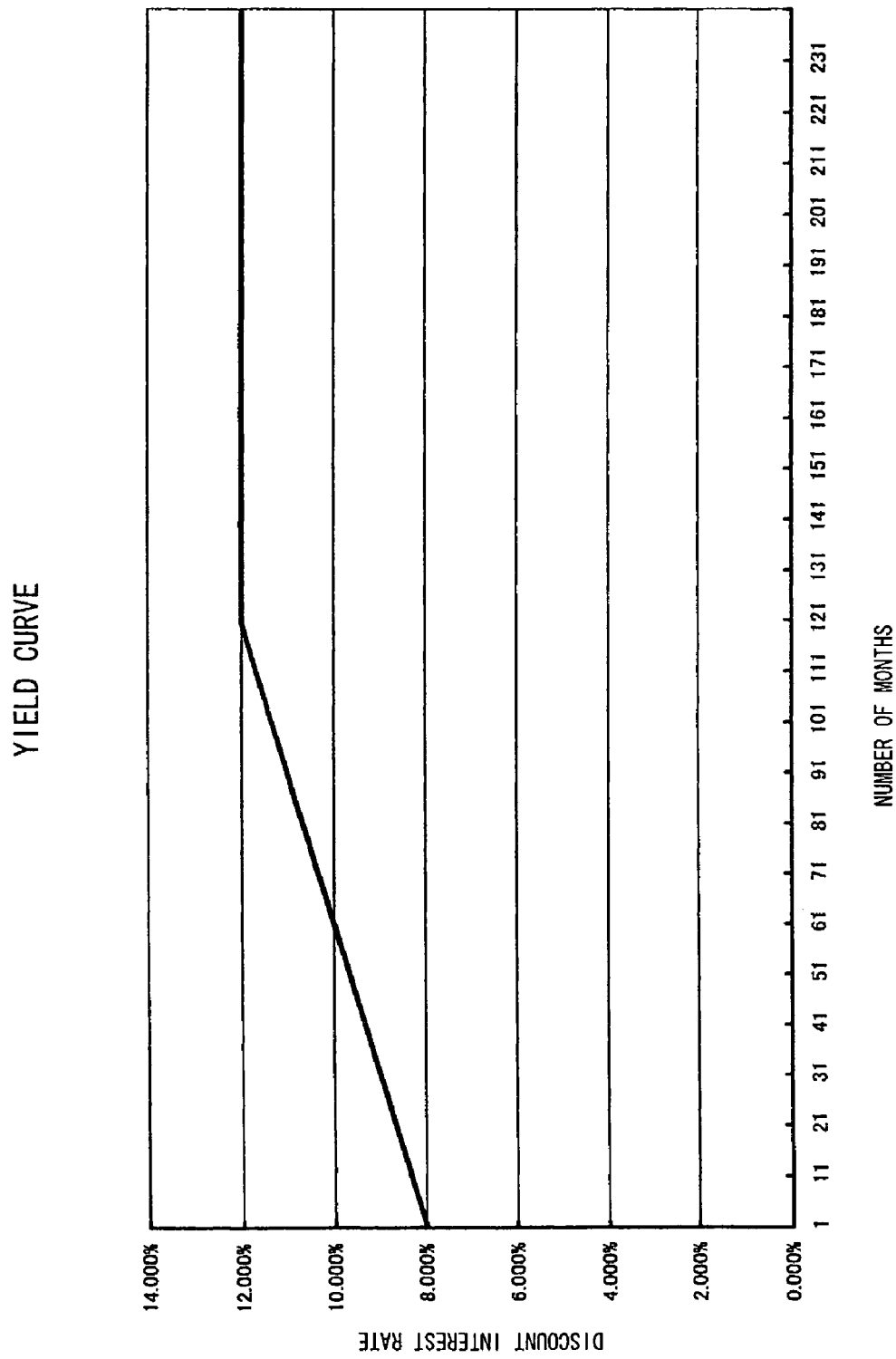
FIG. 24 is a graph showing a yield curve (Embodiment 8).

Here, in this example, for the purpose of simplifying the description, as shown in FIG. 24, a 1-year interest rate, a 10-year interest rate, and a 20-year interest rate are made 8.00%, 12.00%, and 12.00% as reference interest rates, and when the yield curve is assumed such that in the first 10 years (from the fifth year of the loan contract to the 15th year), the interest rate rises at a constant rate to 8% to 12%, and then (after the 15th year of the loan contract) the interest rate is constant to be 12%, the calculated present value of the cash flow remaining after 5 years from the loan contract is 134,837 US dollars.

When the present value of the cash flow is smaller than the loan balance at this point (that is, the fifth year from the loan contract), the loan debtor swaps (exchanges) actual money, a valuable instrument or the like with an amount (in this example, 134,837 US dollars) equivalent to the present value of the cash flow for the cash flow which the loan debtor repays to the loan creditor every month, so that the repayment to make the lone repayment advantageous can be performed by using the unrealized profit produced in the loan debt.

Specifically, in order that the loan debtor swaps his/her own cash flow, when the credit rating of the loan debtor is considered, it is necessary to provide the actual money, the valuable instrument or the like equivalent to the present value of the cash flow to an upper rank financial institution as a partner of the swap, and the nation bond or the like is preferably used as the valuable instrument. By this, the actual money, the valuable instrument or the like provided by the loan debtor and equivalent to the present value is swapped for the cash flow which the loan debtor repays to the loan creditor every month, the partner of the swap has an obligation to pay the cash flow, and the loan debtor acquires the cash flow from the partner of the swap, that is, the right to receive the payment of the remaining principal and interest payment amount of the loan debtor.

Besides, the loan debtor purchases the derivative at the beginning of the loan contract, and the profit can also be applied to the actual money equivalent to the present value.

Besides, when the interest rate drops after the swap, the right, owned by the loan debtor, to receive the payment of the remaining principal and interest payment amount is the right by which investment management can be performed at a high interest at the time point, and has the unrealized profit, and the loan debtor has the right to receive the unrealized profit.

FIG. 25 shows an interest rate call option calculated using the corrected Black-Scholes model expression in the case where when the interest rate is 4.65% at the time when the loan debtor makes a housing loan contract, the asset price (notional principal) is 250 thousand US dollars, the exercise period is 25 years, and the volatility is 10%, and the purchase price of the option with the strike (exercise price) of 9% is 3,488 US dollars per option. Three such options are purchased at 10,463 US dollars. In the case where the interest rate rises to 9.65% after 5 years and the volatility is 10%, the current price amount of the option is 95.181 US dollars, and the profit is 84,717 US dollars. When this profit is used as the actual money provided at the swap, the burden of the loan debtor is reduced. Besides, when the volatility is 20%, since 149,507 US dollars can be acquired, the total amount of the present value is contributed, and the surplus balance can be acquired.

In general, in the loan repayment before the due date, there arises a risk that the creditor can not acquire the interest which is to be acquired for years to come. Especially, in the case where the loan debtor is an individual as in the housing loan, it is difficult to demand a penalty. Also in such a situation, when the swap is established, the creditor has a merit that the whole amount of the scheduled cash flow can be collected. Further, as described above, when the right to receive the payment of future cash flow, which is owned by the loan debtor, is assigned to the creditor, the creditor can also acquire the unrealized profit of the cash flow produced in the case where the interest rate drops.

Embodiment 9

A method in which a lease debtor having introduced equipments of 200 thousand dollars by 10-year lease uses an unrealized profit produced in the loan debt due to the rise of the interest rate in the middle of the repayment and advantageously performs the repayment of the loan debt will be described with reference to FIGS. 26 and 27.

The lease contract is such a contract that a lender (lease creditor) as an owner of a specific article (equipment) gives a right to use and profit from it for a predetermined lease period to a borrower (lease debtor) of the article, and the borrower (lease debtor) pays a lease fee as a predetermined use fee to the lender (lease creditor). This lease fee includes, in addition to the article price and the management fee, profit and the like of the lender (lease creditor), a fixed interest rate at the time of the lease contract to the article cost as the article supply cost of the lender (lease creditor), and what is obtained by dividing the total of these by the number of months of the lease period is a monthly payment lease fee. Thus, the lease contract is considered to be substantially equivalent to obtaining financing by principal and interest equal repayment at a fixed interest rate while an amount of money equivalent to the article price is a borrowed principal.

FIG. 26 is a repayment list of the principal and interest equal repayment when the borrowed principal is 200 thousand dollars, and the fixed interest rate is 3.0%. The repayment balance including the interest after 5 years from the lease contract is 115,873 US dollars. In the case where the present value of the lease repayment amount is obtained, for simplifying the explanation, the interest rate rises suddenly after 5 years by the change of economical situation, and the results calculated by using the foregoing yield curve are shown in FIG. 27. The present value is 89,780 US dollars. When the introduced equipment works and the profit by production is obtained, the profit is used, or the actual money is separately prepared, the actual money equivalent to the present value is prepared, and the swap can be performed. When the swap is established, 26,000 dollars can be reduced.

Embodiment 10

Figure 28:
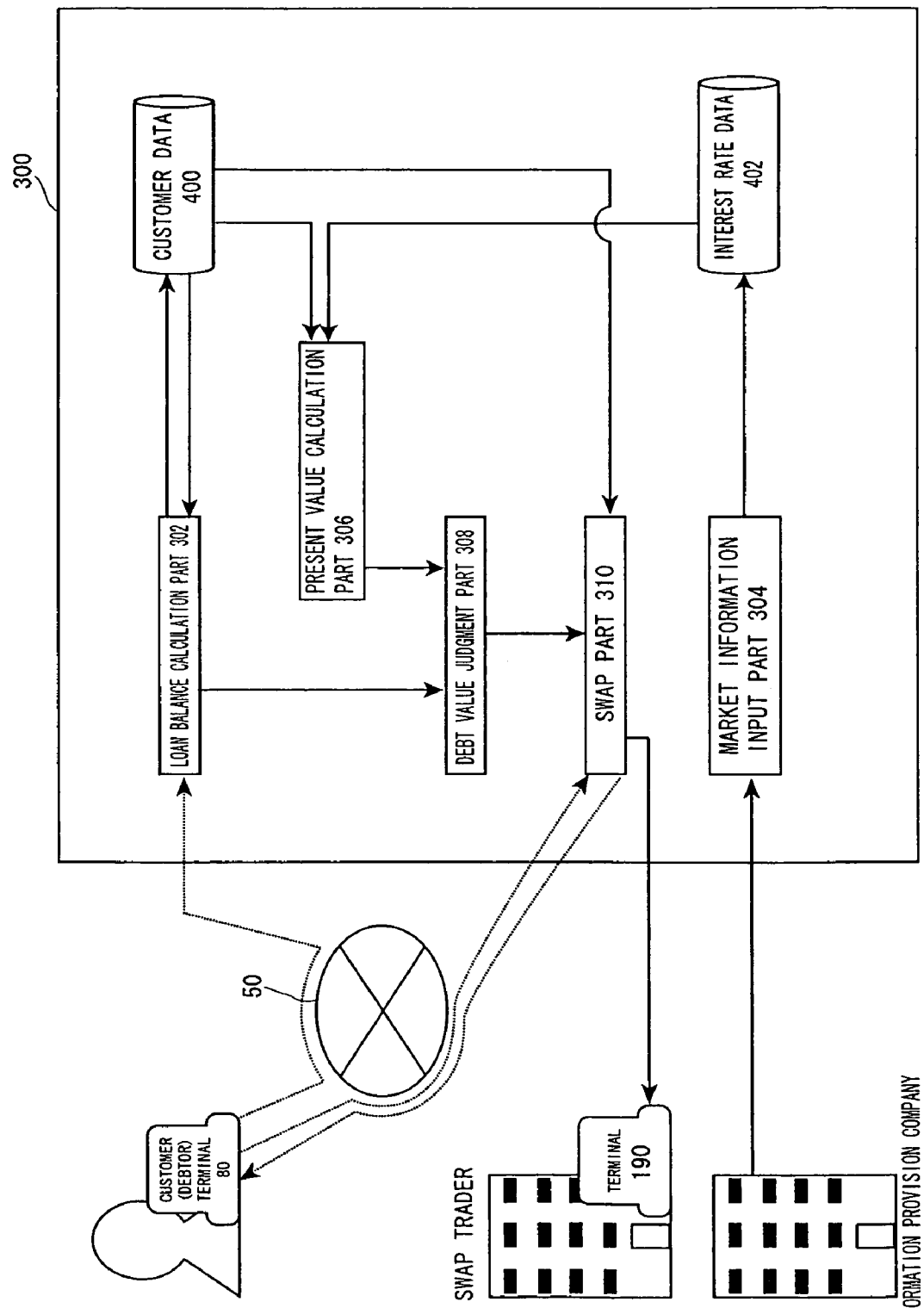
FIG. 28 is a functional block diagram showing a structure of an apparatus of embodiment 10 of the invention.

This embodiment relates to the reduction of a fixed interest rate loan debt such as a housing loan debt and will be described with reference to the drawing. FIG. 28 is a block diagram showing the structure of this embodiment. A loan debt reduction contract system of this embodiment (hereinafter referred to as a system) 300 is installed in a financial support company as described above, and is a server computer connected to a terminal (hereinafter referred to as a customer terminal) 80, such as a personal computer or a cellular phone, of a fixed interest rate loan debtor, a customer who becomes a fixed interest rate loan debtor in future, or a latent customer (hereinafter referred to as a customer) through the Internet 50.

In the system 300, a predetermined program controls the computer, so that respective elements shown in the system 300 are realized. Among them, a loan balance calculation part 302 is means for receiving customer information, such as the name of a customer, an address, a telephone number, an electric mail address, a fixed interest rate condition (loan principal, borrowing fixed interest rate, loan contract date, repayment period, number of times of repayment, repayment method (principal and interest equal repayment, principal equal repayment, bonus repayment, etc.)) for each customer through the Internet 50 from the customer terminal 80, storing it as customer data 400 into a predetermined storage part, and calculating, based on the customer data 400, the present loan balance A of the customer, that is, the loan balance not containing the remaining interest payment amount as the need arises.

A market information input part 304 is means for receiving interest rate data 402, such as an interest rate (variable interest rate, fixed interest rate, swap interest rate, etc.), transmitted through predetermined communication means from an external information provision company (for example, Bloomberg, Reuters, Bloomberg Quick, etc.) in real time and storing it into a predetermined storage part.

A present value calculation part 306 is means for calculating the present value B of the remaining principal and interest payment amount (principal and interest payment balance) based on the interest rate data 402, the yield curve obtained from a predetermined calculation expression previously determined with a swap trader, and the customer data 400 by, for example, a following expression as the need arises.

$$B = \sum_{n=1}^{T-t} \left[ \frac{S}{\left(1 + \frac{r_n}{12}\right)^n} \right]$$

Numerical expression 1

Here, T-t denotes a loan remaining period (number of months), S denotes a loan repayment monthly amount, $r_n$ denotes a discount interest rate after n months from the present calculated based on the yield curve.

A debt value judgment part 308 is means for comparing the present loan balance A calculated by the loan balance calculation part 302 with the present value B calculated by the present value calculation part 306.

A swap part 310 is means which refers to the customer data 400 when the loan balance A and the present value B satisfies a condition of A>B in the debt value judgment part 308, notifies a customer that an unrealized profit is produced in the fixed interest rate loan debt, receives a swap signal to instruct a swap process inputted via the Internet 50 from the customer terminal 80, and makes a swap with a swap trader.

The system 300 is connected to a computer terminal 190, which performs a swap transaction process, of a swap trader or the like through a communication line, and has a function to transmit various data relating to the swap transaction order and the like to the computer 190. When receiving the swap signal to instruct the swap process from the customer, a swap part 310 of the system 300 transmits the information relating to the loan balance A of the customer to the computer 190 of the swap trader or the like, and the swap transaction process is performed by this.

Figure 29:
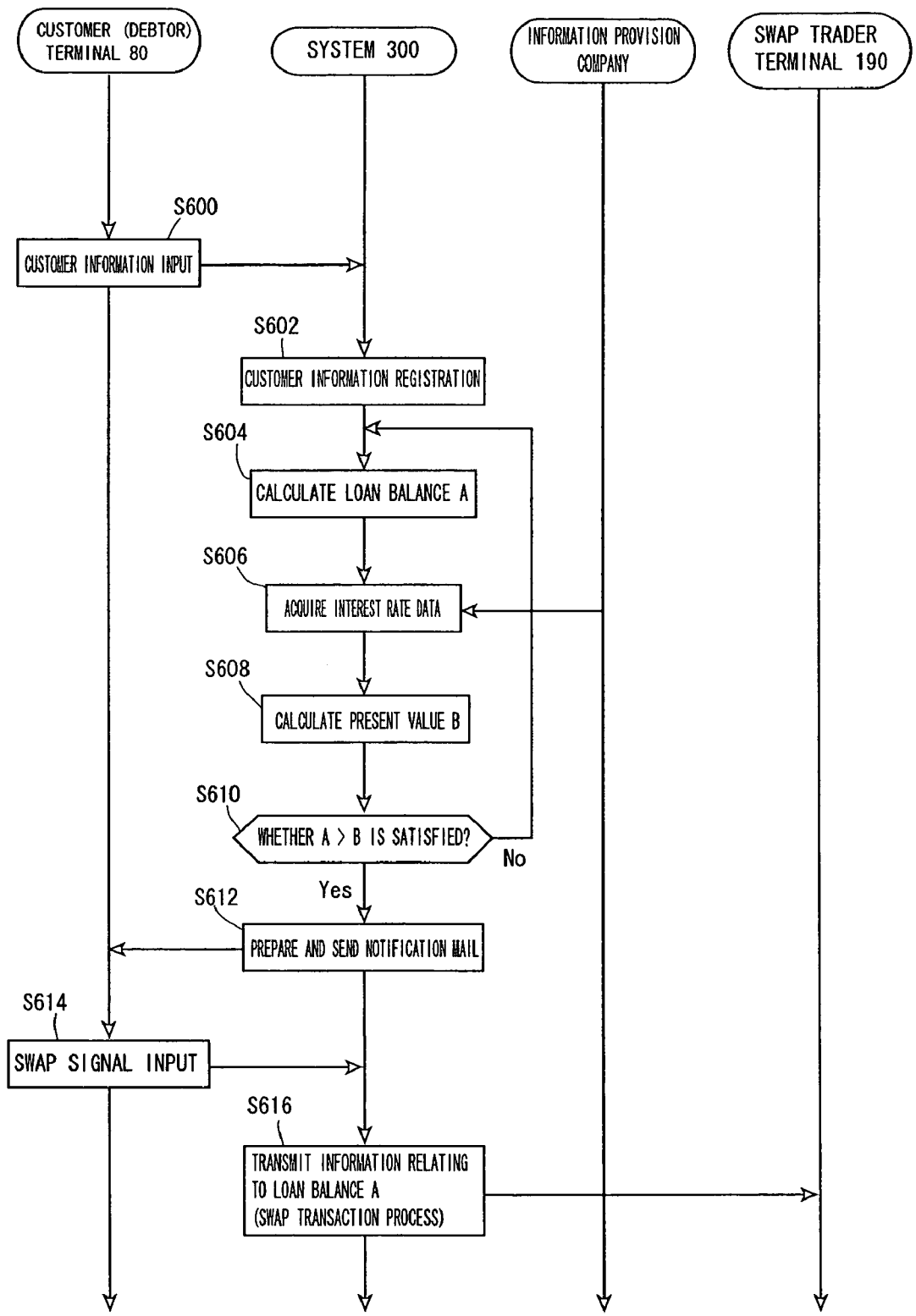
FIG. 29 is a flow view showing a process procedure in the apparatus of embodiment 10 of the invention.

The system 300 as stated above reduces the debt of the fixed interest rate loan debtor by a process procedure as shown in FIG. 29.

An access is made to a Website provided by the system 300 from the customer terminal 80, an application to use this system 300 is made, and when predetermined items are inputted on a predetermined input screen and are transmitted to the system 300 (step S600), the system 300 registers, as the customer data 400, the information transmitted from the loan balance calculation part 302 into the storage part such as a database (step S602). The present loan balance A of the customer is calculated based on the registered customer data 400 (step S604), the interest rate data 402 is acquired from the external information provision company (step S606), and the present value B of the principal and interest payment balance of the customer is calculated based on the interest rate data 402 and the yield curve calculated by the previously determined system with the swap trader (step S608). Next, the present loan balance and the present value B are compared with each other (step S610), and when A<B is established, step S604 to step S610 are again repeated, and when A>B is established, notification mail is created and is sent to the customer (step S612). Incidentally, instead of the notification mail, by telephone, facsimile, mail, or the like, it may be notified that the present value B of the principal and interest payment balance becomes lower than the present loan balance A, and the unrealized profit is produced in the fixed interest rate loan debt.

The swap signal to instruct the swap process is inputted from the customer (step S614), and when the swap part 310 of the system 300 receives it, the information relating to the loan balance A is transmitted to the computer terminal 190 of the swap trader or the like (step S616), and the swap trader performs the swap transaction process (step S618).

By this, the customer (fixed interest rate loan debtor) can acquire the right to receive the payment of the cash flow (that is, the principal and interest payment balance) to be produced in years to come from the swap trader by paying the actual money and/or valuable instrument smaller than the principle and interest payment balance, and can advantageously repay the fixed interest rate loan debt.

Embodiment 11

Figure 30:
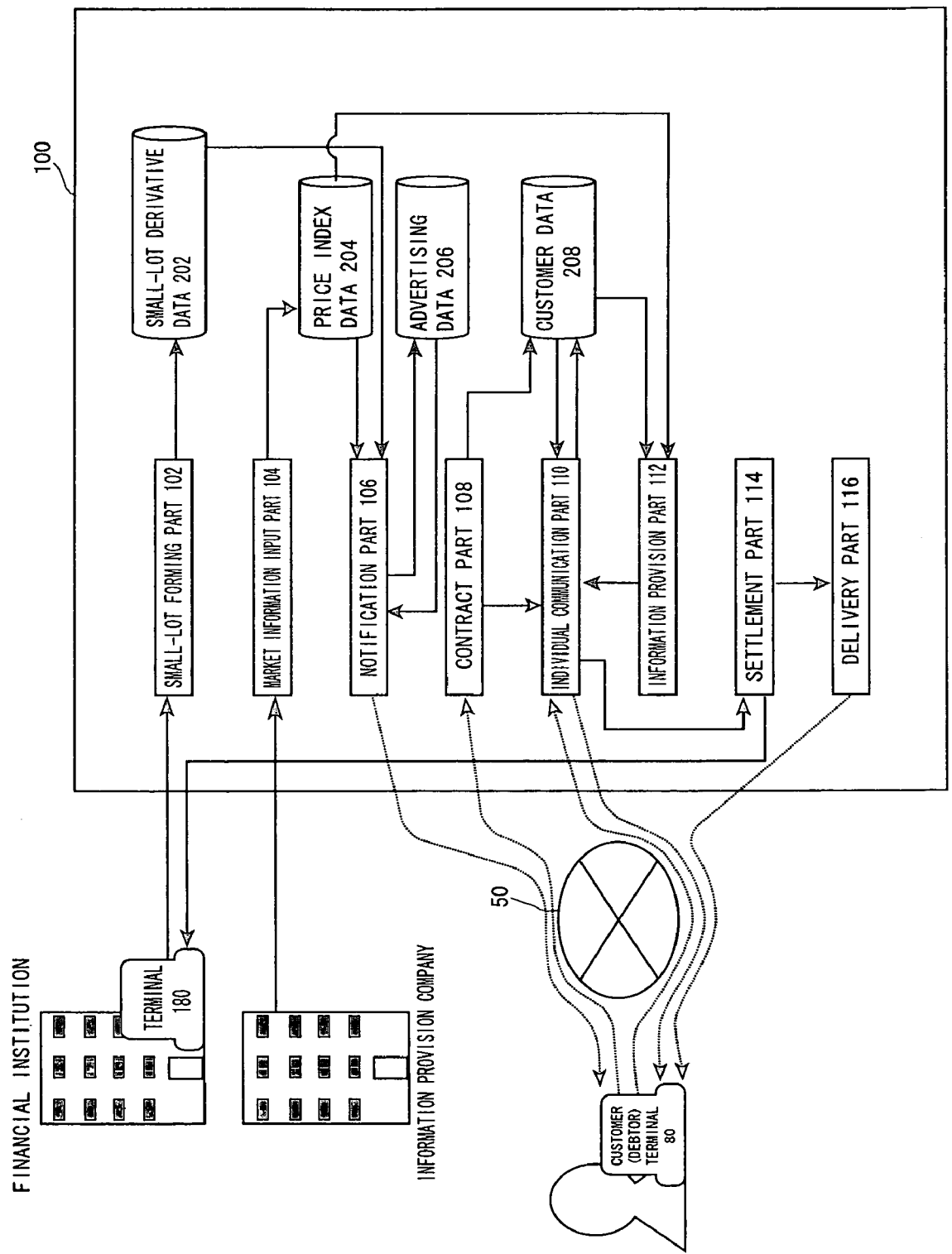
FIG. 30 is a functional block diagram showing a structure of an apparatus of embodiment 11 of the invention.

This embodiment relates to the reduction of a housing loan debt and will be described with reference to the drawings. FIG. 30 is a block diagram showing a structure of this embodiment. A loan debt reduction contract system of this embodiment (hereinafter referred to as a system) 100 is installed in a financial support company as stated above, and is a server computer connected to a terminal (hereinafter referred to as a customer terminal) 80, such as a personal computer or a cellular phone, of a loan debtor, a customer who becomes a loan debtor in future, or a latent customer (hereinafter referred to as a customer) through the Internet 50.

In the system 100, a predetermined program controls the computer, so that respective elements shown in the system 100 are realized.

Among these, a small-lot forming part 102 is small-lot forming means which receives information relating to the kind, purchase price, volatility and the like of a large derivative purchased by a financial support company from a financial institution, such as a market, a bank, a call loan dealer, or a stock company, divides the large derivative into small lots (for example, in the case where the derivative purchased by the financial support company is an interest rate option intended for a swap interest rate with an asset price of one billion yen, this is divided into 100 lots each having 10 million yen), and stores, as small-lot derivative (debt reduction right) data 202, information relating to the small-lot (hereinafter referred to as small-lot derivative (debt reduction right)) into a predetermined storage part.

A market information input part 104 is means for receiving and storing price index data 204, such as a price or an index of an interest rate, a currency, a valuable instrument, or a spot such as a commodity, a price or an index of a derivative such as a future delivery, an option, a swap, or a swaption, and numerical values of volatility, transmitted through predetermined communication means from an external information provision company (for example, Bloomberg, Reuters, Bloomberg Quick, etc.) in real time.

A notification part 106 is notification means which prepares, based on the small-lot derivative (debt reduction right) data 202 and the price index data 204, advertisement data 206 as the basis of a simulation sheet (indicating that for example, as shown in FIGS. 2 to 4, when a certain payment is made to a predetermined notional borrowed principal and the interest rate comes to have a certain value in percent after a certain number of years, how much the principal can be reduced) indicating the present price of the small-lot derivative (debt reduction right) and the reduction ratio of the notional borrowed principal (for example, 40 million yen) in the case where the price of the small-lot derivative (debt reduction right) rises in future, stores it into a predetermined storage part, transmits the simulation sheet to an electric medium such as a homepage based on the advertisement data 206, and advertises the small-lot derivative (debt reduction right).

A contract part 108 is contract means which receives, from a customer terminal 80 for each customer through the Internet 50 as a communication network, customer information (name, address, telephone number, electric mail address, etc.), a loan contract condition (loan principal, borrowing fixed interest rate, loan contract date, repayment period, number of times of repayment, repayment method, etc.) of the customer, and contract conditions such as a purchase condition relating to the kind and the number of small-lot options the purchase of which is desired, and a resale condition of the small-lot derivative (debt reduction right) to be purchased, stores it as customer data (application instruction) 208 into a predetermined storage part, and executes a contract based on the customer data 208.

An individual communication part 110 is individual communication means which issues an ID number and a password for each customer when establishment of a contract is notified from the contract part 108, stores them which are made to correspond to the customer data 208, and prepares a data file of HTML or the like for individual Website display, so that the dedicated information can be transmitted/received for each customer.

An information provision part 112 is information provision means for providing various information relating to the small-lot derivative (debt reduction right) purchased by the customer to the customer by transmitting it from the individual communication part 110 through the Internet 50 to the customer terminal 80, and based on the price index data 204 and the customer data 208 stored in the predetermined storage part, the profit and loss situation of the small-lot derivative (debt reduction right) purchased by the customer is derived and is displayed to the customer terminal 80.

A settlement part 114 is settlement means which receives a settlement signal inputted from the customer terminal 80 to the individual communication part 110 through the Internet 50 and makes settlement (sale) of the small-lot derivative (debt reduction right), and a delivery part 116 is delivery means which transfers money of the profit produced by the settlement (sale) of the small-lot derivative (debt reduction right) to the transaction account of the customer and notifies that the settlement (sale) of the small-lot derivative (debt reduction right) is completed.

Besides, the system 100 is connected to a computer 180, which performs a derivative transaction process, of a financial institution or the like through a communication line, and has a function to transmit/receive various data relating to the transaction order and the like to/from the computer 180. For example, the settlement part 114 of the system 100 transmits the settlement information of the small-lot derivative (debt reduction right) whose settlement (sale) is desired by the customer to the computer 180 of the financial institution or the like, and performs the settlement process.

The system 100 as stated above reduces the debt of the loan debtor by the process procedure as shown in FIG. 31.

The system 100 receives the predetermined information relating to the large derivative purchased by the financial support company from the financial institution (step S500), divides the derivative into small lots (step S502), acquires the price index data 204 from the external information provision company (step S503), prepares the simulation sheet of the small-lot derivative (debt reduction right) based on the price index data 204 and the small-lot derivative (debt reduction right) data 202 (step S504), and advertises in the homepage or the like (step S505). Incidentally, the simulation sheet is transmitted to the electric medium such as the homepage, and further, a printout and the like are made, and it is used in print media such as a pamphlet, a catalog, or a newspaper, broadcast media such as radio or television, or other advertising media, so that the small-lot derivative (debt reduction right) may be informed to the public.

A predetermined item (application instruction) is inputted from a loan debtor (customer) desiring the purchase of the small-lot derivative (debt reduction right) (step S506), and this is received and registered (stored) so that the contract is performed (step S508). The ID number and the password are issued for each customer who has contracted (step S510), a personal Website is provided on the homepage of the financial support company (step S512), and when the customer inputs the ID number and the password (step S514), he/she can see consulting information such as the present price of the small-lot derivative (debt reduction right) purchased by the customer, the price history, and the reduction ratio of the principal and interest payment balance in the case where the small-lot derivative (debt reduction right) is settled (sold) at the present time point (step S516). Incidentally, the transmission of the consulting information may be performed by electric mail, telephone, facsimile, mail or the like in addition to providing the personal Website on the homepage of the financial support company.

When the sale signal to instruct the settlement (sale) of the small-lot derivative (debt reduction right) is inputted from the customer (step S518), the settlement (sale) of the small-lot derivative (debt reduction right) is performed (step S520), the money of the profit produced by this is transferred to the transaction account of the customer and it is notified that the settlement (sale) of the small-lot derivative (debt reduction right) is completed (step S522).

The customer (loan debtor) having received the money applies the received money to the loan debt repayment so that the debt can be reduced. When the customer is the user of the system 300 of embodiment 7, the received money may be applied to the actual money (C) equivalent to the present value or part thereof. Incidentally, in the contract (step S508), in the case where the purchased small-lot derivative (debt reduction right) has a predetermined unrealized profit or more, the sale of the small-lot derivative (debt reduction right) may be performed without input of the sale data from the customer (step S520).

The debt reduction method of the invention is used in various existing contracts and transactions and can be used for avoiding the risk. The main articles are as follows:

move-in guarantee money, fixed-period land lease, fixed-period house lease, residence insurance, retirement allowance insurance (401K defined contribution), lease debt, automobile loan, equipment borrowing, securing of payment of inheritance tax, nation bond/corporate bond (rating change risk hedge)/public bond, consumer financing, commitment line, future debt such as management cost, golf course membership, guarantee money relating to mansion deposit, and educational loan.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

The invention claimed is:

1. A housing loan reduction system for reducing a housing loan debt by using a computer, comprising:
   a debtor terminal of a debtor;
   receiving means for receiving debtor information transmitted from the debtor terminal;
   housing loan debt balance calculation means for calculating a housing loan debt balance of the debtor at a present time point based on the received debtor information;
   storage means storing interest rate data and a present value calculation rule;
   present value calculation means for calculating a present value of a principal and interest payment amount remaining to the debtor at the present time point; and
   notification or transmission means for notifying or transmitting information to notify that the housing loan debt of the debtor has an unrealized profit to the debtor terminal in a case where the housing loan debt balance calculated by the housing loan debt balance calculation means is larger than the present value calculated by the present value calculation means,
   wherein a swap transaction process is performed when the receiving means receives a signal, notified or transmitted from the debtor terminal of the debtor terminal of the debtor, to instruct a swap process.

* * * * *